US011916864B2

(12) United States Patent
Vasamsetti et al.

(10) Patent No.: US 11,916,864 B2
(45) Date of Patent: *Feb. 27, 2024

(54) APPARATUSES, METHODS, AND COMPUTER PROGRAM PRODUCTS FOR DATA RETENTION IN A COMMON GROUP-BASED COMMUNICATION CHANNEL

(71) Applicant: Salesforce, Inc., San Francisco, CA (US)

(72) Inventors: Sri Vasamsetti, San Francisco, CA (US); Paul Matthew Jennings, Redwood City, CA (US); Paul Rosania, San Francisco, CA (US); Steven Gordon, San Francisco, CA (US); Michael Demmer, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/882,502

(22) Filed: Aug. 5, 2022

(65) Prior Publication Data
US 2022/0385611 A1 Dec. 1, 2022

Related U.S. Application Data

(63) Continuation of application No. 16/778,993, filed on Jan. 31, 2020, now Pat. No. 11,456,985.

(51) Int. Cl.
*H04L 51/42* (2022.01)
*H04L 12/18* (2006.01)
(Continued)

(52) U.S. Cl.
CPC ............ *H04L 51/42* (2022.05); *G06F 16/113* (2019.01); *G06F 16/125* (2019.01); *H04L 12/185* (2013.01); *H04L 51/216* (2022.05)

(58) Field of Classification Search
CPC .... G06F 16/113; G06F 16/125; H04L 12/185; H04L 51/216; H04L 51/42; H04L 63/20
See application file for complete search history.

(56) References Cited

U.S. PATENT DOCUMENTS

2017/0091466 A1* 3/2017 Meyer ...................... G06F 21/10
2018/0197144 A1* 7/2018 Frank ................... H04L 63/104
(Continued)

FOREIGN PATENT DOCUMENTS

WO WO2019018767 A1 1/2019

OTHER PUBLICATIONS

David Auerbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM).

(Continued)

*Primary Examiner* — Gil H. Lee
(74) *Attorney, Agent, or Firm* — Lee & Hayes, P.C.

(57) ABSTRACT

Embodiments described herein include apparatuses, computer program products, and methods for data management in a group-based communication system. Specifically, some embodiments address data management for group-based communication channel(s) accessible to any number of entities based on various data retention policies. In this regard, embodiments enable maintenance of data associated with multiple organizations accessing a group-based communication channel based on a single, shared data retention (Continued)

policy, or different data retention policies, for example based on authorship of the group-based communication message. In embodiments, a data retention policy may be assigned directly to an entity, or assigned to a higher-level or lower-level entity and function as a default data a retention policy for other entities associated therewith. A group-based communication system is configured to enable storage of data based on corresponding data retention policies for each organization identifier, and/or an agreed data retention policy for all organization identifiers.

20 Claims, 25 Drawing Sheets

(51) Int. Cl.
  *G06F 16/11* (2019.01)
  *H04L 51/216* (2022.01)

(56) References Cited

U.S. PATENT DOCUMENTS

| | | | |
|---|---|---|---|
| 2018/0287982 | A1 | 10/2018 | Draeger et al. |
| 2019/0026328 | A1* | 1/2019 | Jin ..................... G06Q 10/0635 |
| 2019/0386939 | A1* | 12/2019 | Christian .............. H04L 67/141 |
| 2021/0243150 | A1 | 8/2021 | Vasamsetti et al. |

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.
"Die, Email, Die! A Flickr Cofounder Aims To Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.
Robert Hof, "Stewart Butterfield On How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;26 PM), 4 pages.
"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (Nov. 2018) 16 pages.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.
Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.
Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 3 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.
Matsumoto, T. et al., "Chocoa Communicator—A New Communication System Based on Awareness and Text Communications", Fujitsu Sci. Tech. J., 36, 2, (Dec. 2000), pp. 154-161.
Office Action for U.S. Appl. No. 16/778,993, dated Dec. 9, 2021, Vasamsetti, "Apparatuses, Methods, And Computer Program Products For Data Retention In A Common Group-Based Communication Channel", 19 pages.
Office Action for U.S. Appl. No. 16/778,993, dated Mar. 17, 2022, Vasamsetti, "Apparatuses, Methods, And Computer Program Products For Data Retention In A Common Group-Based Communication Channel", 21 pages.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
PCT Search Report and Written Opinion dated Mar. 29, 2021 for PCT Application No. PCT/US21/14651, 13 pages.
Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 13 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 5 pages.
Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.
International Preliminary Report on Patentability dated Aug. 11, 2022 for PCT Application No. PCT/US2021/014651, 8 pages.
Office Action for EP Patent Application 21705385.9, dated Jan. 12, 2023, a foreign counter part to U.S. Appl. No. 16/778,993, "Apparatuses, Methods, And Computer Program Products For Data Retention In A Common Group-Based Communication Channel", 6 pages.

\* cited by examiner

APPARATUSES, METHODS, AND COMPUTER PROGRAM PRODUCTS FOR DATA RETENTION IN A COMMON GROUP-BASED COMMUNICATION CHANNEL

CROSS REFERENCE TO RELATED APPLICATIONS

This application claims priority to and is a continuation of U.S. patent application Ser. No. 16/778,993, filed on Jan. 31, 2020, the entire contents of which are incorporated herein by reference.

TECHNOLOGICAL FIELD

Embodiments of the present disclosure generally relate to data management, and specifically to data retention policy creation, management, and utilization to facilitate management of data with a common group-based communication channel of a group-based communication system.

BACKGROUND

Conventional communications systems are configured to provide data management according to one particular setting. Such rigid implementations fail to provide sufficient data controls for multiple distinct use cases, user groups, or other circumstances. In this regard, conventional implementations subject various different user groups, and/or entities, to management under such a setting regardless of whether such rules are sufficient, desired, or otherwise acceptable to each user, group of users, or other entity to which the rules are applied. Specifically, in the context of a common group-based communication channel in which a plurality of users from various organizations and/or other entities such as various group-based workspaces are communicating within a single group-based communication channel, created data (e.g., group-based communication messages and/or corresponding metadata) must be effectively managed to enable efficient and effective data storage functionality while providing the privacy and security desired by, promised to, and/or otherwise agreed to by each user, user group, or other entity. Applicant has discovered problems with current systems, methods, apparatuses, and computer program products for data management associated with conventional communication systems, and through applied effort, ingenuity, and innovation, Applicant has solved many of these identified problems by developing a solution that is embodied in the present disclosure, which is described in detail below.

BRIEF SUMMARY

In general, embodiments of the present disclosure provided herein include systems, methods, apparatuses and computer program products for group-based communication channel data management. Other systems, apparatuses, methods, computer readable media, and features will be, or will become, apparent to one with skill in the art upon examination of the following figures and detailed description. It is intended that all such additional systems, apparatuses, methods, computer readable media, and features be included within this description be within the scope of the disclosure, and be protected by the following claims.

In accordance with one aspect of the present disclosure, a computer-implemented method for group-based communication channel data management is provided. The computer-implemented method may be performed using any of a myriad of implementations embodied in hardware, software, firmware, and/or a combination thereof, as described herein. In at least one example, the computer-implemented method includes identifying a common group-based communication channel accessible to a plurality of client devices associated with a plurality of organization identifiers. The computer-implemented method further includes retrieving a group-based communication message set associated with the common group-based communication channel. The computer-implemented method further includes identifying a first data retention policy associated with a first group-based communication message of the group-based communication message set based at least in part on an entity identifier associated with the first group-based communication message. The computer-implemented method further includes performing a message management action for the first group-based communication message based on a determination of whether the first group-based communication message satisfies the corresponding first data retention policy. The computer-implemented method further includes causing rendering, via a client device of the plurality of client devices, of a group-based communication interface associated with the common group-based communication channel, where the group-based communication interface comprises the first group-based communication message associated with the first data retention policy.

In some embodiments of the example computer-implemented method, identifying the first data retention policy associated with the first group-based communication message comprises identifying an authenticated user account identifier associated with the first group-based communication message; determining an organization identifier associated with the authenticated user account identifier; and retrieving, from a group-based communication datastore, the first data retention policy based at least on the organization identifier.

In some embodiments of the example computer-implemented method, the computer-implemented method further includes receiving an organizational data retention policy assignment request associated with a first organization identifier of the plurality of organization identifiers; and storing an assigned data retention policy associated with the first organization identifier, where the assigned data retention policy is based on the organizational retention policy assignment request, and where the assigned data retention policy is associated with at least a message subset of the group-based communication message set.

In some embodiments of the example computer-implemented method, the computer-implemented method further includes receiving a channel data retention policy assignment request associated with the group-based communication channel; and storing an assigned data retention policy associated with the group-based communication channel, where the assigned data retention policy is based on the channel data retention policy assignment request, and where the assigned data retention policy is associated with at least a message subset of the group-based communication message set.

In some embodiments of the example computer-implemented method, the computer-implemented method further includes receiving an agreed data retention policy assignment request associated with the group-based communication channel; storing an assigned data retention policy associated with the group-based communication channel, where the assigned data retention policy is based on the agreed retention policy assignment request; and receiving, for the assigned data retention policy, data indicating a storage policy approved by at least one organization identifier of the plurality of organization identifiers, where the at least one organization identifier is associated with at least a message subset of the group-based communication message set.

In some embodiments of the example computer-implemented method, the computer-implemented method further includes receiving a data retention policy generation request associated with a first organization identifier of the plurality of organization identifiers; generating a second data retention policy based on the data retention policy generation request; and storing the second data retention policy associated with the first organization identifier.

In some embodiments of the example computer-implemented method, performing the message management action for the first group-based communication message based on the determination of whether the group-based communication message satisfies the corresponding first data retention policy comprises one of retaining, in a group-based communication datastore, the first group-based communication message based on a determination that the first group-based communication message satisfies the corresponding first data retention policy; or removing, from the group-based communication datastore, the first group-based communication message based on a determination that the first group-based communication message does not satisfy the corresponding first data retention policy.

In some embodiments of the example computer-implemented method, identifying the first data retention policy associated with the first group-based communication message comprises determining a group-based communication channel type for the group-based communication channel; identifying a corresponding organization identifier associated with the first group-based communication message; and retrieving the first data retention policy from a group-based communication datastore based on the group-based communication channel type and the corresponding organization identifier.

In some embodiments of the example computer-implemented method, identifying the first data retention policy associated with the first group-based communication message comprises retrieving, from a group-based communication datastore, the first data retention policy based on the group-based communication channel.

In some embodiments of the example computer-implemented method, a first group-based communication message subset of the group-based communication message set is associated with a first organization identifier of the plurality of organization identifiers and is associated with the first data retention policy, and where a second group-based communication message subset of the group-based communication message set is associated with a second organization identifier of the plurality of organization identifiers and is associated with a second data retention policy.

In some embodiments of the example computer-implemented method, the first data retention policy for the first group-based communication message comprises one of (1) a channel data retention policy associated with a first organization identifier of the plurality of organization identifiers, where the first organization identifier is associated with the first group-based communication message; (2) an organizational data retention policy associated with a second organization identifier of the plurality of organization identifiers, where the second organization identifier is associated with the first group-based communication message; or (3) an agreed data retention policy associated with the group-based communication channel.

In some embodiments of the example computer-implemented method, the computer-implemented method further includes receiving, from the client device associated with an authenticated user account, a message deletion request associated with a selected group-based communication message of the group-based communication message set associated with the group-based communication channel, where the authenticated user account is associated with deletion permissions for the selected group-based communication message; and deleting, from a group-based communication datastore, the selected group-based communication message in response to receiving the message deletion request.

In some embodiments of the example computer-implemented method, receiving, from the client device associated with an authenticated user account, a message editing request associated with a selected group-based communication message of the group-based communication message set associated with the group-based communication channel, where the authenticated user account is associated with editing permissions for the selected group-based communication message; and storing updated data associated with the selected group-based communication message in response to receiving the message editing request, where the updated data is based on the message editing request.

In some embodiments of the example computer-implemented method, identifying a second group-based communication message associated with the group-based communication channel, where the second group-based communication message is associated with a second organization identifier of the plurality of organization identifiers; identifying a second data retention policy associated with the second group-based communication message based on the second organization identifier; and performing a second message management action for the second group-based communication message based on a determination of whether the second group-based communication message satisfies the second data retention policy.

In some embodiments of the example computer-implemented method, the computer-implemented method further includes identifying a second group-based communication message associated with the group-based communication channel, where the second group-based communication message is associated with a second organization identifier of the plurality of organization identifiers; and in response to a determination that the second group-based communication message satisfies the first data retention policy, performing a second message management action for the second group-based communication message.

In some embodiments of the example computer-implemented method, the computer-implemented method further includes receiving, from the client device associated with an authenticated user account associated with a first organization identifier, a policy information request associated with the common group-based communication channel; and causing rendering, via the client device, of the group-based communication interface comprising a data retention notification information interface based on the first data retention policy, where the first data retention policy comprises a third-party retention policy associated with a second organization identifier of the plurality of organization identifiers.

In some embodiments of the example computer-implemented method, causing rendering, via the client device, of the group-based communication interface associated with the common group-based communication channel comprises causing rendering of a first group-based communication interface associated with the common group-based communication channel comprising a selected group-based communication channel, where the first group-based communication interface comprises a source group-based communication message set associated with a first data retention policy set; and causing rendering a second group-based communication interface associated with the common group-based communication channel, where the second group-based communication interface comprises an updated group-based communication message set, the updated group-based communication message set comprising the source group-based communication message set updated based on the first data retention policy set.

Additionally or alternatively, in some embodiments of the example computer-implemented method, the computer-implemented method further includes the updated group-based communication message set comprises at least one less group-based communication message than the source group-based communication message set, each of the at least one less group-based communication message based on a corresponding data retention policy of the first data retention policy set. Additionally or alternatively, in some other embodiments of the example computer-implemented method, the updated group-based communication message set comprises a retained message set and a removed group-based communication message set, each removed group-based communication message in the removed group-based communication message set rendered to the second group-based communication interface as visually distinguished from the retained group-based communication message set. Additionally or alternatively, in some other embodiments of the example computer-implemented method, the client device is associated with an authenticated user account identifier associated with a first organization identifier of the plurality of organization identifiers, and the computer-implemented method further includes receiving, from the client device, a policy information request, the policy information request comprising at least a group-based communication channel identifier for the group-based communication channel, the authenticated user account identifier, the first organization identifier, or a combination thereof; and causing rendering, via the client device, of a data retention notification information interface based on the first data retention policy of the first data retention policy set for the common group-based communication channel, the first data retention policy identified based on the policy information request.

In accordance with yet another aspect of the present disclosure, an apparatus for group-based communication channel data management is provided. In at least one example embodiment, the apparatus includes at least one non-transitory memory and at least one processor. The at least one non-transitory memory includes computer-coded instructions stored thereon. The computer-coded instructions, in execution with the at least one processor, configure the apparatus to perform any one of the example computer-implemented methods described above, and/or any combination thereof. In another example embodiment, the apparatus includes means for performing each step of any one of the example computer-implemented methods described above, and/or any combination thereof.

In accordance with yet another aspect of the present disclosure, a computer program product group-based communication channel data management is provided. The computer program product includes at least one non-transitory computer-readable storage medium having computer program code stored thereon. The computer program code is configured, in execution with at least one processor, for performing any of the example computer-implemented methods described above, and/or any combination thereof.

BRIEF DESCRIPTION OF THE DRAWINGS

Figure 1:
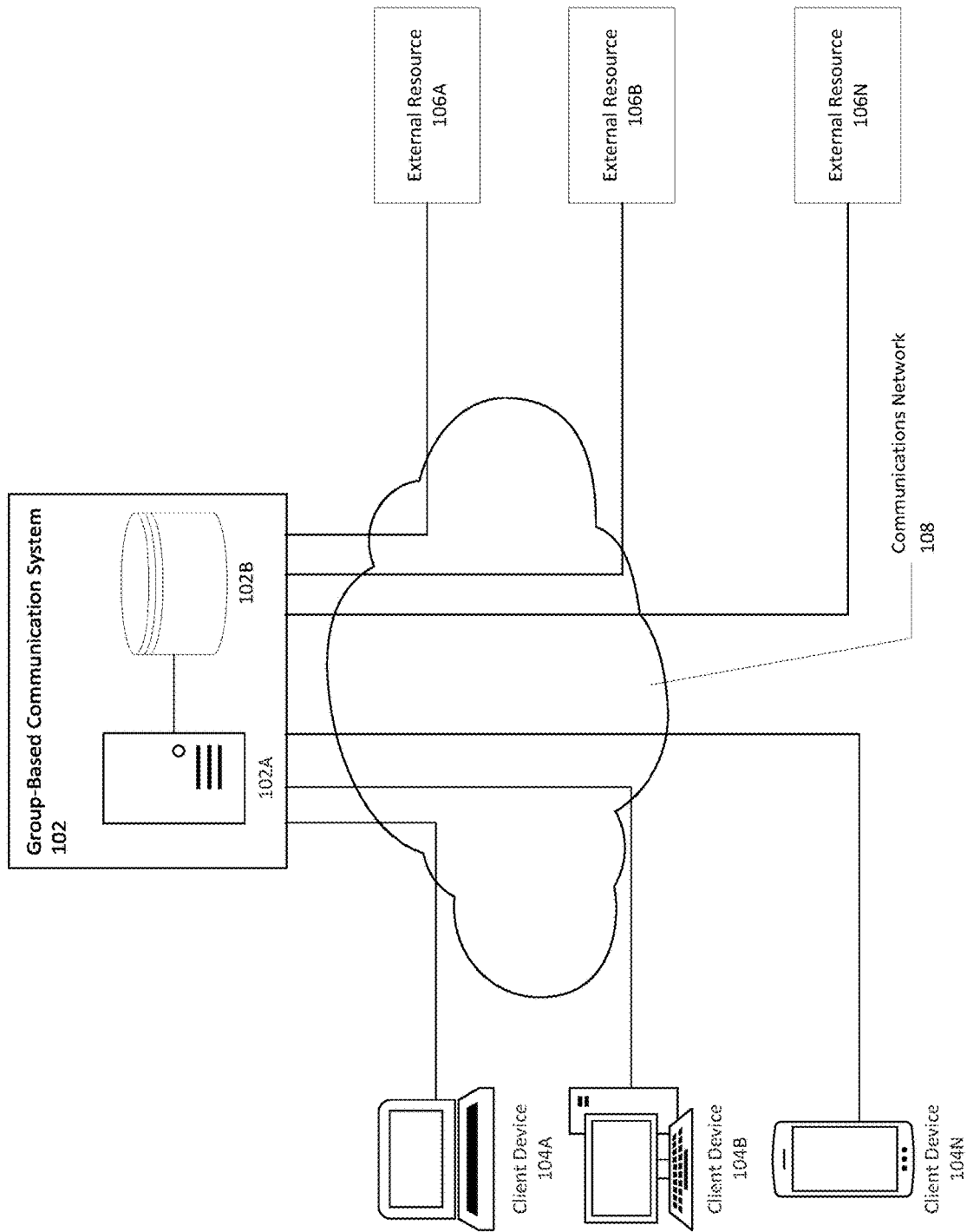
Figure 2A:
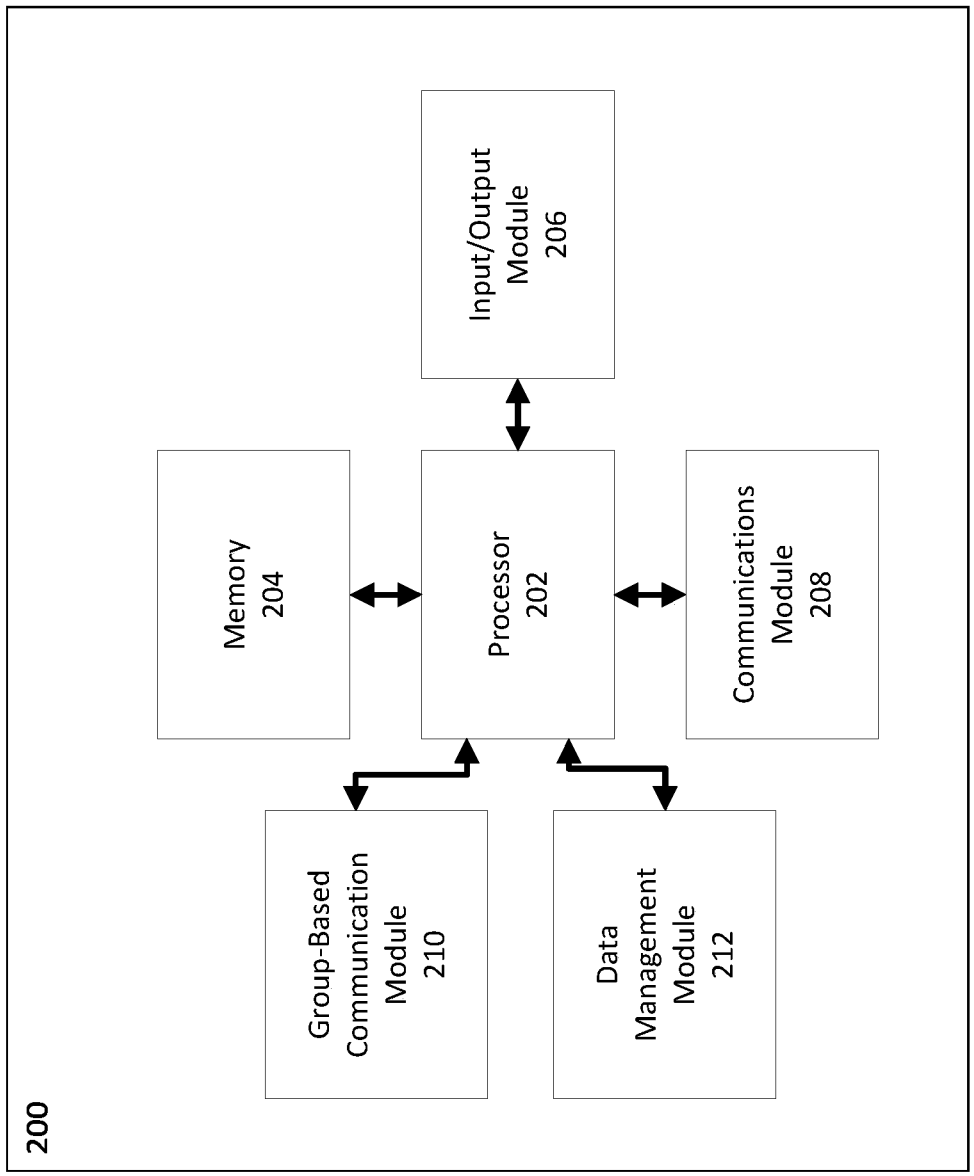
Figure 2B:
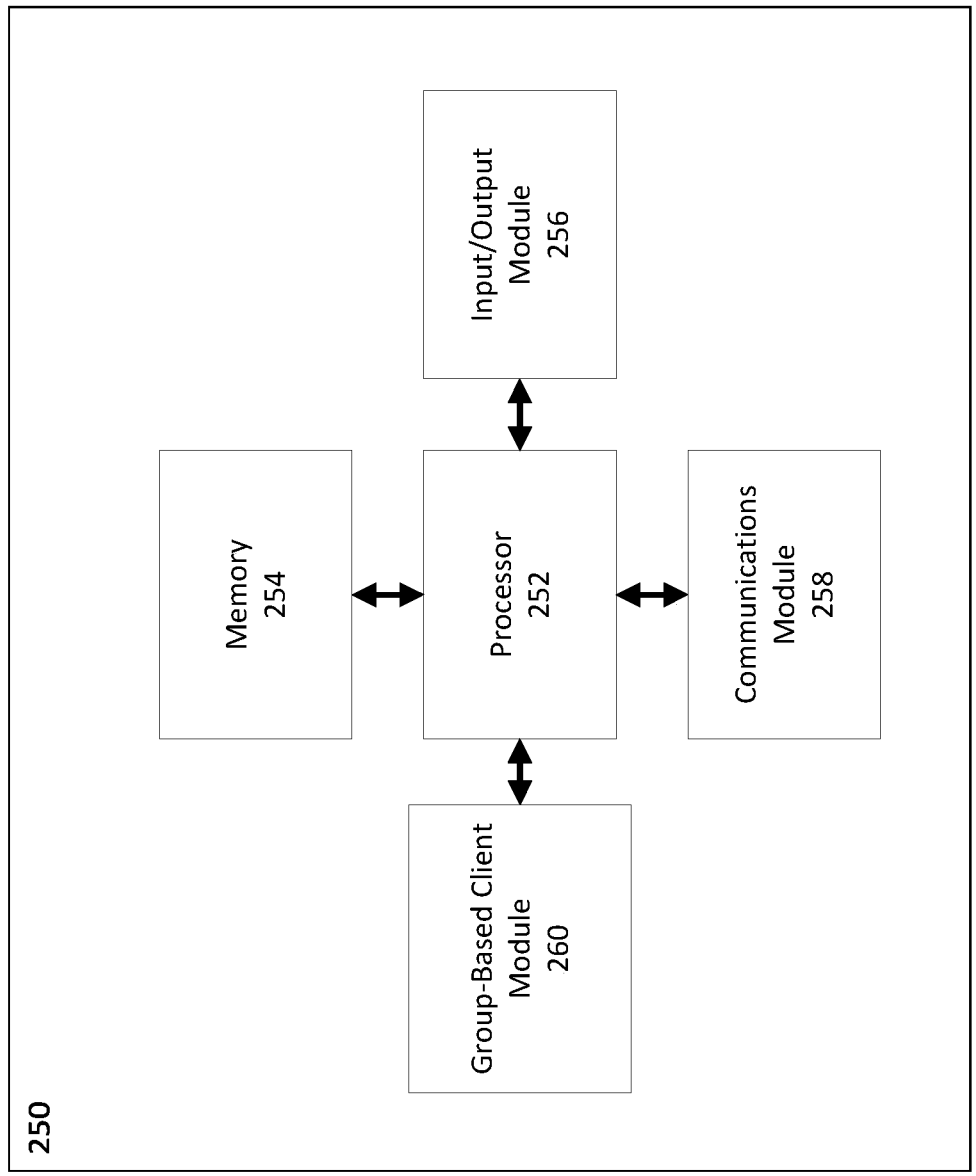
Figure 3A:
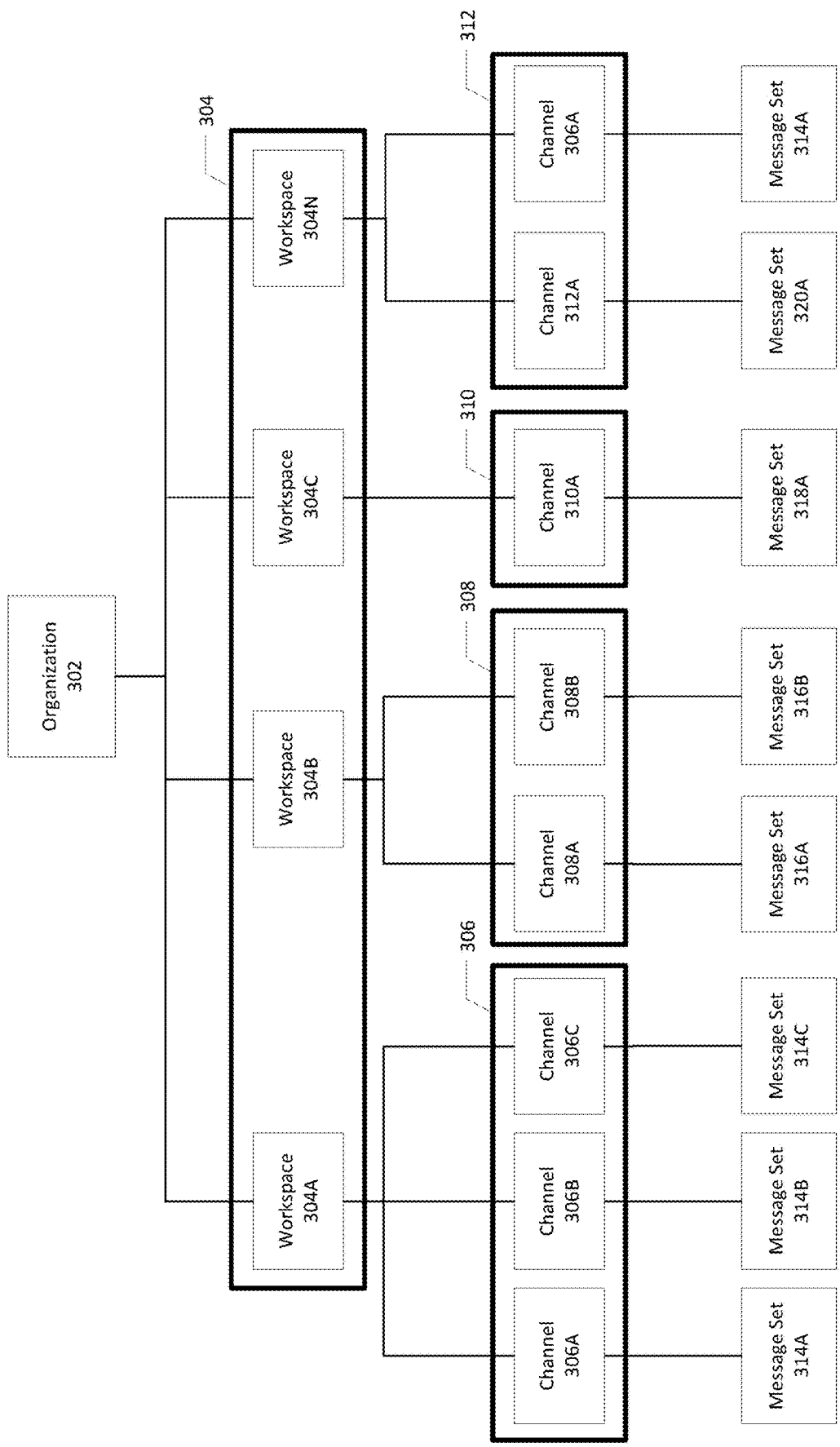
Figure 3B:
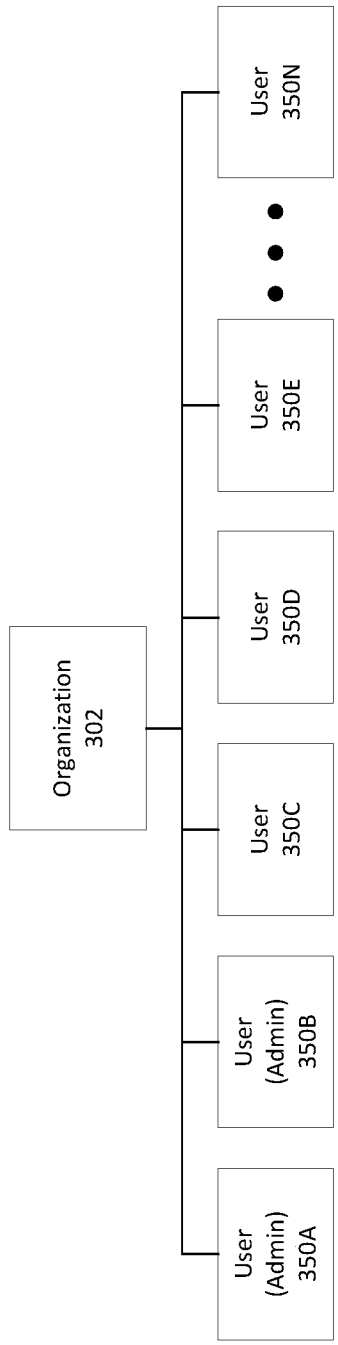
Figure 4:
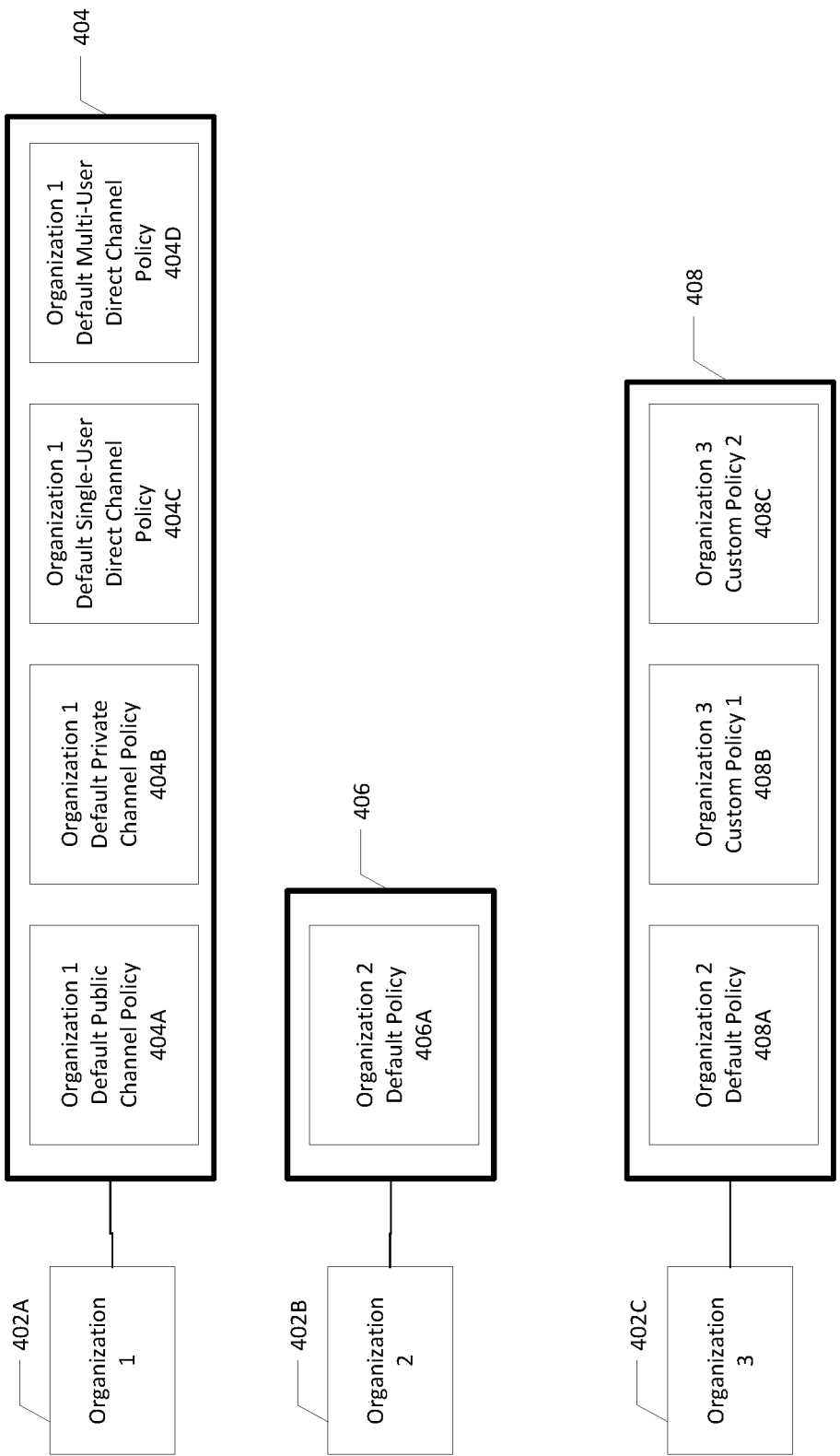
Figure 5:
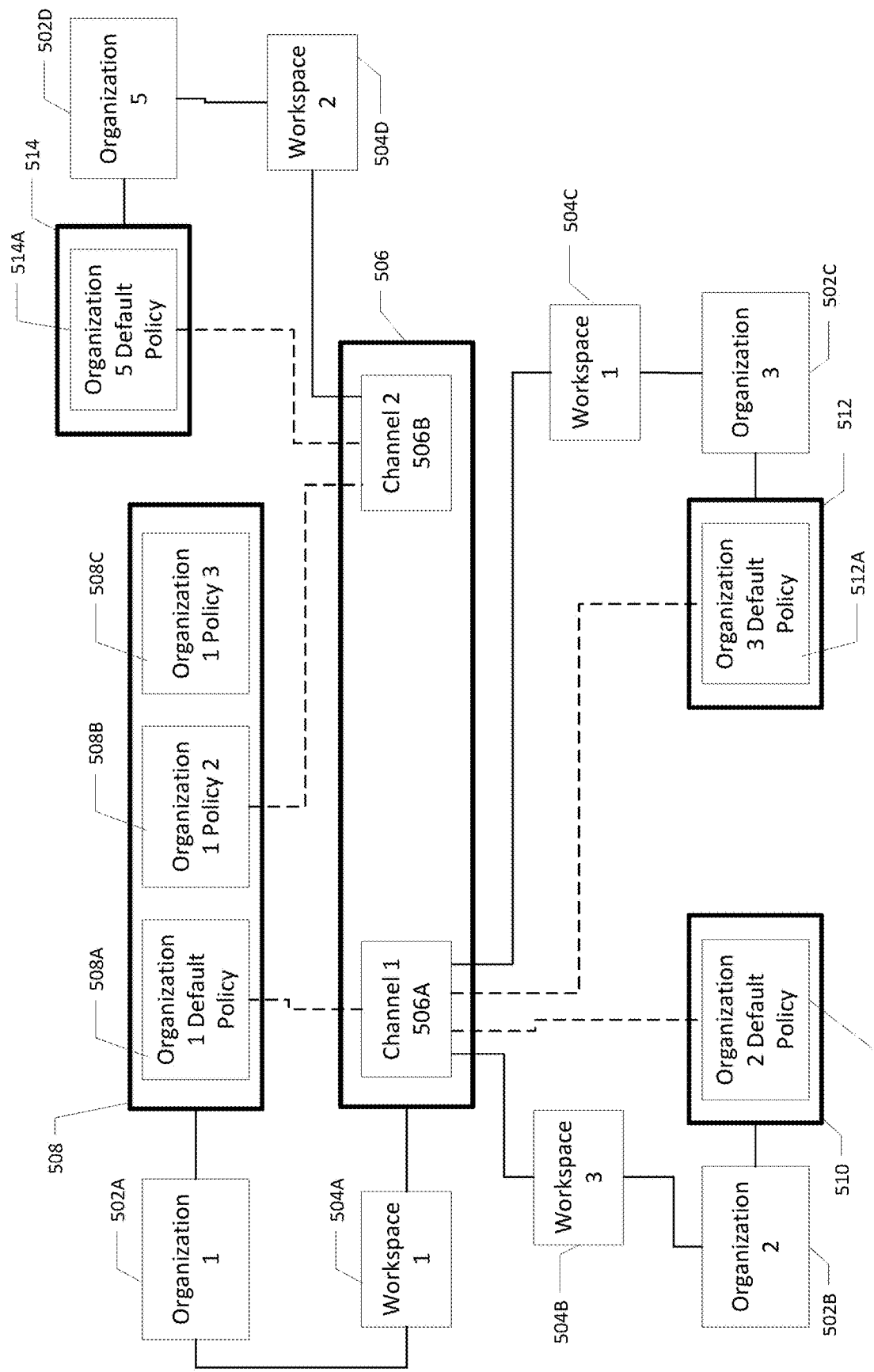
Figure 6:
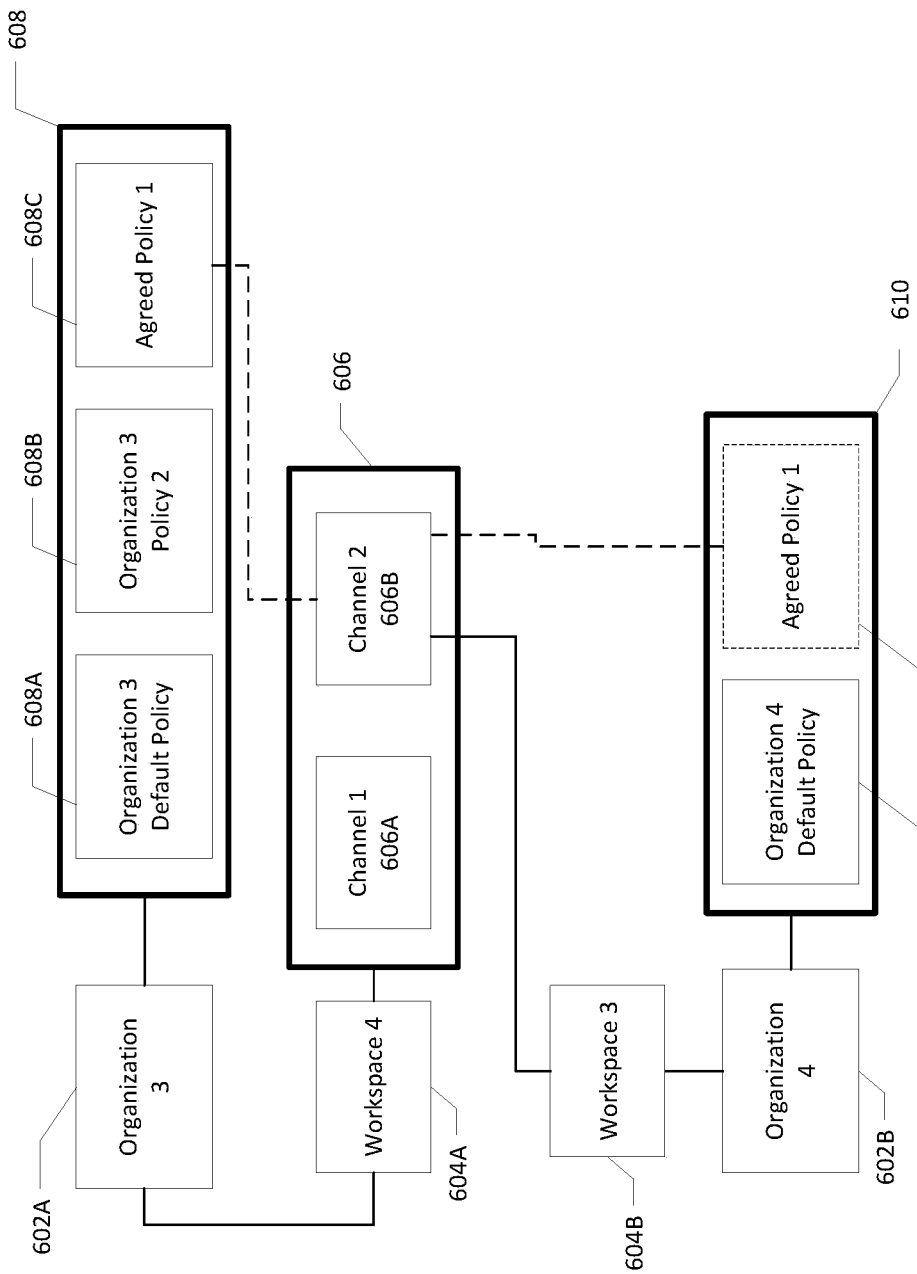
Figure 7:
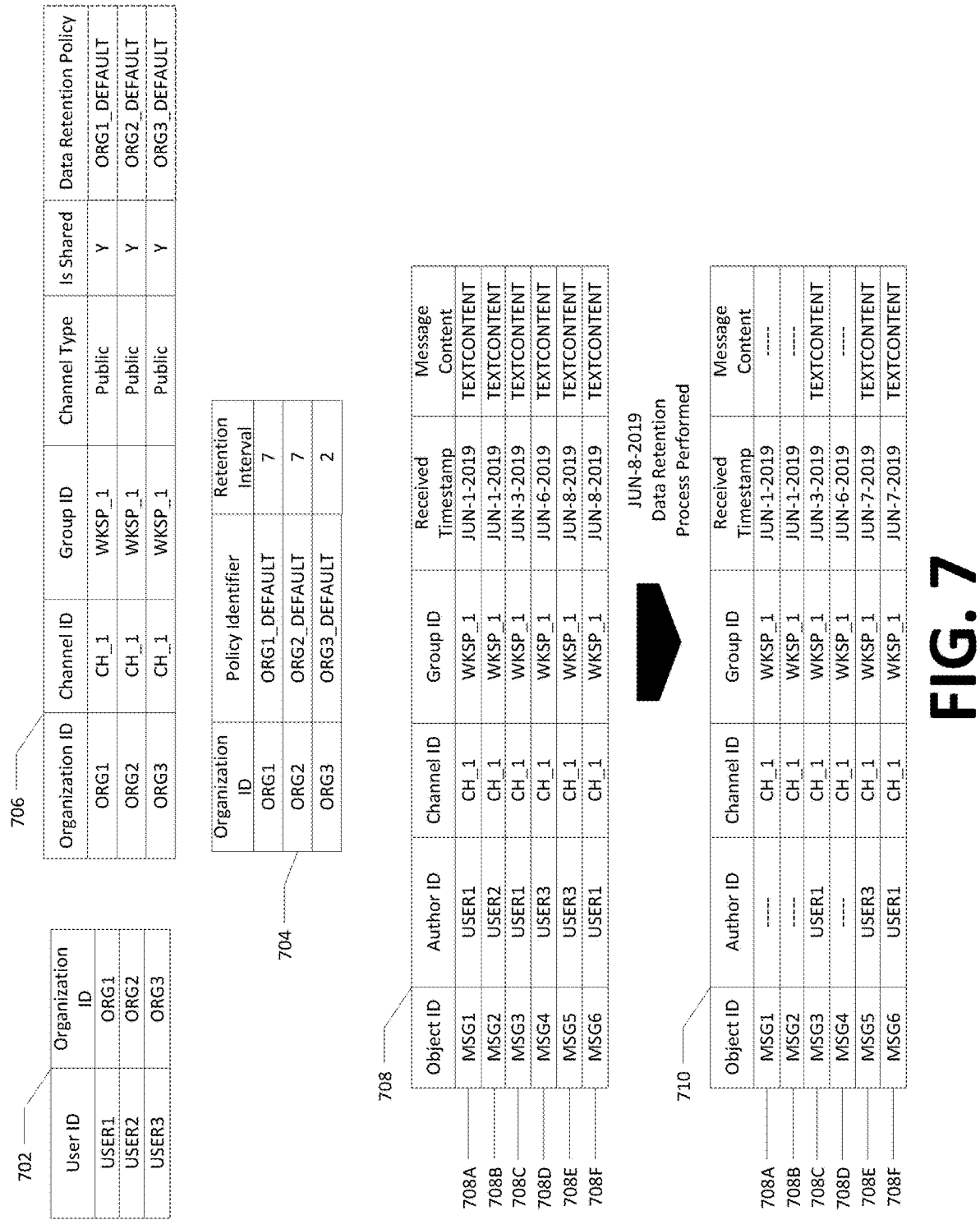
Figure 8:
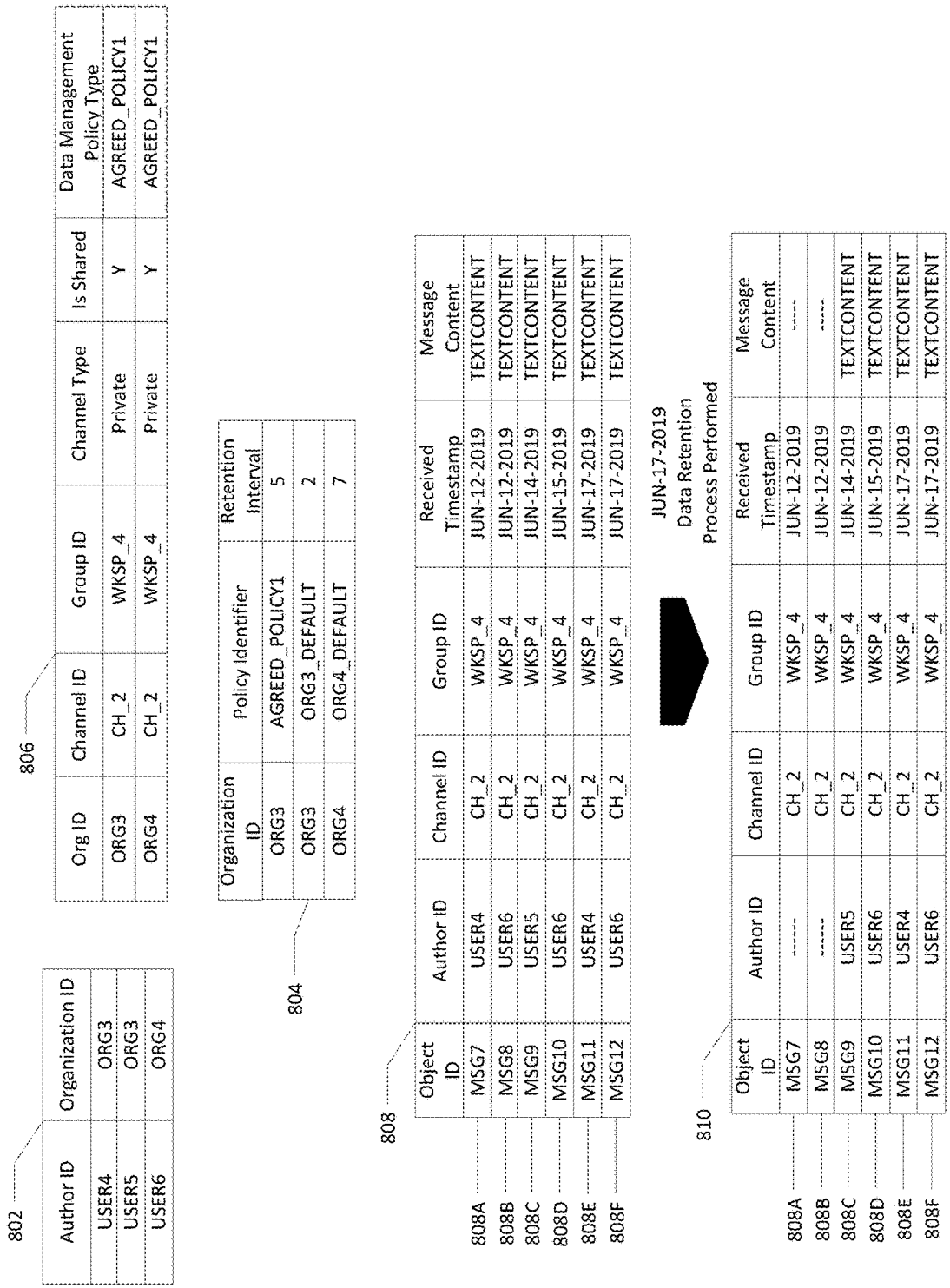
Figure 19:
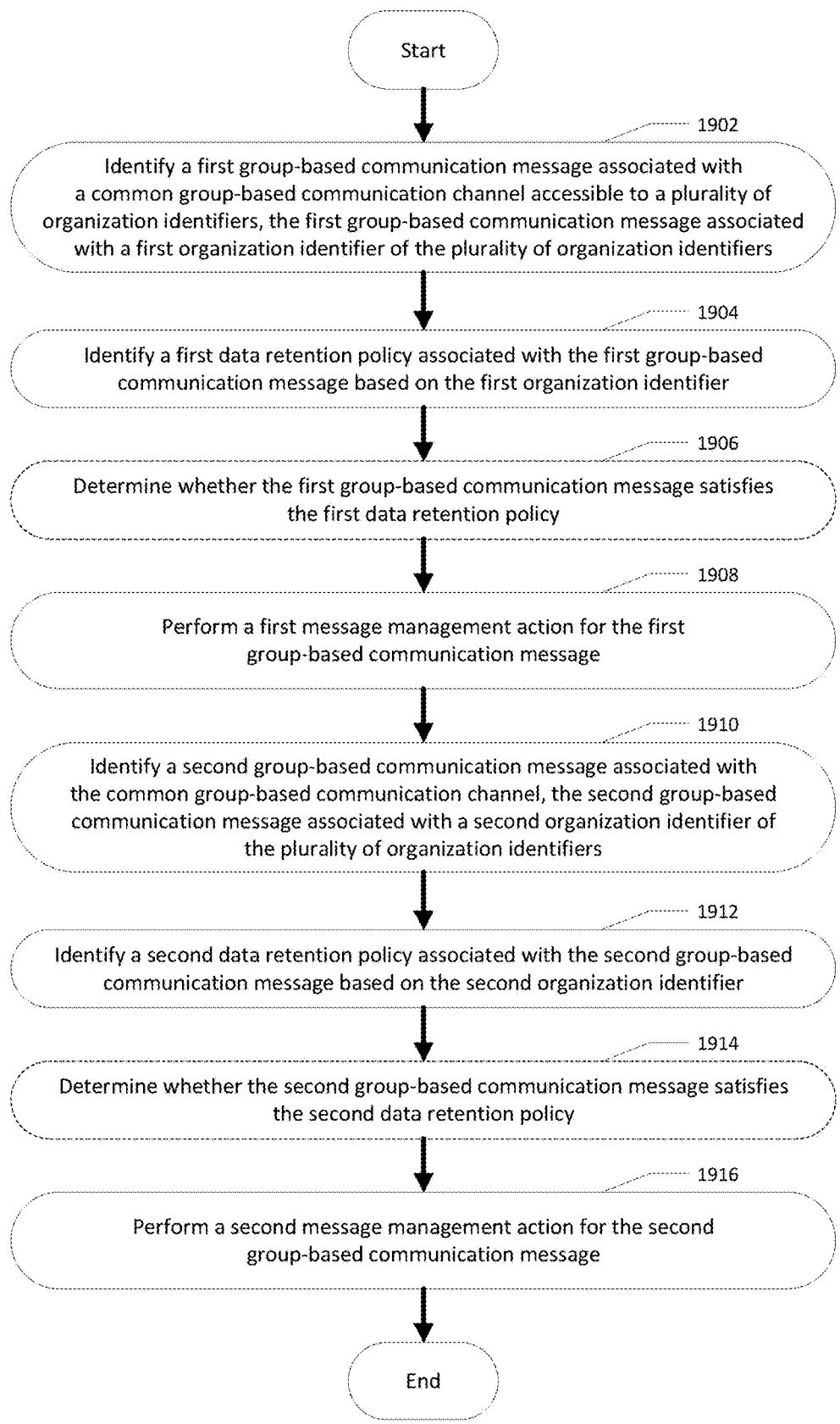
Figure 20:
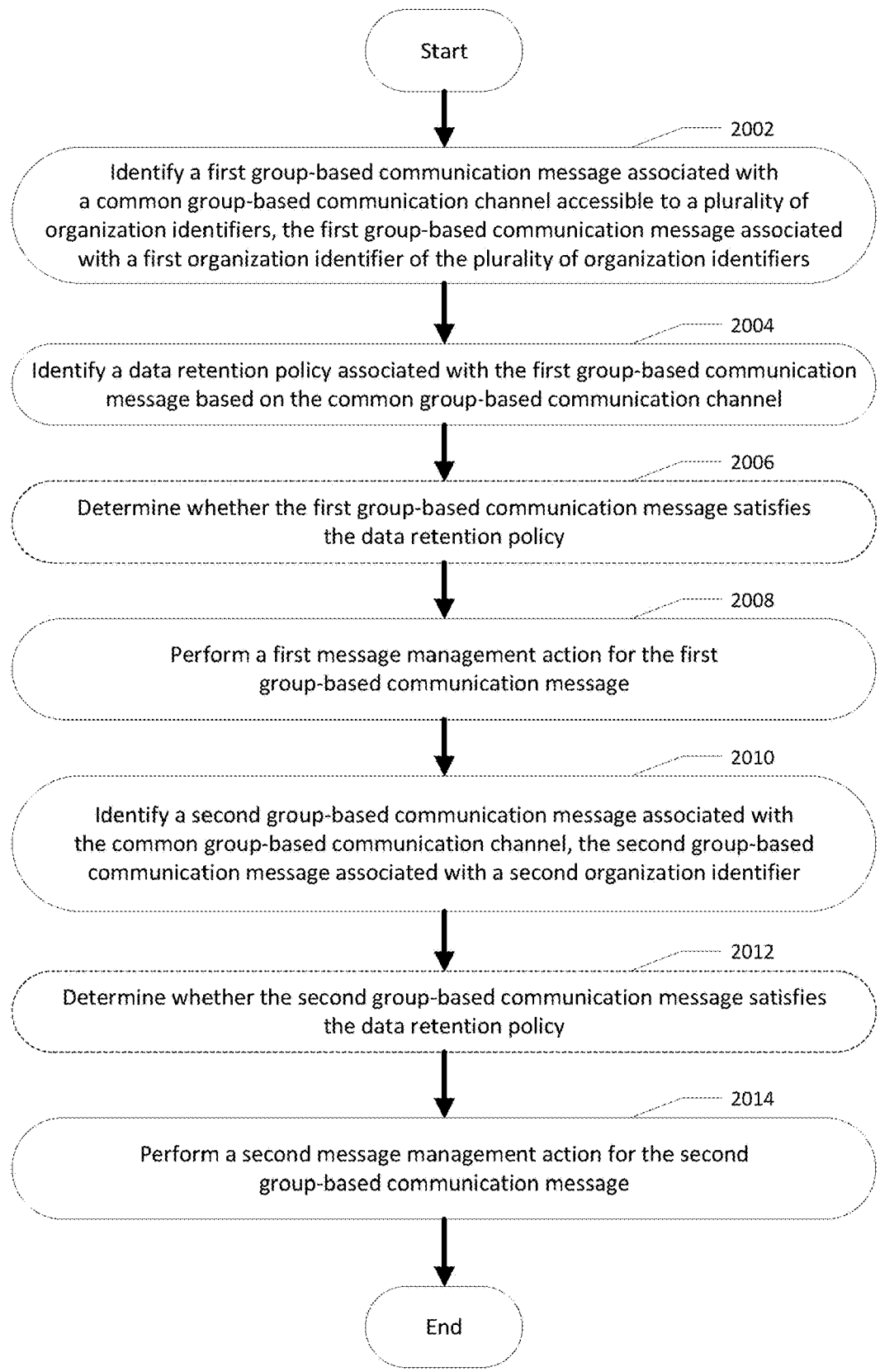
Figure 21:
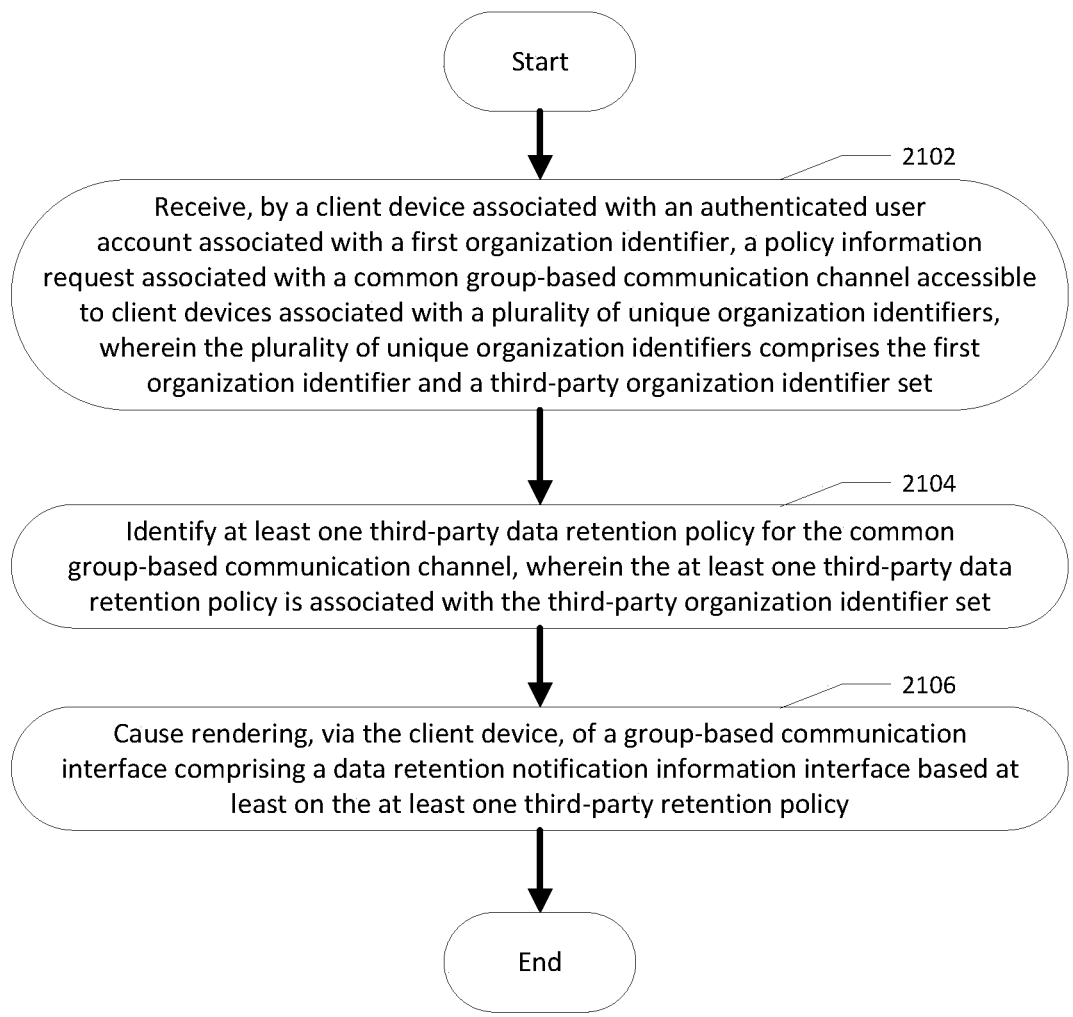
Figure 22:
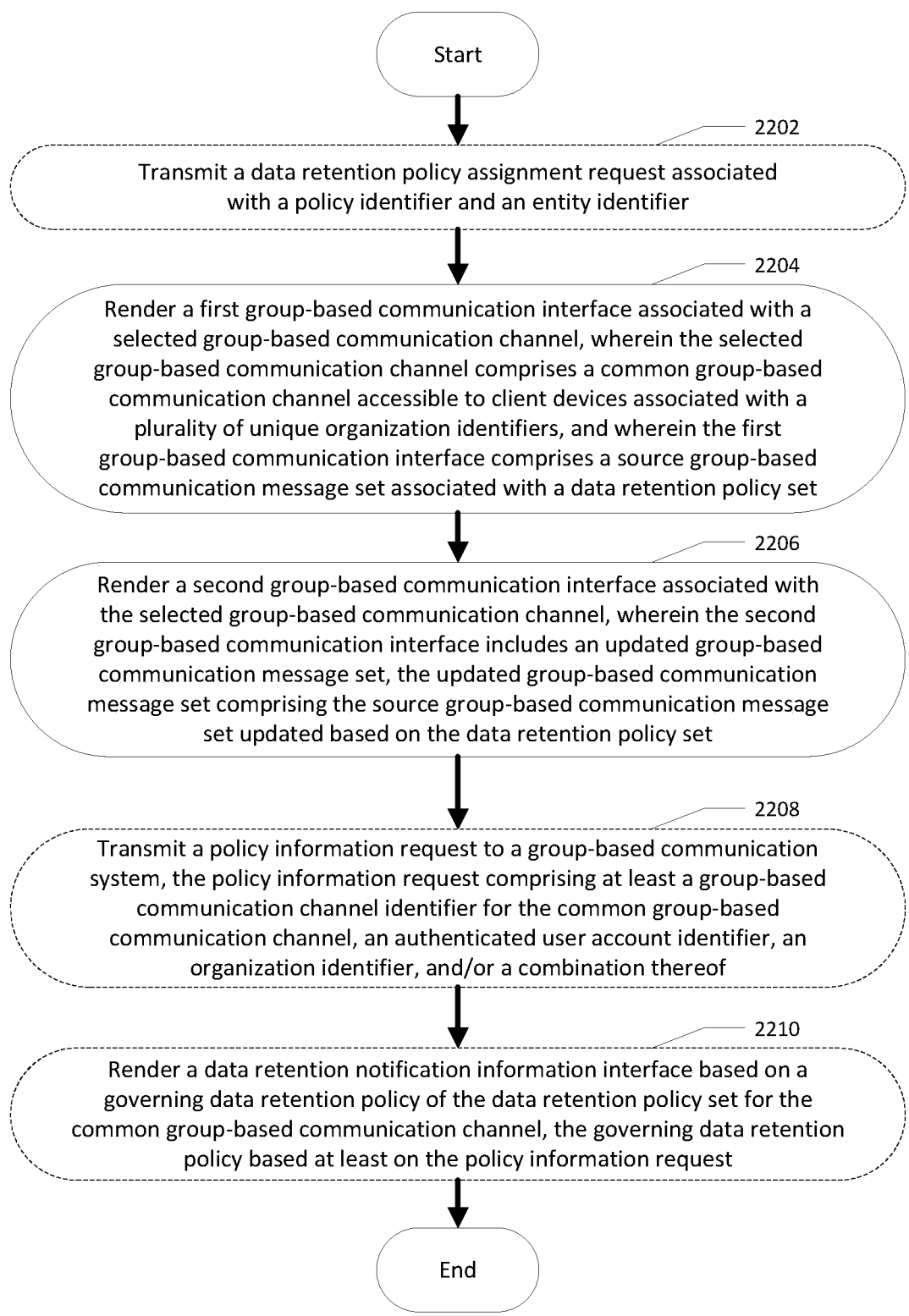

Having thus described the embodiments of the disclosure in general terms, reference now will be made to the accompanying drawings, which are not necessarily drawn to scale, and wherein:

FIG. 1 illustrates a block diagram of a system that may be specially configured within which embodiments of the present disclosure may operate;

FIG. 2A illustrates a block diagram of an example apparatus embodying a group-based communication system that may be specially configured in accordance with an example embodiment of the present disclosure;

FIG. 2B illustrates a block diagram of an example apparatus embodying a client device that may be specially configured in accordance with an example embodiment of the present disclosure;

FIG. 3A illustrates an example visualization of data objects and associations therein managed by an example group-based communication system, in accordance with at least one example embodiment of the present disclosure;

FIG. 3B illustrates yet another example visualization data objects managed by an example group-based communication system, in accordance with at least one example embodiment of the present disclosure;

FIG. 4 illustrates an example visualization of data retention policies in association with various organizations as managed by an example group-based communication system, in accordance with at least one example embodiment of the present disclosure;

FIGS. 5 and 6 each illustrate an example visualization of data management for an example workspace including at least one group-based communication channel, in accordance with at least one example embodiment of the present disclosure;

FIGS. 7 and 8 each illustrate an example visualization of data storage and management within a group-based communication system based on one or more data retention policies, in accordance with at least one example embodiment of the present disclosure;

FIGS. 9A, 9B, and 10-18 illustrate flowcharts depicting example operations of example processes, and sub-processes, performed by at least one example apparatus for group-based communication channel data management based on one or more data retention policies, in accordance with at least some example embodiments of the present disclosure;

FIG. 19 illustrates another flowchart depicting example operations of an example process, performed by at least one example apparatus, for group-based communication channel data management based on one or more data retention policies, in accordance with at least some example embodiments of the present disclosure;

FIG. 20 illustrates yet another flowchart depicting example operations of an example process, performed by at least one example apparatus, for group-based communication channel data management based on one or more data retention policies, in accordance with at least some example embodiments of the present disclosure;

FIG. 21 illustrates a flowchart depicting example additional operations of example processes, and sub-processes, performed by at least one example apparatus for group-based communication channel data management based on one or more data retention policies, in accordance with at least some example embodiments of the present disclosure; and FIG. 22 illustrates a flowchart depicting example operations of an example process performed by at least one second example apparatus for group-based communication channel data management based on one or more data retention policies, in accordance with at least some example embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

A group-based communication system is configured to store a plurality of data objects, including various data objects of different types and embodying different data, to enable functionality provided by the group-based communication system. In this regard, a group-based communication system is configured to receive, and subsequently store, group-based communication messages as users post such messages within various group-based communication channels. The group-based communication system may be configured to store group-based communication messages so as to maintain each message in a manner such that the messages may be retrieved for transmission to one or more client device(s) (e.g., for use in rendering a group-based communication interface), edited by one or more user accounts (e.g., the author of the message or one or more administrators associated with the message), or deleted by one or more user accounts (e.g., the author of the message or one or more administrators associated with the message).

In some contexts, however, it is desirable to maintain group-based communication messages based on desired events, time frames, and/or the like. By deleting and/or otherwise making group-based communication messages inaccessible, for example after a particular length of time, the sensitive data embodied by the message may be permanently protected from retrieval by unintended recipients and/or malicious actors such as hackers. As such, example group-based communication systems configured for deleting and/or otherwise making group-based communication messages inaccessible provides users improved security for protecting their confidential, secure, or otherwise important data from falling into the wrong hands. Further, in at least some contexts, improved control over data retention enables configuration such that data may be retained differently based on applicable regulations and/or restrictions. For example, in this regard, appropriate configurations may be performed such that data linked to different entities (e.g., different organizations, workspaces, channels, and/or the like) may be retained only for minimal required time intervals before deletion to minimize prospective risk due to data exposure, or to be deleted within required time intervals, either of which may be the same or different between multiple entities.

Data stored within a group-based communication system may be managed based on one or more data retention policies. In some embodiments, for example where a group-based communication system is configured to maintain a plurality of associated data entities, the group-based communication system may be configured to enable assigning of one or more data retention policies to one or more entities in the group-based communication system. In an example context, each authenticated user account is associated with an organization, and each organization may be associated with any number of group-based workspaces, each group-based workspace further associated with any number of group-based communication channels within which group-based communication messages may be posted and stored accordingly by the group-based communication system. In some example embodiments, the group-based communication system is configured to enable one or more authenticated user accounts associated with an organization to assign data retention policies to any of the entities associated with the organization to enable data management stored data associated with said entities based on the assigned data retention policies. The group-based communication system may be configured to process the data retention policies in any of a number of ways, for example where one or more assigned data retention policies operates as a default for some or all higher-level entities and/or lower-level entities as compared to the entity to which the data retention policy was assigned.

In some embodiments, a group-based communication system is configured to enable creation of and access to a common group-based communication channel accessible to a plurality of organizations. For example, an owner organization that created a group-based communication channel within a particular workspace may "share" the workspace such that it is accessible to another organization within a second workspace associated with the second organization, or otherwise accessible by a limited subset of authenticated user accounts associated with the second organization and permissioned to access the common group-based communication channel. In this regard, the common group-based communication channel may include data, such as group-based communication messages, posted by and/or otherwise associated with any number of authenticated user accounts. In this regard, an advantageous group-based communication system provides sufficient functionality to enable organizations to ensure that data is maintained as desired to meet data security, data privacy, and/or other goals and/or requirements of each organization having access to the common group-based communication channel.

In this regard, embodiments are provided for data management for a common group-based communication channel. Some embodiments enable management of data within a common group-based communication channel based on an author-based policy identification process. In this regard, an example group-based communication system is configured to manage data, stored associated with a common group-based communication system, differently based on the organization and/or one or more other entities associated with the data. For example, in this regard the group-based communication system may identify an organization associated with each group-based communication message within a group-based communication message set associated with a common group-based communication channel. The data retention policy identified for each organization may be assigned to the common group-based communication channel and/or an associated entity by each organization, such that the organization configures the group-based communication system to manage data associated with the organization based on the identified data retention policy corresponding to the organization. In this regard, the group-based communication system is configured such that, when desired, a common group-based communication system may be managed based on the individualized desires, goals, and/or requirements of each organization interacting with the common group-based communication channel.

Additionally or alternatively, some embodiments enable management of data within a common group-based communication channel based on a shared data retention policy. The shared data retention policy may be identified by the group-based communication system as applying to data associated with any number of the plurality of organizations having access to the common group-based communication channel. For example, in one such example context, an example group-based communication system is configured to identify a data retention policy governing data associated with a number of organizations based on an agreed policy-based policy identification process. The agreed policy-based policy identification process may include one or more operations for identifying an agreed data retention policy that all organizations having access to the common group-based communication channel have agreed may be used to govern storage of all data within the common group-based communication channel. In this regard, the agreed data retention policy, and/or another shared policy, may overrule an otherwise default data retention policy for one or more organizations. Such management based on a shared data retention policy may enable an organization to configure the group-based communication system to force stricter data management rules on all associated organizations, for example to ensure that data privacy and/or data security requirements, desires, or the like, are met. In a circumstance where a common group-based communication channel is likely to have data that one organization requires to be managed under specific rules, for example highly confidential information requiring strict and short-term data management, some example embodiments described herein provide the flexibility to have data governed as such without affecting data storage of other data stored within the group-based communication system. In this regard, data management based on data retention policies, as described herein, improves data processing and storage while effectively providing organizations functionality to enable data management to meet desires, requirements, and/or the like.

Definitions

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "identifier" refers to electronically managed information that is uniquely correlated with (i.e., identifies) a particular data object, set of data, or information. In some embodiments, an identifier includes one or more of a binary data value, a numerical data value, ASCII text, text encoded via another encoding schema, a pointer, a memory address, or a combination thereof.

The term "client device" refers to computer hardware and/or software that is configured to access a service made available by a server, such as a group-based communication server of a group-based communication system. The server is often (but not always) on another computer system, in which case the client device accesses the service by way of a network. Client devices may include, without limitation, smart phones, tablet computers, laptop computers, wearables, personal computers, enterprise computers, and the like. Client devices may be associated with a user. The association may be created by the client device transmitting registration information for user to the group-based communication server. In some instances, a client device may be temporarily associated with a user and/or authenticated user account (e.g., only when a user is logged onto the group-based communication system app). In such instances, a user may login via a client device to execute an authenticated session via the client device and associated with a particular authenticated user account.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation originated from one user who has been granted access to the group to another entity who has not been granted access to the group. Group identifiers are used to associate data, information, messages, etc., with specific groups.

The term "group-based communication system" refers to a communications software platform and associated hardware that is configured to support and maintain a plurality of group-based communication interfaces and all associated functionality. Group-based communication system users are organized into organization groups (e.g., employees of different companies may be separate organization groups) and each group interacts with the system via a respective group-based communication interface. For example, the group-based communication system might support, among others, a Slack Corporation group-based communication interface and an ACME Corporation group-based communication interface The term "external resource" refers to a software application, program, platform, or service associated with a third-party controlled system, and that is configured for authenticated communication with a group-based communication system to provide particular functionality to a client device connected the group-based communication system. An external resource provides functionality not provided natively by the group-based communication system. The external resource operates on a compiled code base or repository that is separate and distinct from that which supports the group-based communication system. In some embodiments, the external resource may communicate with the group-based communication system, and vice versa, through one or more application program interfaces (APIs). In some embodiments, the external resource receives tokens and/or other authentication credentials that are used to facilitate secure communication between the external resource and the group-based communication system, such as for navigating the network security layers or protocols (e.g., network firewall protocols) securing the group-based communication system. Additionally or alternatively, in some embodiments, a group-based communication system stores one or more authentication token(s) for accessing functionality provided by the external resource. In some embodiments, access to an external resource is managed on a workspace level. In other embodiments, access to external resource is managed on an organization level.

The term "group-based communication interface" refers to a virtual communications environment configured to facilitate user interaction with a group-based communications system. In some embodiments, a group-based communication interface provides interface elements for interacting with a group-based communication system within the context of a selected workspace and group-based communication channels therein, and/or other group-based communication channels accessible to a particular authenticated user account accessing the group-based communication system via an authenticated session executed via a client device. Each group-based communication interface is accessible and viewable to a select group of users, such as a group of employees of a business or organization (e.g., the Slack Corp. interface would be accessible and viewable to the Slack employees however the ACME Corporation group-based communication interface would not be accessible and viewable to Slack employees). The group-based communication interface includes a plurality of group-based communication channels (e.g., a marketing channel, sales channel, accounting channel, etc.). In some embodiments, a group-based communication interface comprises one or more sub-interfaces, for example a sidebar interface, content interface, and flex interface, or combination thereof (as defined below).

The term "data retention notification information interface" refers to a virtual rendered environment that includes one or more interface elements rendering information included in a data retention policy and/or associated with the data retention policy governing a selected group-based communication channel. In some embodiments, the data retention policy is rendered to a client device transmitted to the client device in response to a policy information request from the client device.

The terms "workspace data object," "group-based workspace," and "workspace" refer to electronically managed data including a group of group-based communication channels and authenticated user accounts permissioned to access one or more of the group-based communication channels therein. In some embodiments, a workspace data object is configured to enable one or more authenticated user account(s) permissioned as administrators to manage access to the workspace, for example to invite one or more authenticated user account(s) to access the workspace and/or terminate access rights to one or more authenticated user account(s) previously invited to the workspace. The term "workspace identifier" refers to one or more identifiers by which a workspace within a group-based communication system may be uniquely identified. An organization or other entity within a group-based communication system may be associated with any number of workspace identifiers.

The terms "organization data object" and "organization" refer to one or more data structures by which a set of workspaces and/or group-based communication channels are associated with a particular entity. The term "organization identifier" refers to one or more items of data by which an organization may be uniquely identified. A non-limiting example of an organization identifier comprises American Standard Code for Information Interchange (ASCII) text, a pointer, a memory address, a unique numerical and/or string value, and the like. The term "third-party organization identifier," with respect to a first organization identifier, refers to any other organization identifier different than the first organization identifier. For example, from the perspective of an authenticated user account associated with a first organization identifier accessing a common group-based communication channel accessible to a plurality of organization identifiers, a third-party organization identifier refers to any other of the plurality of organization identifiers.

The term "user" refers to an individual, group of individuals, business, organization, and the like. Users referred to herein are discussed largely in connection with client device enabled activity for accessing a group-based communication interface (or set of group-based communication interfaces) of a group-based communication system. A user may be associated with one or more authenticated user account(s), as defined herein.

The term "authenticated user account" refers to information corresponding to authentication credentials (e.g., a username and password combination) for accessing particular functionality of a group-based communication system. An authenticated user account is associated with any of a variety of information, including, for example and without limitation, a user identifier, one or more group-based communication channel identifiers associated with group-based communication channels that the user has been granted access to (i.e., accessible group-based communication channels), one or more group identifiers for workspaces with which the user is associated (e.g., accessible workspaces), one or more organization identifiers for organizations with which the user is associated, an indication as to whether the user is an owner of any group-based communication channels, an indication as to whether the user has any group-based communication channel restrictions, a plurality of group-based communication messages, an emoji, a plurality of conversations, a plurality of conversation topics, an avatar, an email address, a real name (e.g., John Doe), a username (e.g., jdoe), a password, a real name, a time zone, a status, and the like. In some embodiments, a user utilizes a client device to transmit authentication credentials corresponding to a particular authenticated user account to a group-based communication system, and in response initiates an authenticated session configured to enable access to functionality and/or information accessible to the authenticated user account via the client device during the authenticated session.

The term "group-based communication channel" and "channel" refers to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel. In some embodiments, a group-based communication system is configured to manage various types of group-based communication channels, which may be identified based on a "group-based communication channel type." Non-limiting examples of group-based communication channels include a single-user direct group-based communication channel (e.g., for communications between two authenticated user accounts), a multi-user direct group-based communication channel (e.g., for communications between a plurality of authenticated user accounts), a public group-based communication channel (e.g., accessible to all authenticated user accounts within a workspace), a private group-based communication channel (e.g., accessible to invited and/or specific authenticated user accounts within a workspace), an external resource group-based communication channel (e.g., for communications from and/or to an external resource accessible within a workspace or organization), or any combination thereof. The term "group-based communication channel set" refers to any number of group-based communication channels. A group-based communication channel set may be grouped by any parameter value for one or more parameters of a group-based communication channel.

In some embodiments, one group-based communication channel may be associated with one or more organization identifiers. A group-based communication channel associated with more than one organization identifiers is a "common group-based communication channel." A common group-based communication channel is accessible within one or more group-based workspaces for the organizations with which the common group-based communication channel is associated. It should be appreciated that, in some embodiments, an "owner organization" that created the common group-based communication channel is uniquely identified as associated with the common group-based communication channel, for example to enable configuration of one or more settings of the common group-based communication channel only by one or more authenticated user account(s) associated with the owner organization.

The terms "group-based communication channel identifier" and "channel identifier" refer to one or more identifiers by which a group-based communication channel may be uniquely identified by a group-based communication system. In some embodiments, a group-based communication channel identifier includes a group-based communication channel includes a unique channel identifier within a particular associated workspace, such that the channel identifier is formed of the unique channel identifier within the workspace and the workspace identifier for the associated workspace. A group-based communication channel identifier associated with a common group-based communication channel is a "common group-based communication channel identifier."

The terms "group-based communication message," "group-based message," and "message" refer to any electronically generated device-rendered object provided by a user using a client device to a group-based communication system and that is configured for display within a group-based communication channel. Group-based communication messages may include any text, file, image, video, audio or combination thereof provided by a user (using a client device). For instance, the user may provide a group-based message that includes text as well as an image and a video within the group-based message as message contents. In such a case, the text, image, and video would comprise the group-based message or device rendered object. Each message sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like. In some embodiments, the user may provide a group-based message by uploading a file via an application programming interface (API) and the file may be renderable within a group-based communication channel. The terms "group-based communication message set" and "message set" refer to zero or more group-based communication messages. For example, in some embodiments, a group-based communication message set associated with a particular group-based communication channel identifier refers to any number of group-based communication messages posted to the group-based communication system by users within the group-based communication channel corresponding to the group-based communication channel identifier.

The term "entity" refers to a data object managed by a group-based communication system. In at least one example context, the term "entity" refers to an organization, a workspace, and/or channel. In some embodiments, a group-based communication system is configured to enable assignment of one or more data retention policies to an entity. The term "entity identifier" refers to one or more identifiers by which an entity may be uniquely identified within a group-based communication system.

The term "data retention policy" refers to electronically managed data representing one or more automatically generated and/or user-configured rule set(s) for managing storage of group-based communication messages associated with a particular entity, and/or one or more sub-entities thereof. in at least some example embodiments, a data retention policy is linked to an organization that created the data retention policy, such that the data retention policy may be assigned to any number of entities associated with the organization (e.g., assigned to the organization itself, assigned to one or more workspace(s) associated with the organization, assigned to one or more channels associated with the organization, and/or the like). In some embodiments, a data retention policy comprises one or more sub-data retention policies assigned to sub-entities thereof. For example, in at least some embodiments, a data retention policy assigned to a particular workspace includes a private channel data retention policy for assignment to all group-based communication channels having a private group-based communication channel type, a public channel data retention policy for assignment to all group-based communication channels having a public group-based communication channel type, and/or a sub-data retention policy for assignment to one or more particular group-based communication channels within the workspace (e.g., channels associated with a particular group-based communication channel identifier, or any of a set of group-based communication channel identifiers). In this regard, in an example context, a single data retention policy includes one rule set to be assigned to all entities and/or entity types. In another example context, a single data retention policy includes a plurality of rule sets, each to be assigned to one or more entities and/or entity types.

In some embodiments, a data retention policy is configured to include configuration settings regarding an appropriate message management action to perform in a circumstance where a group-based communication message fails to satisfy the data retention policy. For example, in at least one embodiment, a data retention policy includes one or more configurable settings that represent an appropriate message management action for a group-based communication message that has been edited, has been archived in one or more archive records, and/or includes one or more attachments and/or files. In some such embodiments, a data retention policy includes a configurable setting identifying an appropriate message management action for each circumstance. In an example context, the data retention policy is configurable to delete all edits, archived records, and/or attachments associated with a message in a circumstance where the message fails to satisfy the governing data retention policy. Additionally or alternatively, in another example context, a data retention policy is configurable to delete all edits and attachments, but retain archived records for a message in a circumstance where the message fails to satisfy the governing data retention policy.

In some embodiments, a group-based communication system is configured to enable assignment of a data retention policy to one or more entities (e.g., an organization, a workspace, a channel, and/or a message), such that the group-based communication system manages the data assigned to the data retention policy, and/or data associated therewith (e.g., group-based communication messages within an assigned group-based communication channel), based on the rule set represented by the data retention policy. In some embodiments, a data retention policy may be determined based on the hierarchical structure of data objects within a group-based communication system. For example, in some embodiments, if a channel has not been assigned a data retention policy, the group-based communication system will make such a determination and attempt to use the data retention policy assigned to the workspace associated with the channel. Similarly, additionally or alternatively in some embodiments, if a workspace has not been assigned a data retention policy, the group-based communication system will make such a determination and attempt to use the data retention policy assigned to the organization associated with the workspace. An example data retention policy represents a length of time that group-based communication message assigned to the data retention policy, or within entities that the data retention policy is assigned to (e.g., channels, workspaces, and/or organizations), shall remain stored before deletion (either permanent or temporary) by the group-based communication system. The term "retention interval" refers to the length of time the data shall be stored within the group-based communication system. It should be appreciated that the group-based communication system, or an associated system or sub-system (e.g., a data management system), may be configured to analyze stored group-based communication messages to determine and/or execute an appropriate message management action, such as retaining the message or deleting the message, based on the appropriate data retention policy governing the message.

In some embodiments a data retention policy for an entity is determined based on a hierarchy of entity associations within the group-based communication system. For example, in some embodiments, a data retention policy assigned to a sub-entity overrides the data retention policy of a higher-level entity, such that a data retention policy assigned to a group-based communication channel overrides a data retention policy assigned to the organization associated with the group-based communication channel, for example. In other embodiments, a data retention policy assigned to a higher-level entity overrides the data retention policy of a sub-entity, such that a data retention policy assigned to an organization overrides the data retention policy of a group-based communication channel associated with the organization, for example. In yet other embodiments, a data retention policy for a sub-entity overrides the data retention policy of a higher-level entity only if the data retention policy for the sub-entity provides more strict data retention rules than that of the higher-level entity. For example, in some such embodiments, a data retention policy for a group-based communication channel overrides a data retention policy for an organization associated with the group-based communication channel when the data retention policy for the group-based communication channel defines a shorter retention interval than the retention interval defined by the data retention policy for the organization. In this regard, in some embodiments, a group-based communication system is configured to identify a data retention policy that governs certain data, such as messages, based on the data retention policies assigned to the various higher-level entities associated with the data.

The term "data retention policy generation request" refers to electronically managed data received by a group-based communication system, where the electronically managed data represents a user request to generate and store a second data retention policy. In at least some embodiments, a data retention policy generation request includes at least an organization identifier that uniquely identifies the organization requesting to generate the data retention policy, and with which the second data retention policy will be associated, and data embodying one or more data management rule(s) that the second data retention policy shall represent. In some embodiments, a data retention policy generation request includes additional and/or optional data, for example an entity identifier that the second data retention policy is to be assigned to automatically upon creation.

The term "organizational data retention policy" refers to a data retention policy assigned to, or configured for assignment to, an organization. In this regard, an organizational data retention policy represents data management rules for maintaining all content and/or message data stored by the group-based communication system that is associated with the organization. For example, in at least one embodiment, a group-based communication system is configured to utilize an organizational data retention policy for determining how to maintain all group-based communication messages in all group-based communication channels within workspaces associated with the organization. In some embodiments, a data retention policy is specially configured including specific parameters that identify the data retention policy as an organizational data retention policy configured for assignment to one or more organization(s). The term "organizational retention policy assignment request" refers to electronically managed data representing a user request to assign a data retention policy with an organization. In this regard, the assigned data retention policy may be referred to as an "organizational data retention policy" after assignment.

The term "workspace data retention policy" refers to a data retention policy assigned to, or configured for assignment to, at least one workspace associated with a particular organization. In this regard, an workspace data retention policy represents data management rules for maintaining all content and/or message data stored by the group-based communication system that is associated with the associated workspace(s). For example, in at least one embodiment, a group-based communication system is configured to utilize a workspace data retention policy for determining how to maintain all group-based communication messages in all group-based communication channels within the associated workspace(s). In some embodiments, a data retention policy is specially configured including specific parameters that identify the data retention policy as a workspace data retention policy configured for assignment to one or more workspace(s). The term "workspace retention policy assignment request" refers to electronically managed data representing a user request to assign a data retention policy with one or more workspace(s). In this regard, the assigned data retention policy may be referred to as a "workspace data retention policy" after assignment.

The term "channel data retention policy" refers to a data retention policy assigned to, or configured for assignment to, at least one channel associated with a particular organization. In this regard, a channel data retention policy represents data management rules for maintaining all content and/or message data stored by the group-based communication system that is associated with the associated channel(s). For example, in at least one embodiment, a group-based communication system is configured to utilize a channel data retention policy for determining how to maintain all group-based communication messages in each assigned group-based communication channel. In some embodiments, a data retention policy is specially configured including specific parameters that identify the data retention policy as a channel data retention policy configured for assignment to one or more group-based communication channel(s). The term "channel data retention policy assignment request" refers to electronically managed data representing a user request to assign a data retention policy with one or more group-based communication channel(s). In this regard, the assigned data retention policy may be referred to as a "channel data retention policy" after assignment.

In some embodiments, a group-based communication system is configured to identify and utilize a proper data retention policy for use in maintaining a group-based communication message, for example when multiple entities associated with the group-based communication message are each associated with various data retention policies. For example, in at least some embodiments, a group-based communication system is configured to identify and utilize an organizational data retention policy for managing a group-based communication message even if another, lower-level entity is associated with a different data retention policy (e.g., in a circumstance where the workspace and/or channel associated with the group-based communication channel is/are associated with another data retention policy/policies). In other embodiments, for managing a particular group-based communication message, a group-based communication system is configured to utilize a data retention policy assigned to the lowest-level entity associated with the group-based communication message (e.g., assigned to the message if present, or if not then assigned to the channel if present, or if not then assigned to the workspace if present) when one exists. In yet other embodiments, for managing a particular group-based communications system, a group-based communication system is configured to perform one or more determinations to identify a proper data retention policy to be used in an instance where various entities associated with a group-based communication message are associated with various data retention policies. For example, in some such embodiments, the group-based communication system is configured to apply an organizational data retention policy by default unless a data retention policy for a lower-level entity alters one or more parameters of the data retention policy so as to satisfy one or more comparisons (e.g., where the lower-level data retention policy maintains data for less time than a higher-level data retention policy, or alternatively in some embodiments where the lower-level data retention policy maintains data for more time than a higher-level data retention policy).

The term "agreed data retention policy" refers to a data retention policy assigned to a common group-based communication channel accessible to a plurality of organizations, where each of the plurality of organizations is associated with data indicating each organization has agreed to have data posted to the common group-based communication channel stored based on the agreed data retention policy. In some such embodiments, an agreed data retention policy for a common group-based communication channel is utilized for managing data within the common group-based communication channel regardless of other data retention policies associated with each organization, workspace(s) therein, and/or the like. For example, in some embodiments, where a common group-based communication channel is assigned an agreed data retention policy, group-based communication messages within the common group-based communication channel are stored based on the agreed data retention policy regardless of the organization associated with the sender user account for the group-based communication channel message. In some embodiments, an agreed data retention policy is associated with approval data from each organization and/or authenticated user account associated therewith, having access to the common group-based communication channel, where the approval data represents user and/or administrator approval for maintaining data within the channel based on the agreed data retention policy. Additionally or alternatively, in some embodiments, a user and/or organization is associated with approval data automatically upon joining a common group-based communication channel. The term "agreed data retention policy assignment request" refers to electronically managed data transmitted by an authenticated user account that owns, administrates, and/or created a common group-based communication channel that indicates the common group-based communication channel should be assigned a selected data retention policy, where the selected data retention policy functions as the agreed data retention policy for the common group-based communication channel. In some such embodiments, the agreed data retention policy assignment request includes at least a common group-based communication channel identifier and a data retention policy identifier associated with the selected data retention policy to be used as the agreed data retention policy.

The term "third-party retention policy," with respect to a first organization identifier, refers to a data retention policy governing data for the first organization identifier within a common group-based communication channel, where the data retention policy was created and/or managed by a second organization identifier different from the first organization identifier. In some embodiments, the second organization identifier is associated with an owner organization for a common group-based communication channel.

The term "data retention policy datastore" refers to one or more group-based communication datastore(s), tables, and/or other permanent data storages embodied in hardware, software, firmware, or a combination thereof, for storing one or more data retention policies created by an organization. In this regard, in some embodiments, a data retention policy datastore includes any number of databases, tables, views, memory devices, cloud servers and/or cloud computing hardware, and/or combination thereof. In some embodiments, a data retention policy datastore is configured to each data retention policy associated with the organization identifier for the organization that created the data retention policy, such that one or more authenticated user account(s) associated with the organization identifier can assign the data retention policy to one or more entities, remove assignments of the data retention policy from one or more entities, and/or delete the data retention policy. It should be appreciated that, in some embodiments, a data retention policy datastore is configured for storing any number of data retention policies associated with any number of organization identifiers.

The terms "message management action" and "management action" refer to one or more group-based communication system executed instructions for maintaining one or more group-based communication messages based on a corresponding data retention policy. In an example context, non-limiting examples of message management actions include retaining a group-based communication message within one or more group-based communication datastore(s), deleting a group-based communication message from a datastore, marking a group-based communication message for deletion from a datastore, marking a group-based communication message as deleted within a datastore, and/or a combination thereof. In some embodiments, a group-based communication system is configured to perform a message management action based on one or more determinations based on a group-based communication message and a corresponding data retention policy. For example, in some embodiments, a group-based communication system is configured to perform an appropriate message management action based on whether a group-based communication message has been stored for longer than an associated data retention policy permits, such as by determining whether the message has been stored for a longer timestamp interval than permitted, deleting in a circumstance where the determination indicates it has been stored longer, and retaining if not. Non-limiting examples of a message management action includes a "message retention action," which refers to retaining a group-based communication message within one or more datastores, and a "message deletion action" which refers to removing, deleting, and/or otherwise making inaccessible some or all data embodying and/or associated with a group-based communication message within one or more datastores.

The term "group-based communication deletion request" refers to electronically managed data transmitted from a client device to a group-based communication system that represents a user request to delete a group-based communication message, or associated content, from storage by the group-based communication system. In some embodiments, a group-based communication deletion request is received in response to user interaction with a specially configured sub-interface of a group-based communication message rendered within a group-based communication interface (e.g., a "delete button" rendered associated with a group-based communication message rendered to a group-based communication interface associated with a particular selected group-based communication channel). In some embodiments, a group-based communication deletion request includes at least a group-based communication message identifier, and/or a group-based communication channel identifier associated with the channel including the message, and information data indicating the transmission is a group-based communication deletion request (e.g., a particular request identifier).

The term "group-based communication editing request" refers to electronically managed data transmitted from a client device to a group-based communication system that represents a user request to edit a group-based communication message, or the content thereof, within storage by the group-based communication system. In some embodiments, a group-based communication editing request is received in response to user interaction with a specially configured sub-interface of a group-based communication message rendered within a group-based communication interface (e.g., an "edit button" rendered associated with a group-based communication message rendered to a group-based communication interface associated with a particular selected group-based communication channel). In some embodiments, a group-based communication editing request includes at least a group-based communication message identifier, and/or a group-based communication channel identifier associated with the channel including the message, and information data indicating the transmission is a group-based communication editing request (e.g., a particular request identifier).

System Architecture and Example Apparatus

The methods, apparatuses, systems, and computer program products of the present disclosure may be embodied by any variety of devices. For example, a method, apparatus, system, and computer program product of an example embodiment may be embodied by a fixed computing device, such as a personal computer, computing server, computing workstation, or a combination thereof. Further, an example embodiment may be embodied by any of a variety of mobile terminals, mobile telephones, smartphones, laptop computers, tablet computers, or any combination of the aforementioned devices.

In this regard, FIG. 1 discloses an example computing system in which embodiments of the present disclosure may operate. FIG. 1 illustrates an overview for a system configured for group-based communication channel data management. Specifically, the system includes at least one client device capable of communication with a group-based communication system, where the group-based communication system provides inter-user group-based communications functionality and facilitates functionality associated with one or more external resources. For example, the group-based communication system may provide native group-based communication functionality without communication with any external resource, and may provide supplemental external resource functionality through communication with such external resource(s) and provision of various associated information for use in rendering, at the client devices, one or more specially configured group-based communication interfaces. The group-based communication system is communicable with one or more client device(s) and/or external resource(s) through one or more communication networks. In this regard, as the client devices and/or external resources interact with the group-based communication system, data may be stored by the group-based communication system and managed in accordance with various data retention policies, for example in accordance with the processes described herein.

Specifically, as illustrated, the system includes a group-based communication system 102. The group-based communication system 102 comprises a group-based communication server 102A ("server 102A") and a group-based communication datastore 102B ("datastore 102B"). The server 102A may be configured to communicate with the datastore 102B to enable the group-based communication system 102 to provide the functionality described herein.

The server 102A may be embodied by a computer or a plurality of computers. The server 102A may provide various functionality associated with receiving group-based communications, maintaining group-based communications, and/or transmitting group-based communications to one or more client device(s), such as the client devices 104A-104N (collectively "client devices 104"). Additionally or alternatively, the server 102A provides various external resource functionality through communication with one or more external resources, such as the external resources 106A-106N (collectively "external resources 106"). In some such embodiments, the server 102A facilitates transmission of external resource information to one or more client device(s), for example automatically or in response to a user request. For example, the server 102A may be operable to receive and post, or transmit, group-based communications provided by one or more of the client devices 104 and/or external resources 106.

Additionally or alternatively, in some embodiments, the server 102A is configured to generate one or more data retention policies, assign one or more data retention policies to an entity managed by the group-based communication system 102. For example, in some embodiments, the server 102A is configured to receive and process one or more requests to generate a second, and/or new, data retention policy, and/or assign the second data retention policy to one or more entities. Additionally or alternatively, in some embodiments, the server 102A is configured to receive and process one or more requests to assign an existing data retention policy to one or more entities, such as an organization, workspace, common group-based communication channel, message, or the like. Additionally or alternatively, in some embodiments, the server 102A is configured to perform one or more actions for maintaining the data stored within the corresponding datastore 102B in accordance with the one or more assigned data retention policies associated with the data, as described herein. In this regard, in some embodiments, the server 102A may be configured to, at a predetermined timestamp, upon system request, and/or upon user request, identify and/or retrieve a group-based communication message set and initiate one or more message management action(s) for the set based on the corresponding assigned data retention policies. In the circumstance where the server 102A is maintaining the messages associated with a common group-based communication channel, the server 102A may be configured to perform appropriate message management action(s) based on one or a plurality of policies assigned to one or more entities associated with the group-based communication message in the common group-based communication channel. The server 102A may access the communications network 108 to perform one or more of the operations described.

The datastore 102B may be embodied as a data storage device, such as one or more local storage device(s), one or more cloud storage device(s), network attached storage ("NAS") device or a plurality of NAS devices, or as a separate database server of plurality of servers. The datastore 102B includes information accessed by, receive by, and/or otherwise generated and/or processed by the server 102A to facilitate operations provided by the group-based communication system 102. For example, the datastore 102B may be configured to store, without limitation, a plurality of group-based communications associated with a plurality of workspaces, group-based communication channels, authenticated user accounts, and/or the like. Additionally or alternatively, the datastore 102B may be configured to store authentication credentials associated with various authenticated user accounts, for example to enable a client device to initiate an authenticated session with the group-based communication system 102 and link the client device with an authenticated user account for enabling the authenticated session.

In some embodiments, the datastore 102B is configured at least for storing data associated with each organization, workspace, group-based communication channel, group-based communication message, and/or corresponding rendering information associated therewith. Additionally or alternatively, in some embodiments, the datastore 102B is configured to store authenticated user account information, links to one or more organization(s) that the authenticated user account is associated with, and data representing access permissions, for example to render appropriate interface elements to enable a client device associated with the authenticated user account to access the appropriate workspaces, channels, and/or the like. Additionally or alternatively, in some embodiments, the datastore 102B is configured to store personalized data for each authenticated user account for customizing one of the corresponding accessible group-based communication interfaces. Additionally or alternatively to storing various content linking the various entities of the group-based communication system, for example connecting workspaces to organizations, user accounts to organizations, channels to workspaces, and messages to channels, in some embodiments the datastore 102B is configured to store data for use in maintaining such stored data. For example, in some embodiments, as described herein, the datastore 102B is configured to store one or more data retention policies associated with various organizations. Such data retention policies may be assigned to one or more entities, for example organizations, workspaces, channels, and the like, such that the group-based communication system 102 may maintain associated data based on the assigned data retention policies. In the circumstance of common group-based communication channels, for example, the datastore 102B may be configured to store different information dependent on a desired assignment of one or more data retention policies to the common group-based communication channel, as described herein.

Each of the client devices 104 may be embodied by any of a variety of computing devices as defined above. Electronic data received by the group-based communication server 102A from the client devices 104 may be provided in various forms and via various methods for processing. For example, the client devices 104 may include desktop computers, laptop computers, smartphones, netbooks, tablet computers, wearables, and/or the like. Each of the client devices 104 may include a networking interface to enable such communications, and/or each of the client devices 104 may be associated with a device configured with a network interface to enable such communications (e.g., a wearable device connected to a smartphone). The client devices 104 may be configured to enable communications over various networks utilizing various networking hardware, software, and/or firmware (e.g., Bluetooth between a smartphone and associated wearable, a carrier network between a smartphone and a group-based communication system and/or between a wearable and a group-based communication system, and/or one or more wireless and/or wireless networks for communicating via the Internet between a client device and a group-based communication system).

In an example context, the client devices 104 may execute an application or "app" to enable interaction with the group-based communication system 102. Such applications are typically designed for execution via a computing device dependent on the operating system and/or other configurations associated with the computing device. For example, an application may be provided that executes on mobile device operating systems such as iOS®, Android®, or Windows®. Alternatively, an application may be provided that executes on a personal computer operating system, such as Windows®, macOS®, Linux®, or another operating system executed on a laptop device, desktop device, or terminal device. These platforms typically provide frameworks that allow applications to communicate with one another and/or with particular hardware and/or software components of the client device. For example, the mobile operating systems and/or personal computer operating systems named above each provide frameworks for interacting with location services circuitry, wired and/or wireless network interfaces, user contacts, and other applications. In an example context, the application is embodied by a group-based communication service application provided by the group-based communication system. Communication with hardware and software modules outside of the application is typically provided via one or more application programming interfaces (APIs) configured by the operating system for the client device and/or provided via an external resource.

Alternatively or additionally, the client devices 104 may interact with the group-based communication system 102 via a web application. In an example context, the web application is embodied by a web browser executed via one of the client devices 104. As yet another example, the client devices 104 may include various hardware, firmware, and/or software designed to interface with the group-based communication system 102.

Each of the external resources 106 represents an external system, resource, service, software application, computer, and/or the like, that is accessible by a group-based communication system 102 for providing associated functionality to one or more of the client devices 104 during an authenticated session. In some embodiments, one or more of the external resources 106 (or a specific subset thereof) provide specific functionality via one or more group-based communication interfaces provided by the group-based communication system 102 and rendered to one or more of the client devices 104. For example, the group-based communication system 102 may access functionality provided by each of the external resources 106 via one or more APIs. An external resource of the external resources 106 may provide specific functionality and/or a specific service integrated into a group-based communication interface. In one example, one or more of the external resources 106 may be a validated software source code repository, or the like, which members of a particular group-based communication workspace may collectively access as they collaborate to develop a new software application. Additionally or alternatively, in another context, one of the external resources 106 may provide cloud storage for documents and/or the like. An external resource of the external resources 106 may be embodied in a variety of ways utilizing a variety of computing devices, for example an external server remote from the group-based communication system 102 and accessible using transmissions over the communications network 108 (e.g., over the Internet for example).

In some embodiments, group-based communication system is configured to access an external resource of the external resources 106 utilizing an external resource identifier. The external resource identifier may include, or otherwise be associated with and retrievable together with, an external resource access token associated with the external resource and/or a corresponding group-based communication system, workspace, and/or authenticated user account. A group-based communication system 102 may store one or more external resource identifiers including or associated with external resource access token(s) to enable API requests to the external resource, which may be tied with a specific external resource user account linked to a particular authenticated user account. For example, in this regard, an authenticated user account of the group-based communication system may be linked to a particular external resource user account, such that a user may access personalized external resource functionality.

In some embodiments of an exemplary group-based communication system 102, a group-based communication may be sent from a client device of the client devices 104 to a group-based communication system 102. In various implementations, the group-based communication may be sent to the group-based communication system 102 over communications network 108 directly by one of the client devices 104. In other embodiments, the group-based communication may be sent to group-based communication system 102 via one or more intermediaries, such as a messaging server, relay server, and/or the like. In at least one example implementation, the group-based communication may include data such as a communication identifier, sending user account identifier, a group identifier, a group-based communication channel identifier, communications contents (e.g., text, emojis, images, links), attachments (e.g., files), communications hierarchy data (e.g., the group-based communication may be a reply to another group-based communication), third-party metadata, external resource content, and/or the like.

In one embodiment, one of the client devices 104 may provide the following example group-based communication substantially in the form of a (Secure) Hypertext Transfer Protocol ("HTTP(S)") POST message including eXtensible Markup Language ("XML") formatted data, embodying a particular request for authenticating user account details to initiate an authenticated session, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL    <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        //it should be noted that although several client details
        //sections are provided to show example variants of client
        //sources, further messages will include only one to save
        //space
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201 Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>nickname.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201 Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S Build/IMM76D)
AppleWebKit/534.30 (KHTML, like Gecko) Version/4.0 Mobile Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3) AppleWebKit/537.75.14
(KHTML, like Gecko) Version/7.0.3 Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <message>
        <message_identifier>ID_message_10</message_identifier>
        <team_identifier>ID_team_1</team_identifier>
```

-continued

```
    <channel_identifier>ID_channel_1</channel_identifier>
    <body contents>That is an interesting invention. I have attached a copy our patent policy.</body
contents>
        <attachments>patent_policy.pdf</attachments>
    </message>
</auth_request>
```

The group-based communication system 102 comprises at least one group-based communication server 102A that may create a storage request data object based upon the received message to facilitate message indexing and storage in a group-based communication datastore 102B. In one implementation, the storage request data object may include data such as a communication identifier, a group identifier, a group-based communication channel identifier, a sending user account identifier, topics, responses, communication contents (i.e., body contents), attachments, communication hierarchy data, third party metadata, conversation primitive data, and/or the like. For example, the group-based communication server 102A may provide the following example storage request data object, substantially in the form of a HTTP(S) POST message including XML-formatted data, for example embodying a particular request for posting a group-based communication, as provided below:

based communication may be analyzed (e.g., by itself, with other group-based communications in a conversation primitive) or parsed using a machine learning technique, such as topic modeling, to determine topics associated with the group-based communication.

In embodiments, data indicating responses may be associated with the group-based communication. For example, responses to the group-based communication by other users may include reactions (e.g., selection of an emoji associated with the group-based communication, selection of a "like" button associated with the group-based communication), clicking on a hyperlink embedded in the group-based communication, replying to the group-based communication (e.g., posting a group-based communication to the group-based communication channel in response to the communication), downloading a file associated with the group-based communication, sharing the group-based communication

```
POST /storage_message.php HTTP/1.1
Host: www.server.com
Content-Type: Application/XML
Content-Length: 667
<?XML version = "1.0" encoding = "UTF-8"?>
<storage_message>
    <message_identifier>ID_message_10</message_identifier>
    <team_identifier>ID_team_1</team_identifier>
    <channel_identifier>ID_channel_1</channel_identifier>
    <sending_user_identifier>ID_user_1</sending_user_identifier>
    <topics>
        <topic>disclosures</topic>
        <topic>patents</topic>
        <topic>policies</topic>
    </topics>
    <responses>
        <response>liked by ID_user_2</response>
        <response>starred by ID_user_3</response>
    </responses>
    <body contents>That is an interesting disclosure. I have attached a copy our patent policy.</body
contents>
    <attachments>patent_policy.pdf</attachments>
    <conversation_primitive>
        conversation includes messages: ID_message_8, ID_message_9, ID_message_10,
        ID_message_11, ID_message_12
    </conversation_primitive>
</storage_message>
```

In embodiments, a sending user account identifier may be associated with the message communication. In one implementation, the message may be parsed (e.g., using PHP—i.e., the script language derived from Personal Home Page Tools—commands) to determine a sending user account identifier of the user who sent the group-based communication.

In embodiments, topics may be associated with the group-based communication. In one implementation, the communication contents may be parsed (e.g., using PHP commands) to determine topics discussed in the group-based communication. For example, hashtags in the group-based communication may indicate topics associated with the group-based communication. In another example, the group-from one group-based communication channel to another group-based communication channel, pinning the group-based communication, starring the group-based communication, and/or the like. In one implementation, data regarding responses to the group-based communication by other users may be included with the group-based communication, and the group-based communication may be parsed (e.g., using PHP commands) to determine the responses. In another implementation, data regarding responses to the group-based communication may be retrieved from a database. For example, data regarding responses to the group-based communication may be retrieved via a MySQL database command similar to the following:

```
SELECT messageResponses
FROM MSM_Message
WHERE messageID = ID_message_10.
```

For example, data regarding responses to the group-based communication may be used to determine context for the group-based communication (e.g., a social score for the group-based communication from the perspective of some user). In another example, data regarding responses to the group-based communication may be analyzed to determine context regarding the user (e.g., the user's expertise in a topic may be determined based on the responses to the user's group-based communication regarding the topic).

In embodiments, attachments may be included with the group-based communication. If there are attachments, files may be associated with the group-based communication. In one implementation, the group-based communication may be parsed (e.g., using PHP commands) to determine file names of the attachments. For example, file contents may be analyzed to determine context for the group-based communication (e.g., a patent policy document may indicate that the group-based communication is associated with the topic "patents").

In embodiments, third-party metadata may be associated with the group-based communication. For example, third-party metadata may provide additional context regarding the group-based communication or the user that is specific to a company, group, a group-based communication workspace, a group-based communication channel, and/or the like. In one implementation, the group-based communication may be parsed (e.g., using PHP commands) to determine third-party metadata. For example, third-party metadata may indicate whether the user who sent the group-based communication is an authorized representative of the group-based communication channel (e.g., an authorized representative may be authorized by the company to respond to questions in the group-based communication channel).

In embodiments, a conversation primitive may be associated with the group-based communication. In one implementation, a conversation primitive is an element used to analyze, index, store, and/or the like communications. For example, the group-based communication may be analyzed by itself, and may form its own conversation primitive. In another example, the group-based communication may be analyzed along with other group-based communications that make up a conversation, and the group-based communications that make up the conversation may form a conversation primitive. In one implementation, the conversation primitive may be determined as the group-based communication, a specified number (e.g., two) of preceding group-based communications and a specified number (e.g., two) of following group-based communications. In another implementation, the conversation primitive may be determined based on analysis of topics discussed in the group-based communication and other group-based communications (e.g., in the group-based communication channel) and/or proximity (e.g., communication send order proximity, communication send time proximity) of these group-based communications.

In embodiments, various metadata, determined as described above, and/or the contents of the group-based communication may be used to index the communication (e.g., using the conversation primitive) to facilitate various facets of searching (i.e., search queries that return results from group-based communication datastore 102B). In at least one example implementation, a storage request data object may be sent from group-based communication server 102A to facilitate indexing in group-based communication datastore 102B. In another implementation, metadata associated with the group-based communication may be determined and the communication may be indexed in group-based communication datastore 102B. In an example embodiment, the group-based communication may be indexed such that a company's or a group's communications are indexed separately (e.g., in a separate index associated with the group and/or company that is not shared with other groups and/or companies). In one implementation, group-based communications may be indexed at a separate distributed repository (e.g., to facilitate data isolation for security purposes).

If there are attachments associated with the group-based communication, file contents of the associated files may be used to index such files in group-based communication datastore 102B to facilitate searching. In one embodiment, the files may be indexed such that a company's or a group's files are indexed at a separate distributed repository.

Example Apparatus of the Disclosure

The group-based communication system 102 may be embodied by one or more computing systems, such as the apparatus 200 shown in FIG. 2A. The apparatus 200 may include a processor 202, memory 204, input/output module 206, communications module 208, group-based communication module 210, and data management module 212. The apparatus 200 may be configured, using one or more of the modules to execute the operations described herein.

Although the components are described with respect to functional limitations, it should be understood that the particular implementations necessarily include the use of particular hardware. It should also be understood that certain of the components described herein may include similar or common hardware. For example, two modules may both leverage use of the same processor, network interface, storage medium, or the like to perform their associated functions, such that duplicate hardware is not required for each module. The use of the term "module" and/or the term "circuitry" as used herein with respect to components of the apparatus 200 should therefore be understood to include particular hardware configured to perform the functions associated with the particular module as described herein.

Additionally or alternatively, the terms "module" and "circuitry" should be understood broadly to include hardware and, in some embodiments, software and/or firmware for configuring the hardware. For example, in some embodiments, "module" and "circuitry" may include processing circuitry, storage media, network interfaces, input/output devices, and the like. In some embodiments, other elements of the apparatus 200 may provide or supplement the functionality of the particular module. For example, the processor 202 may provide processing functionality, the memory 204 may provide storage functionality, the communications module 208 may provide network interface functionality, and the like, to one or more of the other modules.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus 200 to carry out various functions in accordance with example embodiments of the present disclosure.

The processor 202 may be embodied in any one of a myriad of ways and may, for example, include one or more processing devices configured to perform independently. Additionally or alternatively, the processor 202 may include one or more processors configured in tandem via a bus to enable independent execution of instructions, pipelining, and/or multithreading. The use of the terms "processor," "processing module," and "processing circuitry" may be understood to include a single-core processor, a multi-core processor, multiple processors internal to the apparatus, other central processing unit ("CPU"), microprocessor, integrated circuit, and/or remote or "cloud" processors.

In an example embodiment, the processor 202 may be configured to execute computer-coded instructions stored in the memory 204 or otherwise accessible to the processor. Alternatively, or additionally, the processor 202 may be configured to execute hard-coded functionality. As such, whether configured by hardware or software means, or by a combination thereof, the processor 202 may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

As one example context, the processor 202 may be configured to provide group-based communication system functionality. Additionally or alternatively, the processor 202 may be configured to facilitate storing of information associated with group-based communication system functionality, and enable maintenance of the stored data, including data associated with one or more common group-based communication channels, based at least on one assigned data retention policy. For example, the processor 202 may be configured to at least identify one or more entities for maintenance, for example a common group-based communication channel, identify a data set associated therewith, for example a group-based communication message set stored within the group-based communication channel, and perform one or more message management actions for the data within the identified data set based on one or more identified data retention policies. Some example processes are described below, for example with respect to FIG. 9 and on.

In some embodiments, the apparatus 200 may include input/output module 206 that may, in turn, be in communication with processor 202 to provide output to the user and, in some embodiments, to receive an indication of a user input. The input/output module 206 may comprise a user interface (e.g., a group-based communication interface) and may include a display to which the user interface is rendered. In some embodiments, the input/output module 206 may comprise a web user interface, a mobile application (e.g., a mobile group-based communication service application), a desktop application (e.g., a desktop group-based communication service application), a linked or networked client device, a kiosk, or the like. In some embodiments, the input/output module 206 may also include a keyboard, a mouse, a joystick, a touch screen, touch areas, soft keys, a microphone, a speaker, or other input/output mechanisms. The processor and/or user interface module comprising the processor, for example processor 202, may be configured to control one or more functions of one or more user interface elements through computer program instructions (e.g., software and/or firmware) stored on a memory accessible to the processor (e.g., memory 204, and/or the like).

The communications module 208 may be any means such as a device or circuitry embodied in either hardware or a combination of hardware and software that is configured to receive and/or transmit data from/to a network and/or any other device, circuitry, or module in communication with the apparatus 200. In this regard, the communications module 208 may include, for example, at least a network interface for enabling communications with a wired or wireless communication network. For example, the communications module 208 may include one or more network interface cards, antennas, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication module 210 includes hardware, software, firmware, and/or a combination thereof, configured to support functionality associated with group-based communication system 102. The group-based communication module 210 may utilize processing circuitry, such as the processor 202, to perform these actions. In some embodiments, the group-based communication module 210 includes hardware, software, firmware, or a combination thereof, to process group-based communication messages posted by one or more authenticated user account(s) to various group-based communication channels, and/or posted by one or more external resource(s) to various group-based communication channel(s), transmit corresponding information to one or more client device(s) and/or external resources for processing. For example, in this regard, the group-based communication module 210 may provide functionality to enable the apparatus 200 to function as an intermediary service between the various users associated with disparate client devices, and the various users and external resources providing supplemental functionality built over the group-based communication system. In some embodiments, the group-based communication module 210 may additionally and/or alternatively be configured to send data and/or receive data from one or more group-based communication datastore(s), for example datastore 102B. In some implementations, the sent and/or received data may be data objects embodying one or more group-based communications (e.g., messages, files, links, etc.) organized among a plurality of group-based communication channels. Additionally or alternatively, the group-based communication module 210 may provide for authenticating authentication credentials to initiate an authenticated session associated with a corresponding client device. During the authenticated session, the apparatus 200, for example via the group-based communication module 210 may provide native communication functionality and/or functionality associated with the external resources. It should be appreciated that, in some embodiments, the group-based communication module 210 may include a separate processor, specially configured field programmable gate array (FPGA), or a specially configured application-specific integrated circuit (ASIC).

The data management module 212 includes hardware, software, firmware, and/or a combination thereof, configured to support functionality associated with management of data within the group-based communication system, specifically group-based communication channel data management. In this regard, the data management module 212 may be configured to generate and/or manage storage of one or more data retention policies for any number of organizations. For example, the data management module 212 may be configured to process data retention policy generation request(s) received from any of a number of authenticated user accounts for one or more organization(s). Additionally or alternatively, the data management module 212 may provide functionality and corresponding data storage for assigning one or more data retention policies to various entities. In this regard, the data management module 212 may be configured to generate and store data records linking an entity to a data retention policy. Additionally or alternatively, alone or in conjunction with one or more other modules such as the group-based communication module 210, the data management module 212 may be configured to store incoming group-based communication messages, and/or associated metadata, in one or more group-based communication datastore(s). In some embodiments, the group-based communication messages and/or corresponding metadata is stored in one or more local datastores, and/or one or more distributed datastores located within any number of geographical areas.

In this regard, the data management module 212 may initiate one or more processes for identifying entities of one or more types for maintenance, identifying and/or retrieving data associated with such entities (e.g., group-based communication messages), identifying stored data retention policies assigned to the retrieved data, and performing appropriate message management actions based on the stored data retention policies. For example, in some embodiments the data management module 212 includes hardware, software, and/or a combination thereof, to identify one or more common group-based communication channels associated with a particular organization having an organization identifier, identify a group-based communication message set associated with one or more of the identified common group-based communication channels, and performing appropriate data management actions for such group-based communication messages. Additionally or alternatively, in some embodiments, the data management module 212 includes hardware, software, or a combination thereof, configured to provide functionality for generating one or more data retention policies, editing existing data retention policies, and/or assigning one or more data retention policies to one or more entities. In some embodiments, the data management module 212, alone or in conjunction with one or more other modules such as the processor 202 and/or input/output module 206, include hardware, software, and/or a combination thereof, configured to generate one or more interfaces including specially configured interface elements for initiating and/or otherwise causing such operations described above, and/or providing such interfaces for interaction by one or more users, such as through communication with one or more client device(s), displays, and/or the like. It should be appreciated that, in some embodiments, the data management module 212 may include a separate processor, specially configured FPGA, or a specially configured ASIC.

In some embodiments, one or more of the aforementioned components is combined to form a single module. For example, in some embodiments, the group-based communication module 210 and/or data management module 212, and/or processor 202, are combined into a single module. The combined module may be configured to perform some or all of the functionality described above with respect to the individual modules. Additionally or alternatively, in some embodiments, one or more of the modules described above may be configured to perform one or more of the actions described with respect to one or more of the other modules.

One of the client devices 104 may be embodied by one or more user devices, such as the apparatus 250 shown in FIG. 2B. The apparatus 250 may include a processor 252, memory 254, input/output module 256, communications module 258, group-based client module 260. The apparatus 250 may be configured, using one or more of the modules to execute the operations described herein. The components 252-258 may function similar or identical to the similarly named components depicted and described above with respect to apparatus 200. For purposes of brevity, repeated disclosure with regard to the functionality of such similarly named components is omitted.

The group-based client module 260 includes hardware, software, firmware, and/or a combination thereof, configured to support functionality associated with accessing and utilizing a group-based communication system. In this regard, in some embodiments, the group-based client module 260 is configured to enable a user to initiate an authenticated session associated with an authenticated user account, for example by inputting user authentication credentials for authenticating by the group-based communication system. Additionally or alternatively, in some embodiments, the group-based client module 260 is configured to render one or more group-based communication interfaces for selected group-based communication channels and/or workspaces, the group-based communication interface including interface elements to viewing of retrieved group-based communication messages and/or posting of new group-based communication messages. Additionally or alternatively still, in some embodiments, the group-based client module 260 is configured to enable access to functionality associated with one or more third-party resources, for example from within one or more group-based communication interfaces.

In some embodiments, the group-based client module 260 is further configured to generate signals representing one or more requests, and/or processing data received in response to the one or more requests. In this regard, in at least some embodiments, the group-based client module 260 is configured to transmit one or more requests for data retention policy information associated with and/or otherwise governing one or more group-based communication channels, such as a policy information request for a particular authenticated user account or for one or more other entities (e.g., organizations) permissioned to access to a group-based communication channel. Such requests may embody a request to identify a data retention policy data object governing for one or more other entities (e.g., a third-party organization having access to a common group-based communication channel). Additionally or alternatively, in at least some embodiments, the data received in response may be processed for rendering one or more associated interfaces, as described herein.

In some embodiments, the group-based client module 260 further includes hardware, software, and/or a combination thereof, configured for group-based communication channel data management. For example, in some embodiments, the group-based client module 360 is configured to render one or more group-based communication interfaces, and/or associated interfaces, for requesting creation of a new data retention policy, editing existing data retention policies, and/or assigning data retention policies to one or more entities. Additionally or alternatively, in some embodiments, the group-based client module 260 further includes hardware, software, and/or a combination thereof, configured to transmit one or more associated requests, for example group-based communication interface requests and/or policy information requests, and/or render corresponding interfaces, for example updated group-based communication interfaces and/or data retention notification information interfaces. It should be appreciated that, in some embodiments, the group-based client module 260 may include a separate processor, specially configured FPGA, or a specially configured ASIC.

In some embodiments, one or more of the aforementioned components of apparatus 250 is combined to form a single module. For example, in some embodiments, the group-based client module 260 is combined with one or more other modules into a single module, for example in combination with processor 252. The combined module may be configured to perform some or all of the functionality described above with respect to the individual modules. Additionally or alternatively, in some embodiments, one or more of the modules described above may be configured to perform one or more of the actions described with respect to one or more of the other modules.

Example Group-Based Communication System Data Associations

FIGS. 3A and 3B illustrate visualizations of various entities represented as data objects managed within a group-based communication system and the associations between the illustrated data objects. In this regard, the group-based communication system may be configured such that associated data objects are linked via one or more identifiers and/or relational records in one or more group-based communication datastore(s). In some such embodiments, associated data objects may be obtained by querying such datastores based on one or more identifiers for the various entities. It should be appreciated that associated data may be linked in any of a myriad of ways, allowing for one-way or two-way discoverability of associated data objects.

FIG. 3A illustrates an example visualization of the non-user data objects managed by an example group-based communication system, in accordance with at least one example embodiment of the present disclosure. The example visualization illustrated in includes organization 302. The organization 302 may be one of any number of organization data objects managed by a group-based communication system. In some embodiments, the organization 302 includes, or is otherwise associated with, an organization identifier that uniquely identifies the organization 302. The corresponding organization identifier may be used to associate the organization 302 with any number of other entities, for example by including the organization identifier in one or more data value(s) in one or more other data objects and/or associated data records. Additionally or alternatively, in some embodiments, each organization is represented by one or more data record(s) stored within one or more group-based communication datastore(s) of the group-based communication system, the data records including the specific values for the properties of each organization, for example including at least the organization identifier.

The organization 302 is associated with a workspace set 304, which may include any number of group-based communication workspaces. As illustrated, the workspace set 304 includes group-based workspaces 304A-304N. Each of the group-based workspaces 304A-304N may be associated with a workspace identifier that uniquely represents the group-based workspace within the group-based communication system. In some embodiments, the group-based communication system is configured to enable one or more authenticated user account(s) associated with the organization 302, as described herein, to create and/or manage workspaces associated with the organization 302, for example by creating a new group-based workspace associated with the organization 302 (and to be included in the workspace set 304), deleting a group-based workspace associated with the organization 302 (and to be removed from the workspace set 304), and/or editing one or more settings and/or other parameters associated with existing group-based workspaces. In an example context, an organization, such as the organization 302, may create any number of workspaces for organizing, via the workspace, specific groups of users (e.g., teams within the organization) and/or group-based communication channels.

The workspace identifier associated with each of the workspaces in the workspace set 304 may be used to associate the corresponding workspace with any number of other entities. In some embodiments, each workspace of the workspace set 304 is represented by one or more data record(s) stored within one or more group-based communication datastore(s) of the group-based communication system, the data records including the specific values for the properties of each workspace, for example at least the workspace identifier. Additionally or alternatively, in some embodiments, one or more data records includes at least the workspace identifier and an organization identifier to which the workspace is linked. For example, in some embodiments, one or more data records includes a workspace identifier for one of the workspaces in the workspace set 304 together with the organization identifier of the organization 302 to associate the workspace with the organization 302 within the group-based communication system. In some such embodiments, in this regard, one or more workspace(s) associated with an organization may be identified utilizing the corresponding organization identifier, for example by querying the one or more group-based communication datastore(s) for data records associated with the organization identifier. Similarly in this regard, in some such embodiments, the organization identifier associated with a workspace corresponding to a workspace identifier may be identified utilizing the corresponding workspace identifier, for example by querying the one or more group-based communication datastore(s) for data records associated with the workspace identifier.

Each of the workspaces may be associated with a channel set including any number of group-based communicating channels. As illustrated, each of the workspaces within workspace set 304 is associated with a different channel set, each including a different combination of group-based communication channels. For example, in this regard, workspace 304A is associated with channel set 306 including channels 306A-306C, workspace 304B is associated with channel set 308 including channels 308A-308B, and workspace 304B is associated with channel set 310 including only channel 310A. Additionally, for example as illustrated, workspace 304N is associated with channel set 312 that includes channels 312A and 306A. In this regard, the channel 306A may represent a common group-based communication channel shared between the workspace 304A and workspace 304N, such that authenticated user accounts associated with each of the workspaces 304A and 304N may access information within the group-based communication channel 306A. Each channel set may include any number of group-based communication channels, the group-based communication channels being of any number of group-based communication channel types. For example, in some embodiments, one, some, or all of the group-based communication channels within a channel set may include only public group-based communication channels. Additionally or alternatively, within some group-based workspaces, one, some, or all of the group-based communication channels may only be private group-based communication channels. Additionally or alternatively, a workspace may include one, some, or all common group-based communication channel(s), for example as illustrated with respect to workspace 304A and 304N, which may be associated with any number of group-based workspaces permissioned to provide access the group-based communication channel (e.g., workspaces with which the common group-based communication channel has been "shared").

The channel identifier associated with each of the group-based communication channels within a channel set may be used to associate the corresponding group-based communication channel with any number of other entities. In some embodiments, each group-based communication channel is represented by one or more data record(s) stored within one or more group-based communication datastore(s) of the group-based communication system, the data record(s) including the specific values for the properties of each group-based communication channel, for example at least the channel identifier. Additionally or alternatively, in some embodiments, one or more data records includes at least the channel identifier and a workspace identifier to which the group-based communication channel is linked. For example, in some embodiments, one or more data records includes a channel identifier for one of the group-based communication channels of the channel set 306 and a workspace identifier for the workspace 304A to associate the group-based communication channel with the workspace 304A within the group-based communication system. In some such embodiments, in this regard, a channel set including one or more group-based communication channels associated with a workspace may be identified utilizing the corresponding workspace identifier, for example by querying the one or more group-based communication datastore(s) for data records that are associated with the workspace identifier. Similarly, in this regard, in some embodiments, the workspace identifier associated with a group-based communication channel having a known group-based communication channel identifier may be identified utilizing the corresponding group-based communication channel identifier, for example by querying the one or more group-based communication datastore(s) for data records associated with the channel identifier. Additionally or alternatively still, in some embodiments, an organization may be associated with one or more group-based communication channels, for example directly by having a data record store an organization identifier associated with the group-based communication channel identifier, or indirectly by identifying a workspace identifier associated with the group-based communication channel and subsequently an organization identifier associated with the identified workspace identifier, as described above.

Each of the group-based communication channels may be associated with a group-based communication message set including any number of group-based communication messages, each including message text, file(s), external resource data, and/or the like, or a combination thereof. For example, as illustrated, each group-based communication channel may be associated with a separate message set. Common group-based communication channels accessible within one or more workspace(s) may be associated with a shared message set, such that messages posted to the common group-based communication channel from either workspace is accessible to both workspaces within the common group-based communication channel. In this regard, for example, channels 306B, 306C, 308A, 308B, 310A, and 312A each are associated with different message sets, namely message sets 314B, 314C, 316A, 316B, 318A, and 320A respectively. Further, as illustrated, the common group-based communication channel accessible within workspace 304A and workspace 304N, namely channel 306A, is associated with a single message set 314A. This message set may retrieved for viewing within the group-based communication channel 306A from within either of such workspaces.

The message set associated with a group-based communication channel may include any number of group-based communication messages posted to and/or otherwise transmitted within the group-based communication channel. Accordingly, each message set may be identified by and/or generated from identifying all, or a subset of, group-based communication messages associated with the corresponding group-based communication channel. In this regard, each group-based communication message posted to and/or otherwise transmitted within a group-based communication channel may be embodied as its own data object for storage within the group-based communication system.

Each group-based communication message may include, or otherwise be associated with, a group-based communication message identifier for unique identification. The group-based communication message identifier associated with each group-based communication message may be used to associate the corresponding group-based communication message with any number of other entities. In some embodiments, each group-based communication message is represented by one or more data record(s)s stored within one or more group-based communication datastore(s) of the group-based communication system, the data record(s) including the specific values for the properties of each group-based communication message, for example at least the message identifier. Additionally or alternatively, in some embodiments, one or more data record(s) includes at least the message identifier and a channel identifier to which the group-based communication message is linked. For example, in some embodiments, one or more data records include message identifiers of the group-based communication messages for the group-based communication messages of the message set 314A and a channel identifier for the channel 306A within which the group-based communication messages were posted. In some such embodiments, in this regard, a message set including one or more group-based communication messages associated with a channel may be identified utilizing the corresponding channel identifier, for example by querying the one or more group-based communication datastore(s) for data records that are associated with the channel identifier. Similarly, in this regard, in some embodiments, the channel identifier associated with a group-based communication message having a known message identifier may be identified utilizing the known message identifier, for example by querying the one or more group-based communication datastore(s) for data records associated with the known message identifier. Additionally or alternatively still, in some embodiments, a workspace and/or organization may be associated with one or more group-based communication messages, for example directly by having a data record store an organization identifier and/or workspace identifier associated with the group-based communication message identifier, or indirectly by identifying a group-based communication channel identifier and/or workspace identifier associated with a group-based communication message identifier, and/or identifying a workspace identifier based on the group-based communication channel identifier, and/or subsequently identifying an organization identifier associated with the identified workspace identifier. In this regard, in some such embodiments, each entity associated with a particular entity represented by a data object may be identified utilizing the identifier for each data object.

As depicted, it should be appreciated that the various entities form an entity hierarchy. In this regard, several entities include one or more sub-entities, and/or one or more higher-level entities. In some embodiments, data retention policies assigned to each entity may further be utilized as a default managing data within associated sub-entities. For example, in one example context, group-based communication messages transmitted within group-based communication channels are managed by the group-based communication system based on an assigned data retention policy that governs storage of the data. In some embodiments, if an organization is assigned a data retention policy, the data retention policy may be utilized as a default for all group-based workspaces associated with the organization, and thus as a default for all group-based communication channels associated with any of such group-based workspaces. In some embodiments, a data retention policy assigned to a lower-level entity overrides a data retention policy assigned to a higher-level entity and that may be used as a default data retention policy. For example, in a circumstance where a data retention policy is assigned to an organization and a second data retention policy is assigned to a group-based workspace associated with the organization, the second data retention policy assigned to the group-based workspace may govern for purposes of managing data within the group-based workspace. Similarly, if a data retention policy is assigned to an organization and a second data retention policy is assigned to a group-based communication channel that is a sub-entity of the organization (for example, where the group-based communication channel is associated with a group-based workspace associated with the organization), the second data retention policy assigned to the group-based communication channel may govern for purposes of managing data within the group-based communication channel.

In this regard, in some such embodiments, a group-based communication system is configured to determine a data retention policy that governs storage of data based on the assignment of data retention policies to one or more higher-level entities. For example, in some embodiments for managing data such as a group-based communication message, a group-based communication system may determine the lowest-level data retention policy assigned to an entity associated with such data, and utilize the lowest-level data retention policy to perform an appropriate message management action. In an example context, for purposes of managing storage of a group-based communication message within a group-based communication channel, an example group-based communication system is configured to determine if a data retention policy is assigned to the group-based communication channel. In some such contexts, in a circumstance where a data retention policy is assigned to the group-based communication channel, the data retention policy is utilized as governing the group-based communication message. In a circumstance where a data retention policy is not assigned to the group-based communication channel, the group-based communication system may determine whether a higher-level entity, for example the group-based communication workspace, is assigned a data retention policy. In a circumstance where a data retention policy is assigned to the group-based communication workspace, the data retention policy is utilized as governing the group-based communication message. In a circumstance where a data retention policy is not assigned to the group-based workspace, the group-based communication system may determine whether a higher-level entity, for example the organization, is assigned a data retention policy. Such a process may continue until the highest-level entity is reached, such as an organization. In some embodiments, the highest-level entity must always be assigned a data retention policy, such that the data retention policy is utilized for managing data in a circumstance where no lower-level entity is assigned a data retention policy. In other embodiments, when a highest-level entity is also not assigned a data retention policy, a system-wide data retention policy is considered assigned by default, such that the data is managed based on the system-wide data retention policy.

It should be appreciated that, in other embodiments, a group-based communication system may implement an alternative set of rules for establishing the governing relationship between data retention policies of various entities in an entity hierarchy. For example, in some embodiments in another example context, the data retention policy associated with a higher-level entity overrides that of a lower-level entity. Alternatively or additionally, in some example embodiments in another example context, the data retention policy associated with a lower-level entity overrides the data retention policy of a higher-level entity in a circumstance where the data retention policy of the lower-level entity defines more strict data retention rules than that of the higher-level entity, or the data retention policy associated with a higher-level entity overrides the data retention policy of a lower-level entity in a circumstance where the data retention policy of the higher-level entity defines more strict data retention rules than that of the lower-level entity.

FIG. 3B illustrates an example visualization of the user account data objects managed by an example group-based communication system, in accordance with at least one example embodiment of the present disclosure. Specifically, as illustrated, the visualization includes a hierarchy of user account data objects associated with or that are otherwise members of a particular organization, specifically organization 302. In this regard, it should be appreciated that each organization may have any number of members. Each member may be associated with one or any number of authenticated user accounts, each authenticated user account associated with and/or permissioned for accessing one or more group-based workspaces managed by the group-based communication system. Additionally or alternatively, each authenticated user account may be associated with an organization managed by the group-based communication system, for example for purposes of determining one or more data retention policies for use in maintaining group-based communication messages posted by the authenticated user account as described herein.

As illustrated, for example, the organization 302 is associated with users 350A-350N. (collectively "users 350"). Each of the users 350 may represent a different authenticated user account associated with the organization identifier corresponding to the organization 302. Alternatively or additionally, in some embodiments, one or more of such users 350 may be associated with a workspace owned by the organization 302. In this regard, the user is associated with a particular workspace and thus may be associated with the corresponding organization 302 based on the association between the workspace and the organization 302. Each of the authenticated user accounts may be associated with different account details, or at least authentication credentials such as a username or password, utilized for beginning an authenticated session associated with the authenticated user account. In this regard, when a user provides authentication credentials and/or other account details and begins an authenticated session, the user may continue to communicate with the group-based communication system to access functionality that the authenticated user account is permissioned to use. Similarly, during the authenticated session, data created by and/or posted to the group-based communication system may be attributed to the authenticated user account corresponding to the authenticated session. For example, when user 350E begins an authenticated session, all group-based communication messages posted by user 350E during the authenticated session may be stored associated with user 350E, such as where the author identifier for the message lists the authenticated user account identifier for user 350E. In some embodiments, each user of users 350 is configured to access only one group-based workspace. In other embodiments, each user of users 350 is configured to access any alternative number of workspaces.

In some embodiments, each user of the users 350 is represented by one or more data record(s) stored within one or more group-based communication datastore(s) of the group-based communication system, the data record(s) including the specific values for the properties of each of the users 350, for example at least an authenticated user account identifier. Additionally or alternatively, in some embodiments, one or more data record(s) includes at least an organization identifier for the organization to which the authenticated user account is linked. Additionally or alternatively, in other embodiments, one or more data record(s) includes at least data representing permissions associated data access and/or management rights for the authenticated user account. For example, such data may include accessible group-based workspaces and/or accessible group-based communication channels within such workspaces. Additionally or alternatively, such permission data may indicate whether the authenticated user account is an administrator with respect to one or more organization(s), workspace(s), channel(s), or the like. For example, as illustrated, user 350A and 350B may be associated with data indicating such authenticated user accounts are administrators for the organization 302.

Administrator user accounts, with respect to the organization 302, may be permissioned to create, edit, and/or delete one or more data retention policies to be associated with the organization 302. Additional or alternatively, administrator user accounts may be permissioned to assign one or more data retention policies associated with the organization 302 to the various entities associated with the organization 302, for example as described below with respect to FIG. 4. In this regard, for example, the administrator user accounts may assign existing and/or newly created data retention policies to any of the entities described above with respect to FIG. 3A. It should be appreciated that various embodiments may provide different permissions for all administrator user account and/or specific permissions for one or more administrator user accounts.

In some embodiments, a user may transmit one or more group-based communication messages within a group-based communication channel while accessing the group-based communication system during an authenticated session associated with one of the authenticated user accounts for the users 350. In some such embodiments, the group-based communication message may be "posted" by the user within the group-based communication channel, as described herein, and stored accordingly within the group-based communication system. In this regard, in some embodiments, a group-based communication message includes at least a channel identifier that uniquely represents the group-based communication channel within which the group-based communication message was posted and/or includes an author identifier property that represents the authenticated user account identifier for the authenticated user account. One or more of the values for these properties, and/or other properties included in the group-based communication channel, may be used to identify a data retention policy associated with the group-based communication message, for example where the identified data retention policy governs storage of the group-based communication message within the group-based communication system. In some embodiments, the data retention policy may be identified based on being assigned to the group-based communication channel and/or one or more higher-level entities associated with the group-based communication channel (such as an organizational data retention policy in a circumstance where the group-based communication channel and a corresponding group-based communication workspace are not assigned a data retention policy).

Alternatively or additionally, in some embodiments, a data retention policy is identified based on the authenticated user account, and/or system, that posted the data to the group-based communication system. In an example context, the author identifier for the group-based communication message may be used to identify an organization associated with the corresponding authenticated user account. In some such embodiments, the data retention policy assigned to the identified organization may be identified and utilized to perform an appropriate message retention data object. In some embodiments, the data retention policy assigned to the organization associated with the author identifier is utilized as a default data retention policy. In this regard, in some such embodiments, a second data retention policy associated with a sub-entity thereof with which the group-based communication message is also associated, may override the default data retention policy identified based on the association between the authentication identifier and the organization.

Example Group-Based Communication System Data Interactions

FIG. 4 illustrates an example visualization of data policies in association with various organizations as managed by an example group-based communication system, in accordance with at least one example embodiment of the present disclosure. It should be appreciated that each of the data objects depicted and described may be embodied in a group-based communication system in any of a myriad of ways. In some embodiments, each of the data objects, and/or the collection of data objects such as a set of data retention policies, may be embodied by any number of data records. Additionally or alternatively, in some embodiments, the associations between such data objects are represented within such data records embodying the data objects (such as using pointers from the retention policy to the organization to which it is associated), and/or as additional data records associating data record(s) representing the organization with data record(s) representing the data retention policy or policies, such as one or more relation records within the group-based communication datastores.

Specifically, FIG. 4 includes organizations 402A-402C (collectively "organizations 402"). Each of the organizations 402 may be associated with any number of data retention policies, for example embodied in a data retention policy set with zero or more data retention policies. For example, organization 402A is associated with data retention policy set 404 including data retention policies 404A-404D, organization 402B is associated with data retention policy set 406 including data retention policy 406A, and organization 402C is associated with data retention policy set 408 including data retention policies 408A-408C. It should be appreciated that, in other embodiments, an organization may be associated with no data retention policies, such that all data associated with the organization is managed based on one or more data retention policies that are system-wide for the group-based communication system. For example, in some embodiments, a default data retention policy may maintain data for an infinite amount of time, a predetermined amount of time, or based on another preset rule.

Each organization may be associated with a data retention policy set that includes data retention policies for associating or otherwise linking to any of a number of entities managed by the group-based communication system. In some embodiments, administrator user accounts associated with the organization and/or one or more associated entities (such as workspaces associated with the organization or group-based communication channels within said workspaces) may create such data retention policies. During creation, a data retention policy may be configured to define how data, such as group-based communication messages transmitted within a group-based communication channel, should be managed when such data is associated with an entity to which the data retention policy is assigned. In an example context, each data retention policy defines a deletion timestamp interval threshold, such that data is deleted or otherwise made inaccessible after being stored for longer than the deletion timestamp interval. Additionally or alternatively, in other embodiments, one or more data retention policies is configured to include an archive interval threshold, indicating whether data is to be archived upon deletion and/or for how long the data is to be stored as archived before permanent deletion and/or making inaccessible. It should be appreciated that a data retention policy may be configured to include any number of desired parameters whose values may be set by a user upon creation, and/or may be edited after creation. Additionally or alternatively, in some embodiments, the parameters for a particular data retention policy may be determined based on the entities to which the data retention policy may be assigned, for example such that organization data retention policies for assigning to an organization include a first set of parameters, workspace data retention policies for assigning to a workspace include a second set of parameters, and channel data retention policies include a third set of parameters.

In some embodiments, one or more data retention policies associated with an organization may be selected for assigning to an entity associated with the organization. For example, in some embodiments, an administrator user account with respect to an entity associated with a particular organization, is permissioned to enable the administrator to assign a data retention policy to that entity or sub-entities thereof. For example, if an administrator user account is permissioned as administrator of a particular group-based communication channel, the administrator user account may only be permissioned to assign a data retention policy for that group-based communication channel. Alternatively or additionally, if an administrator user account is permissioned as administrator of a particular workspace, the administrator user account may be permissioned to assign a data retention policy to the workspace that is applied to all sub-entities thereof (e.g., all group-based communication channels within, or otherwise associated with, the workspace) and/or assign a data retention policy individually to a group-based communication channel within the particular workspace. Additionally or alternatively, if an administrator user account is permissioned as administrator of a particular organization, the administrator user account may be permissioned to assign a data retention policy to the organization, which is then applied to all sub-entities thereof (for example, group-based communication channels within all group-based workspaces associated with the organization), assign a data retention policy to one or more workspace(s) associated with the organization, which is then applied to all sub-entities thereof, and/or assign a data retention policy individually to a group-based communication channel within any of the group-based workspaces associated with the organization. It should be appreciated that such permissions may be granted to administrator user account(s) in addition to one or more other data management and/or creation permissions for managing data associated with an organization and/or sub-entities thereof.

In some embodiments, an administrator user account may assign a data retention policy from a data retention policy set including any number of existing data retention policies. In this regard, one or more administrator user accounts may be permissioned to create a data retention policy to be associated with a particular organization associated with the user account. For example, if the administrator user account is associated with Organization 1, and is permissioned as the administrator of Organization 1, then the administrator user account may create a new data retention policy that will be automatically be stored, upon creation by the group-based communication system, associated with Organization 1. In some embodiments, an administrator user account may select one or more entities, which the administrator user account is permissioned as administrator, to assign the newly created data retention policy to such entities automatically upon creation. Additionally or alternatively, the group-based communication system may provide functionality to enable an administrator user account associated with a particular organization to view the data retention policies associated with the particular organization, and select one or more of the data retention policies for assigning to an entity for which the user account is permissioned as administrator. In this regard, an administrator user account permissioned as administrator for an organization, for example, may select an existing data retention policy to assign to the organization, such that all sub-entities thereof are managed based on the data retention policy. Additionally or alternatively, an administrator user account permissioned as administrator of a group-based workspace, for example, may select an existing data retention policy to assign to the workspace, such that all sub-entities thereof are managed based on the data retention policy.

A data retention policy may also be created for assignment to one or more entities based on one or more property values associated with parameters of the entity. In one example context, a data retention policy for an organization may be created for assignment to all entities based on a group-based communication channel type. For example, as illustrated in FIG. 4 organization 402A is associated with a data retention policy for a subset of group-based communication types. Specifically, organization 402A is associated with data retention policy 404A that is configured to be automatically assigned to public group-based communication channels that are sub-entities of organization 402A, data retention policy 404B that is configured to be automatically assigned to private group-based communication channels that are sub-entities of organization 402A, data retention policy 404C that is configured to be automatically assigned to single-user direct group-based communication channels that are sub-entities of organization 402A, and data retention policy 404D that is configured to be automatically assigned to multi-user direct group-based communication channels that are sub-entities of organization 402A. In some such embodiments, administrator user accounts creating and/or editing a data retention policy may configure one or more entity types to configure the group-based communication system to enable assignment only to entities of the permissioned types. In this regard, when an administrator user account is selecting a data retention policy to assign to a particular entity, the group-based communication system may provide and/or otherwise enable selection only of data retention policies that are configured for assignment to the entity type for the particular entity. For example, if an administrator user account attempts to assign a data retention policy to a private group-based communication channel, then the administrator user account may only select from data retention policies configured as permissioned for assignment to a private group-based communication channel. In this regard, the client device and/or group-based communication system may filter the data retention policy set to display only such selectable data retention policies.

Additionally or alternatively, in some embodiments, a data retention policy may be assigned to an entity as a default for managing data associated with sub-entities thereof. For example, in some embodiments, an organization may assign a data retention policy to the organization as a default data retention policy, such that the data retention policy is assigned to all sub-entities associated with the organization. In some such embodiments, an administrator user account may override the default data retention policy by assigning a different data retention policy to a sub-entity thereof. For example, in some embodiments, a data retention policy assigned to a group-based communication channel overrides a default retention policy assigned to an organization associated with the group-based communication channel for purposes of managing data within, and/or otherwise associated with, the group-based communication channel.

Further, as illustrated, organization 402B is associated with data retention policy 406, which includes only data retention policy 406A. In an example context, the data retention policy 406A may be an organizational data retention policy assigned to the organization 402B, such that all sub-entities associated with the organization 402B are managed based on data retention policy 406A. In this regard, for example, a group-based communication system may manage data posted within group-based communication channels associated with any group-based workspace further associated with the organization 402B based on the data retention policy 406A. In one example context, organization 402B may assign such an organizational data retention policy to cause the group-based communication system to manage the data associated with the organization 402B according to the data retention policy rather than any system-wide default policy. As such, the data retention policy 406A may be customized by one or more administrators of the organization 402B to meet the organization's desired data storage goals, for example to meet desired data privacy and/or data security goals.

It should be appreciated that, in some example contexts, an administrator may customize one or more data retention policies for assigning to one or more intended entities. For example, as illustrated in FIG. 4, organization 3 is associated with data retention policy set 408. Data retention policy set 408 includes data retention policy 408A. In at least one example context, data retention policy 408A embodies a default data retention policy, for example assigned to the organization 402C such that the data retention policy is used by a group-based communication system to manage all data within sub-entities associated with the organization 402C unless another data retention policy is assigned to a lower-level entity therein. In this regard, the data retention policy set 408 includes data retention policy 408B and data retention policy 408C. In the at least one example context, data retention policy 408B and/or data retention policy 408C each embody a custom data retention policy intended for assigning to one or more specific entities associated with the organization 402C. For example, in at least one example context, data retention policy 408B embodies a channel data retention policy intended for assigning to group-based communication channels determined by the user, and/or the system, to include or likely to include highly-secure data. In this regard, the system and/or a permissioned user, such as an authenticated user account permissioned as administrator of the organization 402C and/or entity to be assigned a data retention policy, may assign the data retention policy 408B to such group-based communication channels to have such data retention policies govern data posted within the group-based communication channel, thus overriding the data retention policy 408A for such highly-secure data. Additionally or alternatively, in at least one such example context, data retention policy 408C embodies yet another channel data retention policy intended for assigning to common group-based communication channels. In this regard, the system and/or a permissioned user, such as an authenticated user account permissioned as administrator of the organization 402C and/or entity to be assigned a data retention policy, may assign the data retention policy 408C to such group-based communication channels to have such data retention policies govern data posted within such group-based communication channels, thus overriding the data retention policy 408A. It should be appreciated that, as such, any number of data retention policies may be created and assigned as appropriate to meet the organization's specific desired data storage goals, regardless of complexity of such goals.

In some embodiments, the group-based communication system may be configurable to enable an organization to limit the assignment of one or more data retention policies in any of a myriad of manners desired by a user. For example, in some embodiments, a group-based communication system enables configuration of a data retention policy to only be assignable to one or more specific entities (e.g., particular group-based communication channels, group-based workspaces, and/or the like). Additionally or alternatively, in some embodiments, a group-based communication system enables configuration of a data retention policy to only be assignable to one or more specific entities having a specific entity type (e.g., group-based communication channels having a particular group-based communication channel type, and/or the like). In this regard, the group-based communication system may prevent assignment of data retention policies to certain entities, and/or, when requested, provide a limited subset of data retention policies to a user for assignment to a selected entity based on which data retention policies are assignable to the selected entity. For example, the group-based communication system may identify an entity type for the selected entity, and only provide the user with data retention policies that are assignable to the selected entity based on the identified entity type.

Example Visualizations of Data Management for Workspaces Including at Least One Common Group-Based Communication Channel FIGS. 5 and 6 each illustrate a visualization of data management for workspaces including at least one common group-based communication channel, in accordance with at least one example embodiment of the present disclosure. In this regard, it should be appreciated that each common group-based communication channel may be accessible to any number of organizations, each having any number of associated authenticated user accounts configured to access the common group-based communication channel. The group-based communication messages posted to the common group-based communication channel are stored and managed by the group-based communication system. In this regard, the configuration of the group-based communication channel and/or corresponding organizations having access to the common group-based communication channel may be used to identify the one or more data retention policies used for managing group-based communication messages posted within the common group-based communication channel.

FIG. 5, for example, illustrates a first example visualization of data management for an example workspace including at least one group-based communication channel, in accordance with at least one example embodiment of the present disclosure. Specifically, as illustrated, the visualization includes a workspace 504A. The workspace 504A may be a first workspace associated with an organization 502A. Further, as illustrated, the organization 502A is associated with a data retention policy set 508 including data retention policies 508A-508C. In some example embodiments, each of the data retention policies in the data retention policy set 508 may define different data storage rules, for example different retention intervals for data managed based on the data retention policy. As illustrated, for example, data retention policy 508A may represent a default data retention policy, for example where the data retention policy is applied to the organization 502A, or otherwise indicated as a default data retention policy for the organization 502A such that the data retention policy 508A is automatically utilized for managing data within each sub-entity of the organization 502A that does not have an assigned data retention policy.

As illustrated, workspace 504A includes channel set 506, which may include any number of group-based communication channels associated with the workspace 504A (e.g., created within the workspace 504A). The channel set 506 includes group-based communication channel 506A and group-based communication channel 506B. Each of these group-based communication channels are accessible within workspace 504A, such that at least one authenticated user accounts permissioned to access the group-based communication channel 506A may do so through accessing the workspace 504A.

Additionally, as illustrated, the group-based communication channel 506A embodies a common group-based communication channel associated with any number of additional organizations. Each additional organization may similarly have access to the common group-based communication channel 506A. In this regard, the common group-based communication channel may be shared with the at least one additional organization, and/or one or more specific authenticated user accounts associated with the at least one additional organization. For example, an administrator user account permissioned as administrator of the organization 502A, workspace 504A, and/or group-based communication channel 506A may perform one or more actions with the group-based communication system to share the group-based communication channel 506A with the one or more additional organizations. As illustrated, the common group-based communication channel 506A is additionally accessible to at least one authenticated user account associated with organization 502B and organization 502C. Organization 502B may access the group-based communication channel via workspace 504B, which may be a third workspace associated with the organization 502B. Additionally or alternatively, organization 502C may access the group-based communication channel via workspace 504C, which may be a first workspace associated with the organization 502C. Accordingly, common group-based communication channel 506A may be accessible to any number of authenticated user accounts associated from each of the organizations 502A, 502B, and 502C.

In this regard, a number of group-based communication messages may be posted within the common group-based communication channel 506A by any of the authenticated user accounts having access to the common group-based communication channel 506A. In some embodiments, the data retention policy that governs each group-based communication message is based on the author identifier for the group-based communication message. In this regard, the author identifier associates the group-based communication message with an organization for the authenticated user account identified by the author identifier. In some embodiments, a group-based communication system may utilize the organization associated with the author identifier to identify a data retention policy that applies to data posted within the common group-based communication channel 506A by authenticated user accounts associated with that organization.

Each organization may be associated with an associated retention policy set. In this regard, each retention policy set may include any number of data retention policies created by and/or otherwise associated with the organization associated with the data retention policy set. FIG. 5 includes dashed lines connecting a group-based communication channel and the data retention policy that governs data posted within the group-based communication channel by authenticated user accounts associated with the corresponding organization. In some embodiments, the data retention policy that govern data within the group-based communication channel for a particular organization may be assigned directly to the group-based communication channel, or one or more higher-level entities such as a corresponding workspace or the organization itself, for example assigned by an administrator user account associated with the organization. Additionally or alternatively, in some embodiments, the data retention policy that governs data within the group-based communication channel for a particular organization is identified by the group-based communication system based on one or more properties of the group-based communication channel (e.g., identifying a data retention policy associated with a particular organization that is a default data retention policy for common group-based communication channels). Alternatively or additionally, in some embodiments, the data retention policy that governs data within the group-based communication channel is identified based on one or more default data retention policies for one or more entities, for example an organizational data retention policy that governs all sub-entities thereof.

As illustrated, data for organization 502A posted within, and/or otherwise associated with, common group-based communication channel 506A is governed by data retention policy 508A. In this regard, for example, group-based communication messages that are posted by authenticated user accounts associated with organization 502A (for example, identified by the author identifier of each group-based communication message) within the common group-based communication channel 506A may be governed based on data retention policy 508A. Further, as illustrated, data for organization 502B posted within, and/or otherwise associated with, common group-based communication channel 506A is governed by data retention policy 510A of the data retention policy set 510 for organization 502B. Similarly, as illustrated, data for organization 502B posted within, and/or otherwise associated with, common group-based communication channel 506A is governed by data retention policy 510A of the data retention policy 512C for organization 502C. It should be appreciated that, as described herein, each of the data retention policies 508A, 510A, and 512A may define different data retention rules for data associated therewith. For example, in an example context, each of the data retention policies 508A-512A may define a different retention interval, such that data governed by each of the data retention policies is stored by the group-based communication system and deleted after the retention interval defined by the governing data retention policy elapses. In this manner, the common group-based communication channel 506A may provide a shared forum for communication between authenticated user accounts associated with the various organizations 502A-502C, and the group-based communication system enables data posted within, and/or otherwise associated with, the group-based communication channel 506A to be managed based on the data retention policies for each of the organizations with access to the common group-based communication channel 506A to meet the various goals of each organization.

It should be appreciated that, as described above, an owner organization that created and/or otherwise controls a workspace including one or more group-based communication channels may assign different data retention policies to the various group-based communication channels therein. For example, as illustrated, the channel set 506 for workspace 504A owned by 502A additional includes group-based communication channel 506B. The group-based communication channel 506B embodies a second common group-based communication channel shared between a plurality of organizations, specifically organization 502A and organization 502D. Each of the organizations may be associated with one or more authenticated user account(s) having access to the common group-based communication channel 506B, for example where authenticated user accounts associated with organization 502A access the common group-based communication channel 506B via workspace 504A and authenticated user accounts associated with organization 502D access the common group-based communication channel 506B via workspace 504D, which may be a second workspace associated with the organization 502D.

The data posted within and/or otherwise associated with common group-based communication channel 506B by each organization may be governed by a data retention policy within the data retention policy set for the corresponding organization. As illustrated, data for organization 502A posted within, and/or otherwise associated with, common group-based communication channel 506B is governed by data retention policy 508B. The data retention policy 508B may embody a second data retention policy created and specifically assigned to the common group-based communication channel 506B, and/or an associated higher-level entity such as the workspace 504A, by an administrator user account associated with organization 502A and/or a sub-entity thereof. In this regard, the data retention policy 508B may differ from the data retention policy 508A, for example by defining an second retention interval that may be longer or shorter in length than a first retention interval defined by the organizational data retention policy 508A. In an example context, the data retention policy 508B defines a shorter retention interval, for example to be assigned to group-based workspaces and/or group-based communication channels that include or are determined likely to include highly secure data. As such, by assigning one or more data retention policies as desired, associated data may be managed as desired by the organization 502A based on the configuration for each of the various data retention policies.

Organization 502D may access the common group-based communication channel 506B via workspace 504D, which may be a second workspace associated with the organization 502D. Data for organization 502D posted within, and/or otherwise associated with, common group-based communication channel 506B is governed by data retention policy 514A of the data retention policy set 514 for organization 502D. In an example context, the data retention policy 514A may define a retention interval desired by the organization 502D. In this regard, the organization 502A may configure the data retention policies and assignments thereof to have its associated data within, and/or otherwise associated with, common group-based communication channel 506B managed by the group-based communication system differently than the data within and/or otherwise associated with common group-based communication channel 506A, while organization 502D similarly configures its data retention policies and associations thereof to have its associated data within and/or otherwise associated with common group-based communication channel 506B managed by the group-based communication system based on the desired data retention policy.

FIG. 6 illustrates a second example visualization of data management for an example workspace including at least one group-based communication channel, in accordance with at least one example embodiment of the present disclosure. Specifically, as illustrated, the visualization includes workspace 604A, which may be a fourth workspace associated with an organization 602A within a group-based communication system. Further, as illustrated, the organization 602A is associated with a data retention policy set 608, which may include any number of data retention policies created by and/or otherwise associated with the organization 602A. Each of the data retention policies in the data retention policy set 608 may define different data storage rules, for example different retention intervals for data managed based on the data retention policy within a group-based communication system. As illustrated, for example, the data retention policy set 608 includes data retention policies 608A-608B.

Further as illustrated, workspace 604A includes channel set 606, which may include any number of group-based communication channels associated with the workspace 604A (e.g., created within the workspace 604A). The channel set 606 includes group-based communication channel 606A. The group-based communication channel 606A may be of any group-based communication channel type, and may not be a common group-based communication channel. In this regard, the group-based communication channel 606A may be accessible by authenticated user accounts associated with organization 602A, and/or may be solely accessible via the workspace 604A. It should be appreciated that data associated with the group-based communication channel 606A may be governed based on a default data retention policy of the data retention policy set 608, for example the data retention policy 608A, or may have a data retention policy assigned (not shown) by one or more administrator user accounts associated with the organization 602A and/or a sub-entity thereof.

As illustrated, the group-based communication channel 606B embodies a common group-based communication channel, which may be associated with any number of additional organizations. Each additional organization may similarly have access to the common group-based communication channel 606B, for example to view group-based communication messages posted to the channel and/or to post new group-based communication messages to the channel. In this regard, as illustrated, the common group-based communication channel 606B may be shared with at least organization 602B, such as by an administrator user account associated with the owner organization, for example organization 602A as illustrated, or a corresponding sub-entity such as an administrator user account permissioned as administrator of the workspace 604A. The common group-based communication channel 606B may be accessible to at least one authenticated user account associated with organization 602A and at least one authenticated user account associated with organization 602B. Organization 602B may access the common group-based communication channel 606B via workspace 604B, which may be a third workspace associated with the organization 602B.

A number of group-based communication messages may be posted within the common group-based communication channel 606B by any of the authenticated user accounts having access to the common group-based communication channel 606B. Each posted group-based communication message may be stored as one or more data objects and/or records within the group-based communication system, where the group-based communication system is configured to manage the group-based communication messages based on one or more data retention policies associated with such data. In some embodiments, the data retention policy that governs each group-based communication message is based on the author identifier for the group-based communication message. In this regard, the author identifier associates the group-based communication message with an organization for the authenticated user account identified by the author identifier. In some embodiments, a group-based communication system may utilize the organization associated with the author identifier to identify a data retention policy that governs the data posted within the common group-based communication channel 606B by authenticated user accounts associated with that organization.

As illustrated, data posted within the common group-based communication channel 606B may be governed based on an agreed data retention policy, specifically data retention policy 608C. For example, in some embodiments, an administrator user account associated with the common group-based communication channel 606B may assign the data retention policy 608C to the common group-based communication channel, and/or configure the common group-based communication channel 606B to utilize the assigned data retention policy 608C as an agreed data retention policy. In this regard, all data posted within and/or otherwise associated with the common group-based communication channel 606B may be governed based on the agreed data retention policy, regardless of the organization associated with the data. For example, in an example circumstance where the common group-based communication channel 606B is assigned an agreed data retention policy, data posted within the common group-based communication channel 606B by an authenticated user account associated with the organization 602A is managed based on the same policy as data posted within the common group-based communication channel 606B by an authenticated user account associated with the organization 602B. It should be appreciated that, in this regard, the agreed data retention policy 606C may govern data associated with any number of organizations.

In some embodiments, to access and/or communicate within the common group-based communication channel 606B, each additional organization must be associated with data indicating the organization has agreed to have data posted to the common group-based communication channel managed based on the agreed data retention policy. In other embodiments, to access and/or communicate within the common group-based communication channel 606B, each authenticated user account associated with each additional organization must be associated with data indicating the authenticated user account has agreed to have data posted to the common group-based communication channel managed based on the agreed data retention policy. In some embodiments, data indicating approval of the storage policy by the organization and/or authenticated user account is automatically generated upon one or more particular actions, for example upon the additional organization accepting access to the common group-based communication channel 606B (e.g., upon engaging an invitation link sent by an administrator user account associated with the organization 602A or a sub-entity thereof) or upon transmittal of notification information indicating that all data will be managed based on the agreed data retention policy to one or more associated client devices. For example, in some such embodiments, for example when an additional organization or associated authenticated user account is accepting an invitation to access a common group-based communication channel and/or when an authenticated user account associated with an additional organization accesses the common group-based communication channel 606B for the first time, via a client device, the group-based communication system may provide such notification information to the client device for rendering to the user. The notification information may serve to inform the user that the agreed data retention policy 608C will govern all data within the common group-based communication channel 606B. In yet other embodiments, notification information is rendered together with one or more interface elements for approving management of all data within the common group-based communication channel 606B based on the approved data retention policy. In some such embodiments, the group-based communication system may receive an approval response in response to user interaction with the one or more interface elements, the approval response indicating approval to have data posted to the common group-based communication channel managed based on the agreed data retention policy. In yet other embodiments, no such notification information may be displayed, and in some such embodiments may be displayed only when requested by a user (e.g., through interaction with one or more interface elements defined for such a purpose).

In some embodiments, the group-based communication system prevents an additional organization from assigning one or more data retention policies to a common group-based communication configured to have associated data managed based on an agreed data retention policy. In some embodiments, for example when a group-based communication system receives a request from an authenticated user account associated with a common group-based communication channel, the request associated with accessing an interface for viewing a data residency policy identified for managing data posted to and/or otherwise associated with the common group-based communication channel, the group-based communication system may transmit data for rendering that indicates the assigned agreed data residency policy governed. Additionally or alternatively, in some embodiments, the group-based communication system is configured such that each additional organization cannot edit the agreed data retention policy. In some such embodiments, the group-based communication system may be configured to enable the owner organization associated with the common group-based communication channel 606B to update the agreed data retention policy. In some such embodiments, the group-based communication system may require new data indicating the organization has agreed to have data posted to the common group-based communication channel managed based on the agreed data retention policy. For example, in some embodiments, the group-based communication system may be configured to again cause rendering of notification information, and/or one or more interface elements, upon to one or more client device(s) associated with authenticated user accounts corresponding to additional organizations for approving management of all data within the common group-based communication channel 606B based on the updated agreed data retention policy. In yet other embodiments, the group-based communication system is configured such that the owner organization cannot edit the agreed data retention policy while it is assigned, or can only do so under a defined set of conditions, for example when the channel is unshared with all additional organizations or upon approval by all additional organizations and/or associated authenticated user accounts.

Optionally, in some embodiments, the agreed data retention policy is stored as data solely associated with the organization that created the data retention policy. For example, as illustrated in FIG. 6, agreed data retention policy 608C is optionally (as indicated by the border in dashed or "broken" lines) stored in the data retention policy set 608 associated with the organization 602A. In some such embodiments, the group-based communication system may store one or more data records indicating assignment of the agreed policy 608C to the common group-based communication channel 606B for the organization 602B. Alternatively or additionally, in some embodiments, the group-based communication system is configured to copy the agreed data retention policy 608C to the data retention policy set 610 associated with the organization 602B. In this regard, the copied agreed data retention policy stored within the data retention policy set 610 associated with the organization 602B may embody a pointer to the agreed data retention policy stored within the data retention policy set 608 for the organization 602A, or otherwise be stored such that both copies of the agreed data retention policy reflect the same data retention rules.

Example Visualizations of Group-Based Communication System Storage and Management of Data within a Common Group-Based Communication Channel FIGS. 7 and 8 each illustrate a visualization of data storage and management within a group-based communication system based on one or more data retention policies, in accordance with at least one example embodiment of the present disclosure. In this regard, in some embodiments, the various data depicted and described is organization into any number of group-based communication datastores within a group-based communication system. Similarly, in some embodiments, the data depicted is organized and/or managed based on actions performed by a group-based communication server associated with the one or more group-based communication datastore(s) of the group-based communication system. The illustrated visualization includes a plurality of data associated with a plurality of organizations stored by the group-based communication system, specifically "Organization 1" associated with organization identifier ORG1, "Organization 2" associated with an organization identifier of "ORG2," and "Organization 3" associated with an organization identifier of "ORG3." It should be appreciated that, in other embodiments, a group-based communication system may be configured to manage any number of organizations.

FIG. 7 includes a user table 702, which depicts various example authenticated user accounts associated with the various organizations described above. In this regard, "User 1" refers to a first authenticated user account associated with a first authenticated account identifier of "USER1," "User 2" refers to a first authenticated user account associated with a second authenticated account identifier of "USER2," and "User 3" refers to a third authenticated user account associated with a third authenticated account identifier of "USER1." As depicted in the user table 702, each user is associated with a corresponding organization. For example, User 1 is associated with Organization 1, User 2 is associated with Organization 2, and User 3 is associated with Organization 3. In this regard, group-based communication messages transmitted by each user may be managed, by the group-based communication system, based on a data retention policy identified for the organization associated with the user. An example of such data management is described below with respect to the data tables 708 and 710.

The group-based communication system may be configured to identify an organization associated with a particular author identifier. For example, one or more group-based communication datastore(s) may be queried based on the author identifier for a particular group-based communication message to retrieve the organization identifier from the data record of user table 702 having a user identifier that matches the author identifier. In this regard, the group-based communication system may be configured to use an author identifier to identify an associated organization, and/or subsequently identify a data retention policy that governs a particular group-based communication message.

FIG. 7 further includes a data retention policy table 704, which depicts data records that each represent a data retention policy. The data retention policy table 704 includes one or more data records, each data record representing a data retention policy associated with an organization described above. In an example context, for example as depicted, each data retention policy includes at least an organization identifier that uniquely identifies the organization associated with the data retention policy. Additionally or alternatively, for example as depicted, each data retention policy includes at least a policy identifier that uniquely identifies the data retention policy. In this regard, the policy identifier may be used to assign the data retention policy to one or more entities, for example group-based communication channels. Additionally or alternatively, for example as depicted, each data retention policy includes a retention interval, for example to be used by a group-based communication system in determining an appropriate data management action to perform for managing data governed by the data retention policy. In at least one example context, the retention interval may be stored in a predetermined timestamp interval, for example in a number of days as depicted. It should be appreciated that the retention interval may be stored in any of a number of timestamp intervals (e.g., milliseconds, seconds, minutes, hours, days, weeks, months, years, and/or the like, or a combination thereof). Further, in other embodiments, one or more additional properties associated with a data retention policy may be stored within the data retention policy table 704, for example where each additional property is included as another column for each data record.

As illustrated, the data retention policy table 704 depicts three data retention policies. Specifically, the data retention policy table includes a first data retention policy ("Policy 1") having a policy identifier of "ORG1_DEFAULT." The first data retention policy is associated with Organization 1, for example where an administrator user account associated with Organization 1 created the first data retention policy. The first data retention policy further includes a retention interval representing 7 days, such that data governed by the first data retention policy will be stored within the group-based communication system for 7 days before being deleted and/or otherwise made inaccessible. In an example context, the first data retention policy may represent a default data retention policy assigned to Organization 1, a default data retention policy for a particular group-based communication channel type, and/or otherwise may be assignable to one or more group-based communication channels associated with Organization 1. In some embodiments, the policy identifier is generated entirely and/or partially based on user input, such as a user entered name for the policy. Additionally or alternatively, in some embodiments, the policy identifier includes one or more automatically generated portions, for example a "_DEFAULT" appended in a circumstance where the data retention policy is configured as a default data retention policy for the organization and/or one or more entity types.

The data retention policy table 704 further includes a second data retention policy ("Policy 2") having a policy identifier of "ORG2_DEFAULT." The second data retention policy is associated with Organization 2, for example where an administrator user account associated with Organization 2 created the second data retention policy. The second data retention policy further includes a retention interval also representing 7 days. In this regard, data governed by the third data retention policy will be stored within the group-based communication system for 2 days before being deleted and/or otherwise made inaccessible. The data retention policy table 704 further includes a third data retention policy ("Policy 3") having a policy identifier of "ORG3_DEFAULT." The third data retention policy is associated with Organization 3, for example where an administrator user account associated with Organization 3 created the third data retention policy. The third data retention policy further includes a retention interval representing 2 days.

The group-based communication system may be configured to identify the data retention policy set associated with each organization based on the organization identifier for the organization. For example, one or more group-based communication datastore(s) may be queried based on the organization identifier for a particular organization to retrieve all data retention policies having the organization identifier within the data record stored within the data retention policy table 704. In at least one example context, the group-based communication system may be configured to retrieve all data retention policies associated with a particular organization to use in causing display of the data retention policies as a set to the user, for example in an interface for selecting a data retention policy from the data retention policy set for assigning to a particular entity. Additionally or alternatively, in some embodiments, a group-based communication system is configured to query for a data retention policy associated with a particular policy identifier to determine one or more properties associated therewith, for example a retention interval for the data retention policy.

FIG. 7 further includes a channel table 706, which depicts data records each representing a group-based communication channel, and an additional column that identifies a data retention policy that governs management of data posted within and/or otherwise associated with the group-based communication channel. In this regard, as illustrated, each group-based communication channel may be represented by the "Organization ID," "Channel ID," "Group ID," "Channel Type," and "Is Shared" columns of each record the channel table 706. As depicted, the "Organization ID" column represents the organization identifier for the organization associated with the group-based communication channel, the "Channel ID" refers to a channel identifier that uniquely represents the channel identifier within the associated workspace, the "Group ID" refers to a workspace identifier for the workspace associated with the group-based communication channel, the "Channel Type" refers to a value for the group-based communication channel type associated with the group-based communication channel as selected from a predefined set of channel types, and "Is Shared" refers to a value indicating whether the group-based communication channel is accessible by one or more other organizations and/or workspaces. It should be appreciated that, in other embodiments, each group-based communication channel includes one or more additional properties, and thus one or more additional columns in each record of the channel table 706. In other embodiments, each group-based communication channel includes at least one less property, for example without storing the organization identifier, such that the column(s) associated with such properties are not stored within the channel table 706. For example, in some embodiments, the channel table 706 does not include the organization identifier, and the owner organization for a group-based communication channel is identified from another table based on an association between the owner organization and the workspace identified by the Group ID. Additionally or alternatively, in some such embodiments for a record representing a common group-based communication channel, the organization identifiers for the additional organizations having access to the group-based communication channel may be stored within the Is Shared column, such that the Is Shared column defines a set of additional organization identifiers and/or workspace identifiers having access to the group-based communication channel.

In some embodiments, it should be appreciated that the data retention policy for each channel may be stored within the channel table 706. In one such example circumstance, the data retention policy identifier may be stored associated with each group-based communication channel where a data retention policy has been assigned. Alternatively or additionally, in some embodiments, the group-based communication system is configured to dynamically identify the data retention policy for each group-based communication channel. For example, in some embodiments, the group-based communication system is configured to identify a data retention policy assigned to the group-based communication channel and/or a higher-level entity based on one or more of the stored values for the corresponding data row, for example using the organization identifier and/or workspace identifier. Alternatively or additionally, in some embodiments, the data retention policy that governs a particular organization identifier is stored in another table, such as a relation table that associates a data retention policy identifier and with a group-based communication channel identifier and workspace.

In some embodiments, a group-based communication system is configured to perform a data retention process to manage data stored by the group-based communication system. In some embodiments, the data retention process is performed to delete, and/or otherwise make inaccessible, one or more types of data objects stored by the group-based communication system. In at least one example context, a group-based communication system is configured to perform a data retention process for group-based communication messages stored by the group-based communication system. The data retention policy includes performing a data management action for one or more data objects stored by the group-based communication system, for example within one or more group-based communication datastore(s). In some embodiments, additionally or alternatively, to perform the data retention process the group-based communication system is configured to identify a data retention policy that governs storage of a particular data object, and/or to determine and perform a data management action based at least on the data retention policy that governs storage of the data and/or one or more properties associated with the data, such as a received timestamp representing when the data was created and/or transmitted to the group-based communication system.

An example visualization of a data retention process performed by a group-based communication system is depicted with respect to data tables 708 and 710. In an example context, the data table 708 represents group-based communication messages stored by a group-based communication system within one or more group-based communication datastore, each group-based communication message stored as a separate record in the data table 708. Specifically, for purposes of discussion and illustration, each of the group-based communication messages represented in the data table 708 is associated with a shared group-based communication channel represented by the Channel ID "CH_1" and workspace ID "WKSP_1." In some embodiments, the group-based communication system is configured to identify a group-based communication message set for management, for example based on a group-based communication channel identifier and/or workspace identifier associated with a particular group-based communication channel. In other embodiments, it should be appreciated that the group-based communication system is configured to store, identify, and perform a data retention process for group-based communication messages associated with a plurality of group-based communication channels and/or other entities (such as group-based communication messages posted to group-based communication channels associated with a plurality of group-based workspaces).

The data table 708 includes group-based communication channels posted to the common group-based communication channel by a plurality of authenticated user accounts, each associated with a corresponding organization, as described above. In this regard, each group-based communication message is associated with an author identifier that uniquely represents the authenticated user account that input, posted, transmitted, and/or otherwise caused creation of the group-based communication message. In some embodiments, the group-based communication system is configured to identify an organization based on each author identifier, for example by querying the user table 702 as described above. As illustrated, each group-based communication message additionally includes a received timestamp embodying a data representation of when the group-based communication message was created and/or transmitted to the group-based communication system. Further as illustrated, each group-based communication message includes message content data, which represents the user and/or system input content for transmission within the group-based communication message.

In at least one example embodiment, the group-based communication system is configured to perform a data retention process based on whether each group-based communication message satisfies a data retention policy that governs the group-based communication message. In some embodiments, the group-based communication system is configured to identify the data retention policy that governs the group-based communication message. In at least one example embodiment, the group-based communication is configured to identify the data retention policy based on a corresponding organization identifier for the group-based communication message and/or group-based communication channel data for the group-based communication message such as a channel identifier and/or workspace identifier. In some embodiments, the group-based communication system is configured to identify a data retention policy that governs storage of a group-based communication message based on a value of one or more data records associated with the group-based communication channel, as illustrated in FIG. 7. Alternatively or additionally, in some embodiments, the group-based communication system is configured to identify the data retention policy that governs storage of a group-based communication message based on one or more associated entities, for example based on an associated organization, workspace, and/or the like. For example, in at least one example context, the group-based communication system is configured to identify an organization identifier based on the author identifier for a group-based communication message, and determine a data retention policy assigned as a default to the organization represented by the organization identifier. In at least one other example context, the group-based communication system is configured to identify an organization based on the author identifier for a group-based communication message, identify a group-based communication channel type for the group-based communication channel represented by the channel identifier and/or channel identifier and workspace identifier, and identify a data retention policy assigned to the organization represented by the organization identifier as a default for the particular identified group-based communication channel data type. It should be appreciated that, in some example contexts, the group-based communication system is further configured to determine whether one or more data retention policies assigned to one or more higher-level entities and/or lower-level entities overrides a default and governs storage of the group-based communication message. In some embodiments, an administrator for a particular entity is permissioned to alter one or more settings indicating whether the sub-entities associated with the particular entity may be assigned a data retention policy that overrides a data retention policy for a higher-level entity that operates as a default data retention policy for such lower-level entities.

In at least one example embodiment, for example where a data retention policy includes and/or represents a retention interval, the group-based communication system is configured to perform a data management action for each data object based on whether the data object satisfies each retention interval. In at least one example context, a group-based communication message satisfies a data retention policy based on whether the difference between a received timestamp for the group-based communication message and a current timestamp satisfies the data retention interval, such as by not exceeding the retention interval (e.g., the time period for which the group-based communication message has been stored falls within the retention interval). In this regard, the difference between the timestamps represents a length of time the data has been stored. As such, in at least the described example context, the group-based communication message has been stored for longer than the retention interval in a circumstance where the group-based communication system determines the difference between the timestamps satisfies the retention interval.

In some embodiments, the group-based communication system is configured to perform a data management action for the group-based communication message based on whether the group-based communication message satisfies the data retention policy. For example, in some embodiments, the group-based communication system is configured to perform a data management action of deleting the group-based communication message in a circumstance where the group-based communication message does not satisfy the data retention policy, and a data management action of retaining the group-based communication message otherwise. Alternatively or additionally, in some embodiments, the group-based communication system is configured to perform a data management action of making the group-based communication message inaccessible, for example to delete the message without physical deletion of such data, in a circumstance where the group-based communication does not satisfy the data retention policy, and a data management action of retaining the group-based communication message otherwise. Alternatively or additionally, in some embodiments, the group-based communication system is configured to perform a data retention policy of deleting and/or making inaccessible at least a portion of the group-based communication message in a circumstance where the group-based communication message does not satisfy the data retention policy, and a data management action of retaining the group-based communication message with all data portions unaltered otherwise. It should be appreciated that, in other embodiments, the group-based communication system is configured for deletion and/or making inaccessible of some or all of the group-based communication message in a circumstance where the group-based communication message satisfies the data retention policy. Additionally or alternatively still, in some embodiments, the data retention policy defines an appropriate message management action, for example based on a user-configured value for one or more settings embodied in the data retention policy.

As illustrated in FIG. 7, data table 710 depicts the data of data table 708, namely stored group-based communication messages, after the group-based communication system performs a data retention process. In some embodiments, the group-based communication system is configured to initiate the data retention policy at a predetermined timestamp and/or timestamp interval. For example, in some embodiments, the group-based communication system is configured to initiate the data retention process every day at a timestamp representing 3 AM local time. Alternatively or additionally, for example in some embodiments, the group-based communication system is configured to initiate the data retention process at a predetermined timestamp interval (e.g., hourly, daily, weekly, or in accordance with another predetermined timestamp interval). For illustrative and descriptive purposes only, the depicted data retention process is associated with a timestamp of "JUN-8-2019," which represents 7 calendar days after the timestamp of "JUN-1-2019."

With reference to the group-based communication messages depicted in data table 708 and 710, the group-based communication messages are each managed based on the data retention policy that governs each group-based communication message. For example, as described above, the group-based communication system may identify the data retention policy associated with each of the group-based communication messages 708A-708F, for example based on the author identifier, channel identifier, workspace identifier, and/or a combination thereof. In some embodiments, the group-based communication system is configured to identify the data retention policy based at least on the organization identifier associated with the author identifier for each group-based communication message. In at least one example context, for example as illustrated, the group-based communication system is configured to identify Policy 1 as governing all group-based communication messages for all author identifiers associated with Organization 1, identify the Policy 2 as governing group-based communication messages for all author identifiers associated with Organization 2, and identify Policy 3 as governing group-based communication messages for all author identifiers associated with Organization 3. In this regard, as illustrated, group-based communication messages 708A, 708C, and 708F are each governed by Policy 1, group-based communication message 708B is governed by Policy 2, and group-based communication messages 708D and 708E are each governed by Policy 3. In some embodiments, the group-based communication system is configured to identify such associations based on one or more of the user table 702, data retention policy table 704, and/or channel table 706, or a combination thereof.

Accordingly, data table 710 represents the group-based communication messages 708A-708F after the performed data retention process. As illustrated, the group-based communication system is configured to delete at least a portion of the content for group-based communication messages that does not satisfy the governing data retention policy. The deleted portion of data may represent at least message content data for the group-based communication message. Additionally or alternatively, in some embodiments, the group-based communication system is configured to delete user identification data associated with the group-based communication message, such as at least one author identifier and/or recipient identifier(s). In at least some embodiments, the group-based communication system is configured to delete all information except message metadata and/or necessary information for linking the group-based communication message with a specific workspace and/or channel for displaying (for example, a group-based communication channel identifier and a group-based workspace identifier). In other example contexts, the group-based communication system is configured to entirely delete ad/or otherwise make inaccessible the group-based communication messages determined to not satisfy their corresponding data retention policy.

To perform an appropriate data management action, the group-based communication system may be configured to compare the difference between the current timestamp and the received timestamp for each group-based communication message with the retention interval. In this regard, as illustrated for example, group-based communication message 708A is associated with a received timestamp of "JUN-1-2019," whereas the current timestamp is "JUN-8-2019," thus resulting in a difference representing 7 calendar days. As described above, Policy 1 represents or otherwise includes a retention interval of 7 calendar days. Accordingly, in at least one example circumstance where the difference does not satisfy (e.g., if greater than and/or equal to) the retention interval, the group-based communication system is configured to determine the group-based communication message 708A does not satisfy Policy 1 that governs, and perform a data management action of deleting at least a portion of data from the group-based communication message 708A.

Similarly, group-based communication message 708B is associated with a received timestamp of "JUN-1-2019," thus resulting in a difference representing 7 calendar days. As described above, group-based communication message 708B is associated with a second author identifier associated with Organization 2, and is governed by Policy 2. Policy 2 represents or otherwise includes a retention interval of 7 calendar days. Accordingly, in the example circumstance as illustrated and described, the group-based communication system is configured to determine the group-based communication message 708B does not satisfy Policy 2 that governs, and perform a data management action of deleting at least a portion of data from the group-based communication message 708B.

Group-based communication message 708C is similarly associated with author identifier "USER1" linked to Organization 1, and thus governed based on Policy 1. However, group-based communication message 708C is associated with a received timestamp of "JUN-3-2019," thus resulting in a difference representing 5 calendar days. Accordingly, in the example circumstance as illustrated and described, the group-based communication system is configured to determine the group-based communication message 708C satisfies the governing data retention policy, namely Policy 1. Accordingly, the group-based communication system is configured to perform a data management action of retaining the group-based communication message 708C without alteration. In this regard, should the associated data retention policy remain the same, the group-based communication system may perform a data management action of deleting the group-based communication message 708C during a later data retention process (e.g., performed at a current timestamp of "JUN-10-2019").

Group-based communication message 708D is associated with a received timestamp of "JUN-2-2019," thus resulting in a difference representing 2 calendar days. However, as described above, group-based communication message 708D is associated with a third author identifier associated with Organization 3, and is governed by Policy 3. Policy 3 represents or otherwise includes a retention interval of 2 calendar days. Accordingly, in the example circumstance as illustrated and described, the group-based communication system is configured to determine the group-based communication message 708D does not satisfy Policy 3 that governs, and perform a data management action of deleting at least a portion of the data from the group-based communication message 708D.

Group-based communication messages 708E and 708F are each associated with a received timestamp of "JUN-7-2019," thus resulting in a difference representing 2 calendar days. Further, each of the group-based communication messages 708E and 708F is associated with a different author identifier, and thus governed by a corresponding data retention policy. Specifically, as described, group-based communication message 708E is associated with the authenticated user account represented by "USER3" linked to Organization 3 and governed by Policy 3, while group-based communication message 708F is associated with the authenticated user account represented by "USER1" linked to Organization 1 and governed by Policy 1. However, the identified difference satisfies both retention interval represented in either data retention policy. As such, the group-based communication system is configured to perform a data management action of retaining the group-based communication messages with all data portions unaltered.

Author-based identification of a governing data retention policy enables the group-based communication system to manage group-based communication messages based on the individualized desires of each organization within a common group-based communication channel. In this regard, although each group-based communication message is posted to and/or otherwise associated with the same common group-based communication channel, the group-based communication system is configured to manage such data based on the individualized desires of each organization having authenticated user accounts that communicate within the common group-based communication channel. Such data management requires minimal user interaction after initial provisioning. Additionally or alternatively, in the manner described herein, the data retention process can be performed in a standardized manner for all group-based communication messages and/or at a standardized time (e.g., during a predetermined or determined period of minimal interaction with the group-based communication system to minimize impact on user interaction with functionality provided by the group-based communication system, for example in early morning hours or other "off-peak" hours), while maintaining customizability for data storage across each organization and/or individual entities associated therewith.

FIG. 8 illustrates a visualization of data storage and management within a group-based communication system based on one or more data retention policies, in accordance with at least one example embodiment of the present disclosure. Specifically, the visualization depicts data management of storage of group-based communication messages within a common group-based communication channel based on an agreed data retention policy. In this regard, as illustrated, the illustrated visualization includes a plurality of data associated with "Organization 3" associated with organization identifier "ORG3," and "Organization 4" associated with an organization identifier of "ORG4." It should be appreciated that, in other embodiments, a group-based communication system may be configured to manage any number of organizations.

The tables 802, 804, and 806, as illustrated, may function similarly as described above with respect to FIG. 7. Specifically, FIG. 8 includes a user table 802, which depicts various example authenticated user accounts associated with the various organizations described above. In this regard, "User 4" refers to a fourth authenticated user account associated with a fourth authenticated account identifier of "USER4," "User 5" refers to a fifth authenticated user account associated with a fifth authenticated account identifier of "USER5," and "User 6" refers to a sixth authenticated user account associated with a sixth authenticated account identifier of "USER6." As depicted, each user is associated with a corresponding organization. For example, User 5 is associated with Organization 3, User 6 is associated with Organization 3, and User 7 is associated with Organization 4. In this regard, group-based communication messages transmitted by each user may be managed, by the group-based communication system, based on a data retention policy identified for the organization associated with the user. An example of such data management is described below with respect to the data tables 808 and 810. As described above, in some embodiments, the group-based communication system is configured to use an author identifier to identify an associated organization, and/or subsequently identify a data retention policy that governs a particular group-based communication message.

FIG. 8 further includes a data retention policy table 804, which depicts data records that each represent a data retention policy as similarly described above with respect to data retention policy table 704 in FIG. 7. As illustrated, the data retention policy table 804 depicts three data retention policies. Specifically, the data retention policy table includes a first data retention policy ("Policy 3") having a policy identifier of "ORG3_DEFAULT." Policy 3 is associated with Organization 3, for example where an administrator user account associated with Organization 3 created the data retention policy. The Policy 3 further includes a retention interval representing 2 days, such that data governed by Policy 3 will be stored within the group-based communication system for 2 days before being deleted and/or otherwise made inaccessible. In an example context, Policy 3 represents a default data retention policy assigned to Organization 3, a default data retention policy for a particular group-based communication channel type, and/or otherwise may be assignable to one or more group-based communication channels associated with Organization 3.

The data retention policy table 804 further includes another data retention policy ("Policy 4") having a policy identifier of "ORG4_DEFAULT." Policy 4 is associated with Organization 4, for example where an administrator user account associated with Organization 4 created Policy 4. Policy 4 further includes a retention interval representing 7 days. In this regard, data governed by Policy will be stored within the group-based communication system for 7 days before being deleted and/or otherwise made inaccessible. The data retention policy table 804 further includes a fifth data retention policy ("Agreed Policy") having a policy identifier of "AGREED_POLICY1." The Agreed Policy is also associated with Organization 3, for example where an administrator user account associated with Organization 3 created the Agreed Policy. The Agreed Policy includes a retention interval representing 5 days. In an example context, the Agreed Policy represents an agreed data retention policy assigned to at least one common group-based communication channel, and/or assigned to an associated entity such as an organization and/or workspace corresponding to the common group-based communication channel. The Agreed Policy may be associated with data for one or more associated authenticated user accounts and/or organizations having access to the common group-based communication channel. For example and/or illustrative purposes, the common group-based communication channel is assigned to the common group-based communication channel described with respect to channel table 806.

FIG. 8 further includes the channel table 806, which depicts data records each representing a group-based communication channel, and an additional column that identifies a data retention policy that governs management of data posted within and/or otherwise associated with the group-based communication channel. In this regard, as illustrated, each group-based communication channel may be represented by the "Organization ID," "Channel ID," "Group ID," "Channel Type," and "Is Shared" columns of each record the channel table 806, similarly as described above with respect to channel table 706 in FIG. 7. Similarly, in some embodiments, it should be appreciated that the data retention policy for each channel may be stored within the channel table 806. In one such example circumstance, the data retention policy identifier may be stored associated with each group-based communication channel where a data retention policy has been assigned, for example the Agreed Policy as described. Alternatively or additionally, in some embodiments, the group-based communication system is configured to dynamically identify the data retention policy for each group-based communication channel.

Based on the described data records, an example visualization of a second data retention process performed by a group-based communication system is depicted with respect to data tables 808 and 810. In an example context, the data table 808 represents group-based communication messages stored by a group-based communication system within one or more group-based communication datastore(s, each group-based communication message stored as a separate record in the data table 808. Specifically, for purposes of discussion and illustration, each of the group-based communication messages represented in the data table 808 is associated with a shared group-based communication channel represented by the Channel ID "CH_2" and workspace ID "WKSP_4." In some embodiments, the group-based communication system is configured to identify a group-based communication message set for management, for example based on the group-based communication channel identifier and/or workspace identifier associated with a particular group-based communication channel. In other embodiments, it should be appreciated that the group-based communication system is configured to store, identify, and perform a data retention process for group-based communication messages associated with a plurality of group-based communication channels and/or other entities (such as group-based communication messages posted to group-based communication channels associated with a plurality of group-based workspaces).

The data table 808 includes group-based communication channels posted to the common group-based communication channel by a plurality of authenticated user accounts, each associated with a corresponding organization, as described above. In this regard, each group-based communication message is associated with an author identifier that uniquely represents the authenticated user account that input, posted, transmitted, and/or otherwise caused creation of the group-based communication message. In some embodiments, the group-based communication system is configured to identify an organization based on each author identifier, for example by querying the user table 802 as described above. As illustrated, each group-based communication message additionally includes a received timestamp embodying a data representation of when the group-based communication message was created and/or transmitted to the group-based communication system. Further as illustrated, each group-based communication message includes message content data, which represents the user and/or system input content for transmission within the group-based communication message.

In at least one example embodiment, the group-based communication system is configured to perform a data retention process based on whether each of the group-based communication messages satisfies a data retention policy that governs the group-based communication message. In some embodiments, the group-based communication system is configured to identify the data retention policy that governs the group-based communication message. In at least one example embodiment, the group-based communication is configured to identify the data retention policy based on a corresponding organization identifier for the group-based communication message and/or group-based communication channel data for the group-based communication message such as a channel identifier and/or workspace identifier. In some embodiments, the group-based communication system is configured to identify a data retention policy that governs storage of a group-based communication message based on a value of one or more data records associated with the group-based communication channel, as illustrated in FIG. 8. Alternatively or additionally, in some embodiments, the group-based communication system is configured to identify the data retention policy that governs storage of a group-based communication message based on one or more associated entities, for example based on an associated organization, workspace, and/or the like. For example, in at least one example context, the group-based communication system is configured to identify an organization identifier based on the author identifier for a group-based communication message, and determine a data retention policy assigned as a default to the organization represented by the organization identifier. In at least one other example context, the group-based communication system is configured to identify an organization based on the author identifier for a group-based communication message, identify a group-based communication channel type for the group-based communication channel represented by the channel identifier and/or channel identifier and workspace identifier, and identify a data retention policy assigned to the organization represented by the organization identifier as a default for the particular identified group-based communication channel data type. It should be appreciated that, in some example contexts, the group-based communication system is further configured to determine whether one or more data retention policies assigned to one or more higher-level entities and/or lower-level entities overrides a default and governs storage of the group-based communication message.

In at least one example embodiment, for example where a data retention policy includes and/or represents a retention interval, the group-based communication system is configured to perform a data management action for each data object based on whether the data object satisfies each retention interval. In at least one example context, a group-based communication message satisfies a data retention policy based on whether the difference between a received timestamp for the group-based communication message and a current timestamp satisfies the data retention interval, such as by falling within (e.g., not exceeding) the retention interval. In this regard, the difference between the timestamps represents a length of time the data has been stored. As such, in at least the described example context, the group-based communication message has been stored for longer than the retention interval in a circumstance where the group-based communication system determines the difference between the timestamps satisfies the retention interval.

In some embodiments, the group-based communication system is configured to perform a data management action for the group-based communication message based on whether the group-based communication message satisfies the data retention policy. For example, in some embodiments, the group-based communication system is configured to perform a data management action of deleting the group-based communication message in a circumstance where the group-based communication message does not satisfy the data retention policy, and a data management action of retaining the group-based communication message otherwise. Alternatively or additionally, in some embodiments, the group-based communication system is configured to perform a data management action of making the group-based communication message inaccessible in a circumstance where the group-based communication does not satisfy the data retention policy, and a data management action of retaining the group-based communication message otherwise. Alternatively or additionally, in some embodiments, the group-based communication system is configured to perform a data retention policy of deleting and/or making inaccessible at least a portion of the group-based communication message in a circumstance where the group-based communication message does not satisfy the data retention policy, and a data management action of retaining the group-based communication message with all data portions unaltered otherwise. It should be appreciated that, in other embodiments, the group-based communication system is configured for deletion and/or making inaccessible of some or all of the group-based communication message in a circumstance where the group-based communication message is determined to satisfy the data retention policy. Additionally or alternatively still, in some embodiments, the data retention policy defines an appropriate message management action, for example based on a user-configured value for one or more settings embodied in the data retention policy.

As illustrated in FIG. 8, data table 810 depicts the data of data table 808, namely stored group-based communication messages, after the group-based communication system performs the data retention process. In some embodiments, the group-based communication system is configured to initiate the data retention policy at a predetermined timestamp and/or timestamp interval. For example, in some embodiments, the group-based communication system is configured to initiate the data retention process every day at a timestamp representing 3 AM local time. Alternatively or additionally, for example in some embodiments, the group-based communication system is configured to initiate the data retention process at a predetermined timestamp interval (e.g., hourly, daily, weekly, or in accordance with another predetermined timestamp interval). For illustrative and descriptive purposes only, the depicted data retention process is associated with a timestamp of "JUN-17-2019," which represents 5 calendar days after the timestamp of "JUN-12-2019."

With reference to the group-based communication messages depicted in data table 808 and 810, the group-based communication messages are each managed based on the data retention policy that governs each group-based communication message. For example, as described above, the group-based communication system may identify the data retention policy associated with each of the group-based communication messages 808A-808F, for example based on the author identifier, channel identifier, workspace identifier, and/or a combination thereof. In some embodiments, the group-based communication system is configured to identify the data retention policy based at least on the organization identifier associated with the author identifier for each group-based communication message.

In the particular context illustrated, all data within the common group-based communication channel is governed by the Agreed Policy, for example based on assigning of the Agreed Policy by the owner organization and subsequent agreement to the Agreed Policy by the other organization and/or authenticated user accounts associated therewith. As such, the Agreed Policy governs storage of each of the group-based communication messages 808A-F, regardless of the associated default and/or assigned data retention policies for an organization and/or other entity associated with the authenticated user account identified by the author identifier.

Accordingly, data table 810 represents the group-based communication messages 808A-808F after the performed data retention process. As illustrated, the group-based communication system is configured to delete at least a portion of the content for group-based communication messages that does not satisfy the governing data retention policy. The deleted portion of data may represent at least message content data for the group-based communication message. Additionally or alternatively, in some embodiments, the group-based communication system is configured to delete user identification data associated with the group-based communication message, such as at least one author identifier and/or recipient identifier(s). In at least some embodiments, the group-based communication system is configured to delete all information except message metadata and/or necessary information for linking the group-based communication message with a specific workspace and/or channel for displaying (for example, a group-based communication channel identifier and a group-based workspace identifier). In other example contexts, the group-based communication system is configured to entirely delete and/or otherwise make inaccessible the group-based communication messages determined to not satisfy their corresponding data retention policy.

To perform an appropriate data management action, the group-based communication system may be configured to compare the difference between the current timestamp and the received timestamp for each group-based communication message with the retention interval included in and/or represented by the governing data retention policy. In this regard, as illustrated for example, group-based communication message 808A is associated with a received timestamp of "JUN-12-2019," whereas the current timestamp is "JUN-17-2019," thus resulting in a difference representing 5 calendar days. As described above, the Agreed Policy represents or otherwise includes a retention interval of 5 calendar days. Accordingly, in an example circumstance where the difference does not satisfy if greater than and/or equal to the retention interval, the group-based communication system is configured to determine the group-based communication message 808A does not satisfy the Agreed Policy that governs, and perform a data management action of deleting at least a portion of data from the group-based communication message 808A. As illustrated, this data management action is performed for a greater timestamp interval than defined by the timestamp interval represented in the default data retention policy for the corresponding organization. As such, the Agreed Policy enables the group-based communication messages within common group-based communication channel to be managed as desired by the organization that created the Agreed Policy.

Similarly, group-based communication message 808B is associated with a received timestamp of "JUN-12-2019," thus resulting in a difference representing 5 calendar days. Group-based communication message 808B is associated with a second author identifier associated with Organization 4. However, as described above, the Agreed Policy governs the storage of the group-based communication messages posted within the common group-based communication channel regardless of the organization associated with the author identifier. Accordingly, group-based communication system thus results in a timestamp difference representing 5 calendar days for the group-based communication message 808B. Continuing the example circumstance as illustrated and described, the group-based communication system is configured to determine the group-based communication message 808B does not satisfy the Agreed Policy that governs, and perform a data management action of deleting at least a portion of data from the group-based communication message 808B.

The remaining group-based communication messages 808C-808F are each associated with a variety of author identifiers, and thus associated organizations. However, despite the default data retention policies for Organization 3 and Organization 4, the assigned Agreed Policy overrides such default data retention policies. In this regard, in the illustrated example context, the group-based communication system may identify the timestamp difference for the group-based communication message 808C to represent 3 calendar days. Based on the timestamp difference, the group-based communication system may determine that the group-based communication message 808C satisfies the governing Agreed Policy, and perform a data management action of retaining storage of the group-based communication message 808C as unaltered. In an alternative circumstance where the Agreed Policy did not govern the common group-based communication channel, for example where the Agreed Policy was not assigned to the common group-based communication channel and Policy 3 governs storage of the group-based communication message 808C, the group-based communication message would not satisfy the data retention interval of Policy 3. In such a circumstance, the group-based communication system would perform a data management action deleting all or at least a portion of the group-based communication message 808C. In this regard, the Agreed Policy overrides and extends the length of time that group-based communication messages associated with Organization 3 are retained by the group-based communication system. Additionally or alternatively still, in some embodiments, the agreed data retention policy defines an appropriate message management action, for example based on a user-configured value for one or more settings embodied in the agreed data retention policy.

Agreed policy-based identification of a governing data retention policy enables the group-based communication system to manage group-based communication messages in a common group-based communication channel based on a single data retention policy. In this regard, an owner organization for the common group-based communication channel may configure the group-based communication system to utilize their desired data retention policy for the common group-based communication channel. Such configuration enables the data privacy and/or data security goals of the owner organization to be met even in the context of access by multiple organizations. In this regard, the Agreed Policy may be designed to reflect the most stringent requirements of each organization having access to the common group-based communication channel. Similarly, in a circumstance where an agreed data retention policy overrides a default data retention policy author-based identification of a governing data retention policy, processing resources and/or the like may be conserved by minimizing the number of data retention policies that the group-based communication system must identify. For example, in some example embodiments, in a circumstance where a group-based communication system identifies that a common group-based communication channel is assigned or otherwise governed by an agreed data retention policy, the group-based communication system may utilize the agreed data retention policy for each group-based communication message associated with the common group-based communication channel without subsequently identifying the agreed data retention policy for each author identifier and/or identified organization associated with such group-based communication messages.

Example Processes for Common Group-Based Communication Channel Data Management by a Group-Based Communication System Having described example systems, apparatuses, and visualizations associated with embodiments of the present disclosure, example flowcharts including various operations performed by the above described apparatuses and/or systems will now be discussed. It should be appreciated that each of the flowcharts depicts an example computer-implemented process that may be performed by one or more of the above described apparatuses, systems, and/or devices, for example using one or more of the components described herein. The blocks of each process may be arranged in any of a number of ways, as depicted and described herein. In some such embodiments, one or more blocks of a first process may occur in-between one or more blocks, or otherwise operate as a sub-process, of a second process. Additionally or alternatively, the process may include some or all of the steps described and/or depicted, including one or more optional blocks in some embodiments. In regards to the below described flowcharts, one or more of the depicted blocks may be optional in some, or all, embodiments of the present disclosure. Optional blocks are depicted with broken (or "dashed") lines. FIGS. 9-21 each illustrate a flowchart depicting example operations for group-based communication channel data management in accordance with at least one example embodiment of the present disclosure.

Figure 9A:
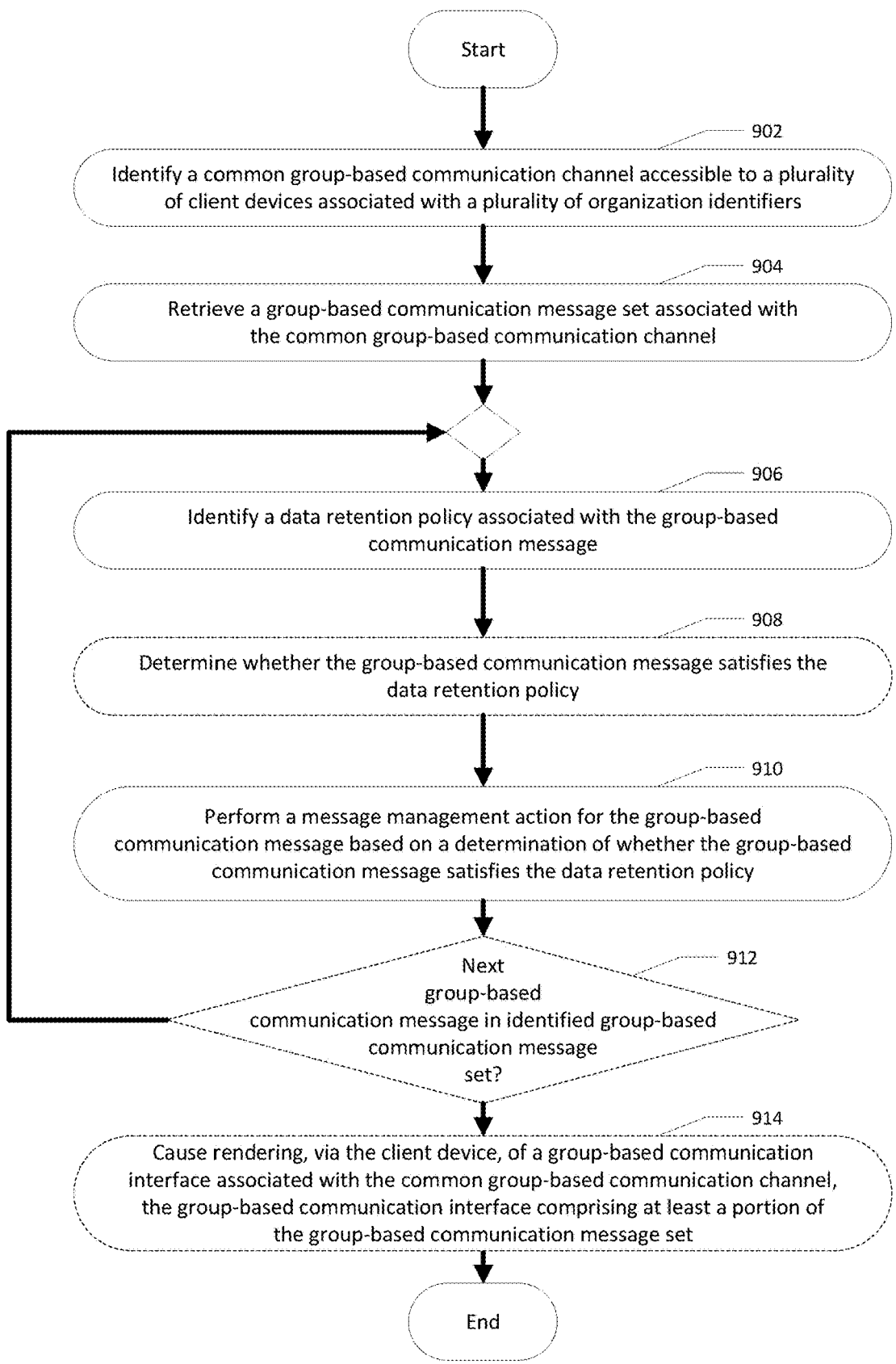

FIG. 9A illustrates one example process for group-based communication channel data management, specifically for data management based on one or more data retention policies, in accordance with at least some example embodiments of the present disclosure. In this regard, the example process depicts some or all operations of an example data retention process. The example illustrated process may be performed by a specially configured group-based communication system, for example embodied as the specially configured apparatus 200. In this regard, in some such embodiments, the apparatus 200 is specially configured by computer program instructions stored therein, for example in the memory 204 and/or another depicted component, and/or otherwise accessible to the apparatus 200. In some embodiments, the specially configured apparatus 200 includes or otherwise is in communication with one or more other apparatuses, systems, devices, and/or the like, for example one or more client device(s) and/or external resources, to facilitate one or more of the operations described with respect to the illustrated process.

The illustrated process begins at block 902. At block 902, the apparatus 200 includes means, such as the group-based communication module 210, data management module 212, processor 202, and/or the like, or a combination thereof, configured to identify a common group-based communication channel accessible to a plurality of organization identifiers. In some embodiments, the apparatus 200 is configured to query one or more group-based communication datastore(s) to identify a common group-based communication channel for management. In this regard, in some embodiments, the apparatus 200 is configured to identify each common group-based communication channel stored by the group-based communication system, and/or each common group-based communication channel for one or more organization(s), for management. As described, in some embodiments, the common group-based communication channel is identified based on a group-based communication channel identifier and/or group-based workspace identifier.

At block 904, the apparatus 200 includes means, such as the group-based communication module 210, data management module 212, processor 202, and/or the like, or a combination thereof, configured to retrieve a group-based communication message set associated with the common group-based communication channel. In some embodiments, to retrieve the group-based communication message set associated with the common group-based communication channel, the apparatus 200 is configured to query one or more group-based communication datastore to retrieve the group-based communication message set. For example, the apparatus 200 may query one or more group-based communication datastore(s) for group-based communication messages including the channel identifier and/or workspace identifier associated with the common group-based communication channel. In this regard, in at least one example context, the group-based communication message set includes some or all group-based communication messages posted to the common group-based communication channel by any number of authenticated user accounts associated with any number of organizations having access to the common group-based communication channel.

The process then continues to block 906-912 for any number of group-based communication messages. In some embodiments, the apparatus 200 is configured to perform each of the blocks 906-912 for each group-based communication message in the identified group-based communication message set. In this regard, blocks 906-912 embody a subprocess for managing a particular group-based communication message based on a governing data retention policy.

In this regard, blocks 906-912 may be performed for a group-based communication message of the identified group-based communication message set. At block 906, the apparatus 200 includes means, such as the group-based communication module 210, data management module 212, processor 202, and/or the like, or a combination thereof, configured to identify a data retention policy associated with the group-based communication message. In some embodiments, the apparatus 200 identifies the data retention policy based on an author identifier for the group-based communication message. In this regard, the apparatus 200 may be configured to utilize an author-based policy identification process, as described above, to identify the data retention policy that governs storage of the group-based communication message. Alternatively or additionally, in some embodiments, the apparatus 200 identifies the data retention policy based on the common group-based communication channel. In this regard, the apparatus 200 may be configured to utilize an agreed policy-based identification process, as described above, to identify the data retention policy that governs storage of the group-based communication message. Examples sub-processes to identify a data retention policy associated with the group-based communication message are described below with respect to FIGS. 10, 11A, and 11B.

At block 908, the apparatus 200 includes means, such as the group-based communication module 210, data management module 212, processor 202, and/or the like, or a combination thereof, configured to determine whether the group-based communication message satisfies the data retention policy. In at least one example embodiment, the data retention policy includes and/or otherwise represents a particular retention interval. In some such embodiments, group-based communication system is configured to determine whether the group-based communication message satisfies the data retention policy by identifying a retrieved timestamp for the group-based communication message, determining a timestamp difference based on a current timestamp (or other predetermined timestamp to be used for the data management process) where the timestamp difference indicates a length of time the group-based communication system has been stored, and comparing the timestamp difference with the timestamp interval to determine if the timestamp difference satisfies the retention interval. In some example embodiments, the timestamp difference satisfies the retention interval when the timestamp difference falls within or otherwise does not exceed the retention interval. It should be appreciated that, in other embodiments, an alternative mathematical comparison may be utilized (e.g., the timestamp difference may satisfy the retention interval when the timestamp difference exceeds the retention interval). In other embodiments, the apparatus 200 determines whether the group-based communication message satisfies the data retention policy based on one or more other determinations, for example whether one or more events defined in the data retention policy has occurred or otherwise been triggered. For example, in some embodiments, the group-based communication message satisfies the data retention policy until an event is triggered indicating the message should be deleted (thus, no longer satisfying the governing data retention policy).

At block 910, the apparatus 200 includes means, such as the group-based communication module 210, data management module 212, processor 202, and/or the like, or a combination thereof, configured to perform a message management action for the group-based communication message based on the determination of whether the group-based communication message satisfies the data retention policy. For example, in some embodiments, in a circumstance where the group-based communication message is determined to not satisfy the data retention policy the apparatus 200 performs a deletion action to delete, and/or otherwise make inaccessible, all or a portion of the group-based communication message. Alternatively or additionally, in some embodiments, in a circumstance where the group-based communication message is determined to satisfy the data retention policy the apparatus 200 performs a management action to continue to retain storage of the group-based communication message and all data therein without alteration. Additionally or alternatively still, in some embodiments, the data retention policy defines an appropriate message management action, for example based on a user-configured value for one or more settings embodied in the data retention policy.

At optional decision block 912, the apparatus 200 includes means, such as the group-based communication module 210, data management module 212, processor 202, and/or the like, or a combination thereof, configured to determine whether there is a next group-based communication message in the identified group-based communication message set. In this regard, in some embodiments, the apparatus 200 is configured to iterate through all of the group-based communication message set or a subset of the identified group-based communication message set during management. In some embodiments, the apparatus 200 is configured to identify the next group-based communication message in the identified group-based communication message set if one remains, and, if identified, return to block 906 for the next group-based communication message. Alternatively or additionally, in some embodiments, in a circumstance where the apparatus 200 determines all, or a target subset, of the group-based communication message set has been iterated through, flow ends and/or continues to another process and/or operation described with respect to one of the processes depicted and described herein. For example, in some embodiments, the apparatus 200 is configured to repeat blocks 906-910 for at least one group-based communication message in the group-based communication message set. In some embodiments, the operations may be performed for only, or at least, a first group-based communication message. In yet other embodiments, the operations may not be performed for any group-based communication messages, such as when the group-based communication message set associated with the common group-based communication channel includes no group-based communication messages.

At optional block 914, the apparatus 200 includes means, such as the group-based communication module 210, data management module 212, processor 202, and/or the like, or a combination thereof, configured to cause rendering, via the client device, of a group-based communication interface associated with the common group-based communication channel. In some embodiments, the group-based communication interface comprises at least a portion of the group-based communication message set. In this regard, the group-based communication interface may include one or more group-based communication messages, each group-based communication message associated with a governing data retention policy. In some embodiments, for example, only the retained group-based communication messages are rendered to the group-based communication interface. In other embodiments, the group-based communication interface renders each group-based communication message differently based on whether a data management action was performed based on the data retention policy for the group-based communication message. For example, in some embodiments, the apparatus 200 is configured to cause rendering of group-based communication messages that were deleted as visually distinguished from the retained group-based communication messages. In at least one example context, for example, a group-based communication message that was deleted may be rendered as a predetermined image indicating the message has been deleted, and/or may be rendered with text indicating the message has been deleted (for example, "This message has been deleted"). In some embodiments, additionally or alternatively, rendering a deleted group-based communication message comprises at least rendering information associated with the data retention policy governing the group-based communication message, and/or the data retention policy governing an associated entity (for example, "This message has been deleted in accordance with ACME Corp.'s data retention policy for this channel" or "This message has been deleted in accordance with ACME Corp.'s data retention policy X"). In this regard, additionally or alternatively, it should be appreciated that any of a myriad of information associated with the deletion of the group-based communication message may be rendered, such as the datetime of deletion.

Figure 9B:
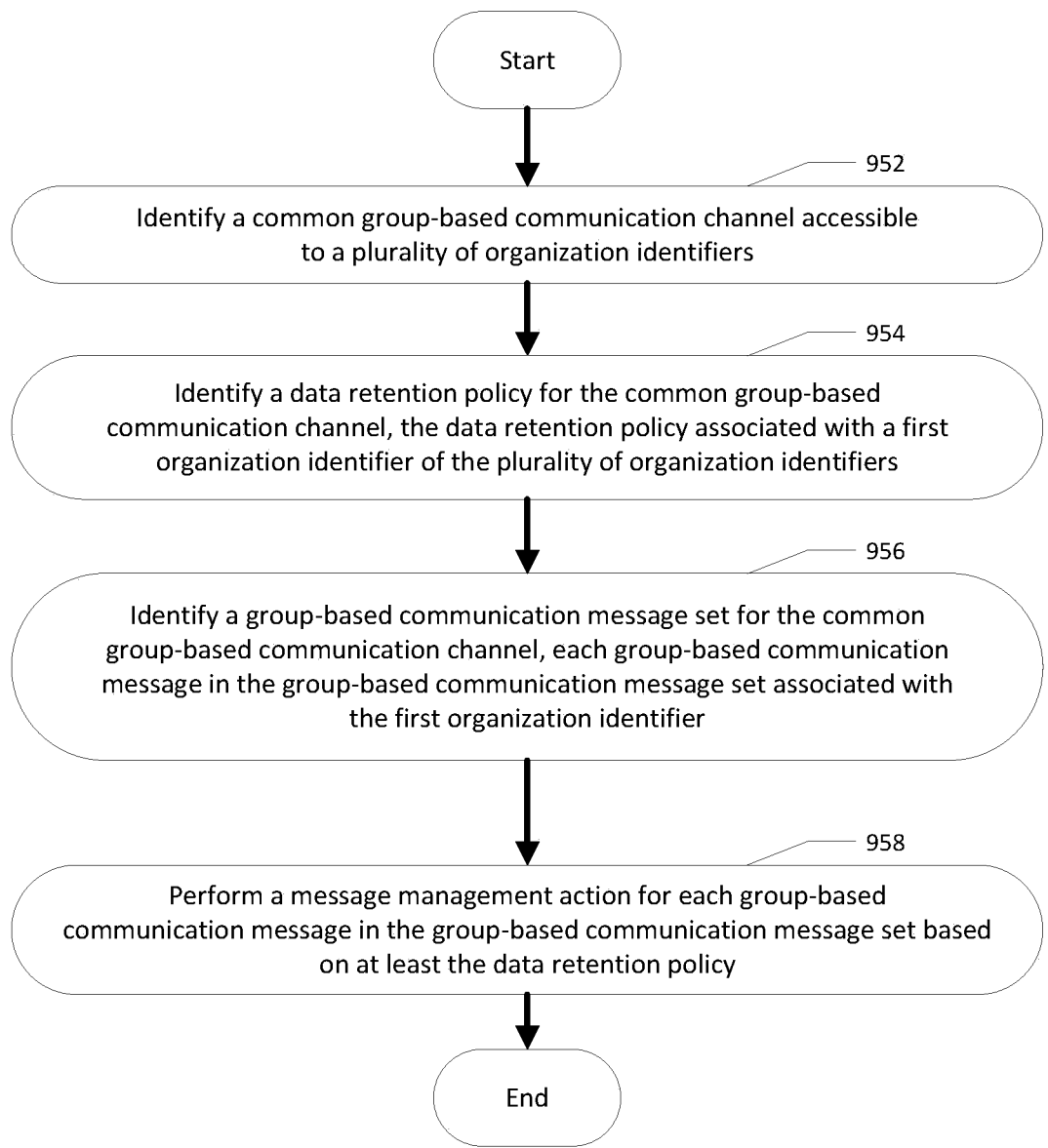

FIG. 9B illustrates another explanation for the example process for group-based communication channel data management, specifically for managing group-based communication messages associated with a particular organization identifier, in accordance with at least some example embodiments of the present disclosure. In this regard, the example process depicts some or all operations of an example data retention process. The example illustrated process may be performed by a specially configured group-based communication system, for example embodied as the specially configured apparatus 200. In this regard, in some such embodiments, the apparatus 200 is specially configured by computer program instructions stored therein, for example in the memory 204 and/or another depicted component, and/or otherwise accessible to the apparatus 200. In some embodiments, the specially configured apparatus 200 includes or otherwise is in communication with one or more other apparatuses, systems, devices, and/or the like, for example one or more client device(s) and/or external resources, to facilitate one or more of the operations described with respect to the illustrated process. It should be appreciated that the operations of FIG. 9B may similarly be performed as described with one or more of the processes described with respect to the flowcharts described below.

At block 952, the apparatus 200 includes means, such as the group-based communication module 210, data management module 212, processor 202, and/or the like, or a combination thereof, configured to identify a common group-based communication channel accessible to a plurality of organization identifiers. For example, as described, the apparatus 200 may query one or more group-based communication datastore(s) to identify a common group-based communication channel for management. In some embodiments, the apparatus 200 is configured to identify a common group-based communication channel for a particular organization to be managed. In some embodiments, the apparatus 200 is configured to identify a common group-based communication channel for a particular entity to be managed, such as a workspace.

At block 954, the apparatus 200 includes means, such as the group-based communication module 210, data management module 212, processor 202, and/or the like, or a combination thereof, configured to identify a data retention policy for the common group-based communication channel, where the data retention policy is associated with a first organization identifier of the plurality of organization identifiers. In some embodiments, for example, the apparatus 200 is configured to query a datastore utilizing the group-based communication channel identifier and the common group-based communication channel identifier. For example, the apparatus 200 may query the database to identify a data retention policy assigned to the common group-based communication channel, and/or a higher-level entity, for the first organization identifier. It should be appreciated that, in some embodiments, a higher-level data retention policy functions as a default data retention policy that governs data retention of messages in the common group-based communication channel associated with the first organization identifier.

At block 956, the apparatus 200 includes means, such as the group-based communication module 210, data management module 212, processor 202, and/or the like, or a combination thereof, configured to identify a group-based communication message set for the common group-based communication channel, where each group-based communication message in the group-based communication message set is associated with the first organization identifier. In some embodiments, the apparatus 200 is configured to query one or more databases for group-based communication messages transmitted within the common group-based communication channel. In this regard, the apparatus 200 may query for group-based communication messages associated with an author identifier representing an authenticated user account that is a member of the organization of the first organization identifier. In at least one example context, the apparatus 200 may identify a set of authenticated user account identifiers permissioned to access the common group-based communication channel and that are also a member of the organization identified by the first organization identifier (e.g., the authenticated user account identifier is associated with the organization identifier). The apparatus 200 may query for group-based communication messages associated with an author identifier that matches an authenticated user account identifier in the identified set of authenticated user account identifiers.

At block 958, the apparatus 200 includes means, such as the group-based communication module 210, data management module 212, processor 202, and/or the like, or a combination thereof, configured to perform a message management action for each group-based communication message in the group-based communication message set based on at least the data retention policy. In at least one example embodiment, the apparatus 200 is configured to determine whether the group-based communication message satisfies the data retention policy. For example, in an example circumstance where the apparatus 200 determines the group-based communication message satisfies the data retention policy, the apparatus 200 performs a management action to continue to retain storage of the group-based communication message, and/or all data therein, without alteration. In another circumstance where the apparatus 200 determines the group-based communication message does not satisfy the data retention policy, the apparatus 200 performs a management action to delete, and/or otherwise make inaccessible, all or a portion of the group-based communication message. Additionally or alternatively still, in some embodiments, the data retention policy defines an appropriate message management action, for example based on a user-configured value for one or more settings embodied in the data retention policy. Such determinations may be repeated for any number of group-based communication messages, for example to manage all group-based communication messages in the group-based communication message set.

In some embodiments, the apparatus 200 may be configured to identify a first organization identifier to manage. In this regard, the apparatus 200 may be configured to identify the first organization identifier, and subsequently identify a common group-based communication channel identifier, associated with the organization identifier, which represents an associated common group-based communication channel for management. A set of group-based communication messages may subsequently be identified, and managed as described herein. As such, it should be appreciated that the process as described may include additional operations, alternative operations, and/or an alternative order of such operations.

It should be appreciated that the process described above with respect to FIG. 9B, or a subprocess thereof, may be repeated for any number of group-based communication channel(s) and/or organizations. For example, in at least one embodiment, the apparatus 200 may perform the process as described with respect to blocks 954-958 for one or more other organization(s) having access to the common group-based communication channel. In this regard, the apparatus 200 may manage data associated with a particular common group-based communication channel for any number of organizations. Additionally or alternatively, the apparatus 200 may perform the process as described for at least one other common group-based communication channel. In this regard, the apparatus 200 may manage data associated with any number of common group-based communication channels.

Figure 10:
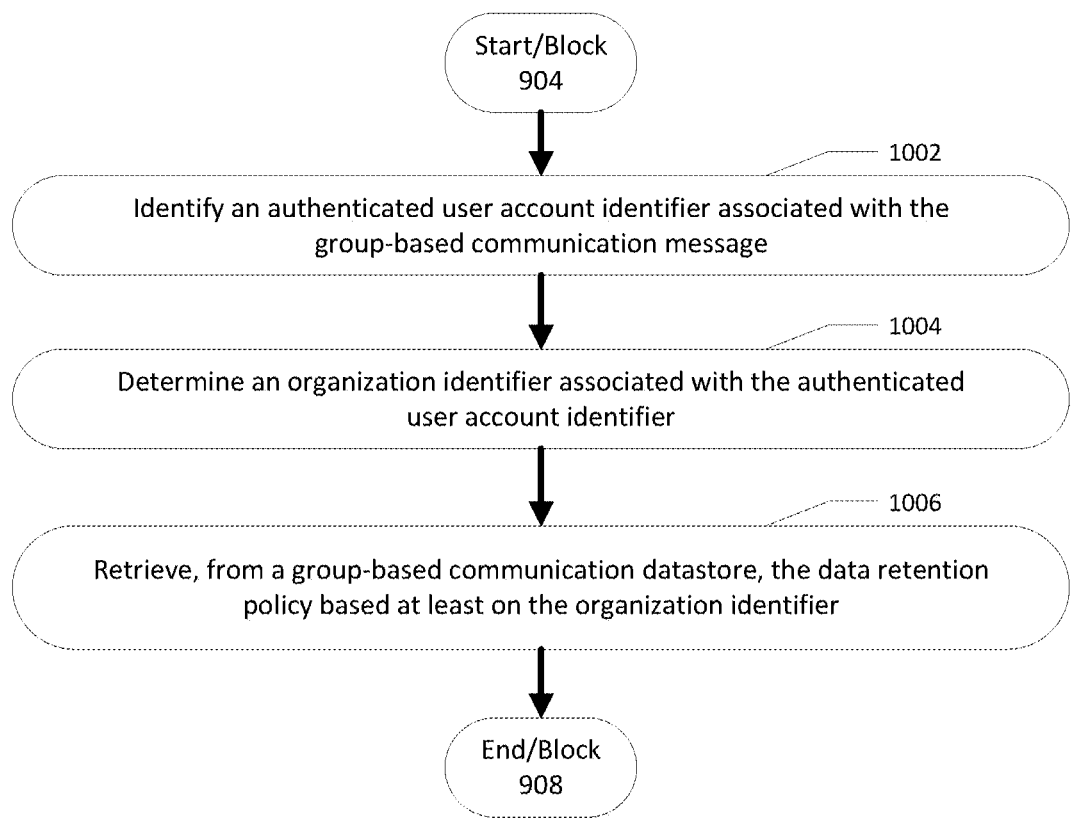

FIG. 10 illustrates yet another for group-based communication channel data management, specifically to identify a data retention policy for a group-based communication message, in accordance with at least some example embodiments of the present disclosure. In this regard, the example process may embody an author-based policy identification process. The example illustrated process may be performed by a specially configured group-based communication system, for example embodied as the specially configured apparatus 200. In this regard, in some such embodiments, the apparatus 200 is specially configured by computer program instructions stored therein, for example in the memory 204 and/or another depicted component, and/or otherwise accessible to the apparatus 200. In some embodiments, the specially configured apparatus 200 includes or otherwise is in communication with one or more other apparatuses, systems, devices, and/or the like, for example one or more client device(s) and/or external resources, to facilitate one or more of the operations described with respect to the illustrated process.

The illustrated process begins at block 1002. In some embodiments, the process begins after one or more of the blocks depicted and/or described with respect to one of the other processes described herein. For example, in some embodiments as described, the process begins after execution of block 904. In this regard, the process depicted with respect to FIG. 10 may replace or supplement one or more blocks depicted and/or described with respect to one of the other processes described herein. For example, in some embodiments as described, the process depicted with respect to FIG. 10 supplants the operation depicted and described with respect to block 906.

At block 1002, the apparatus 200 includes means, such as the group-based communication module 210, data management module 212, processor 202, and/or the like, or a combination thereof, configured to identify an authenticated user account identifier associated with the group-based communication message. In some embodiments, the apparatus 200 is configured to identify the authenticated user account identifier based on an author identifier property of the group-based communication message. In this regard, the authenticated user account identifier represents the authenticated user account that posted and/or otherwise created the group-based communication message.

At block 1004, the apparatus 200 includes means, such as the group-based communication module 210, data management module 212, processor 202, and/or the like, or a combination thereof, configured to determine an organization identifier associated with the authenticated user account identifier. In some embodiments, the apparatus 200 is configured to query a group-based communication datastore based on the authenticated user account identifier to retrieve a data record corresponding to the authenticated user account identifier. In some such embodiments, the apparatus 200 is configured to parse the organization identifier from the retrieved data record. Alternatively or additionally, in some embodiments, the organization identifier is identified from the group-based communication message.

At block 1006, the apparatus 200 includes means, such as the group-based communication module 210, data management module 212, processor 202, and/or the like, or a combination thereof, configured to query a group-based communication datastore based at least on the organization identifier to retrieve the data retention policy from the group-based communication datastore. In some embodiments, for example, the apparatus 200 is configured to identify a data retention policy assigned to the common group-based communication channel for the organization. Alternatively or additionally, in some embodiments, the apparatus 200 is configured to identify a default retention policy for the organization or a sub-entity thereof. For example, in some embodiments, the apparatus 200 is configured to query for a workspace associated with the common group-based communication channel and associated with the organization identifier, and/or query for a data retention policy associated with the identified workspace.

In some embodiments, upon completion of block 1006, the process ends. In other embodiments, the flow returns to one or more other operations depicted with respect to one of the other processes depicted and/or described herein. For example, in some embodiments, flow returns to block 908 as depicted with respect to FIG. 9A upon completion of block 1006.

Figure 11A:
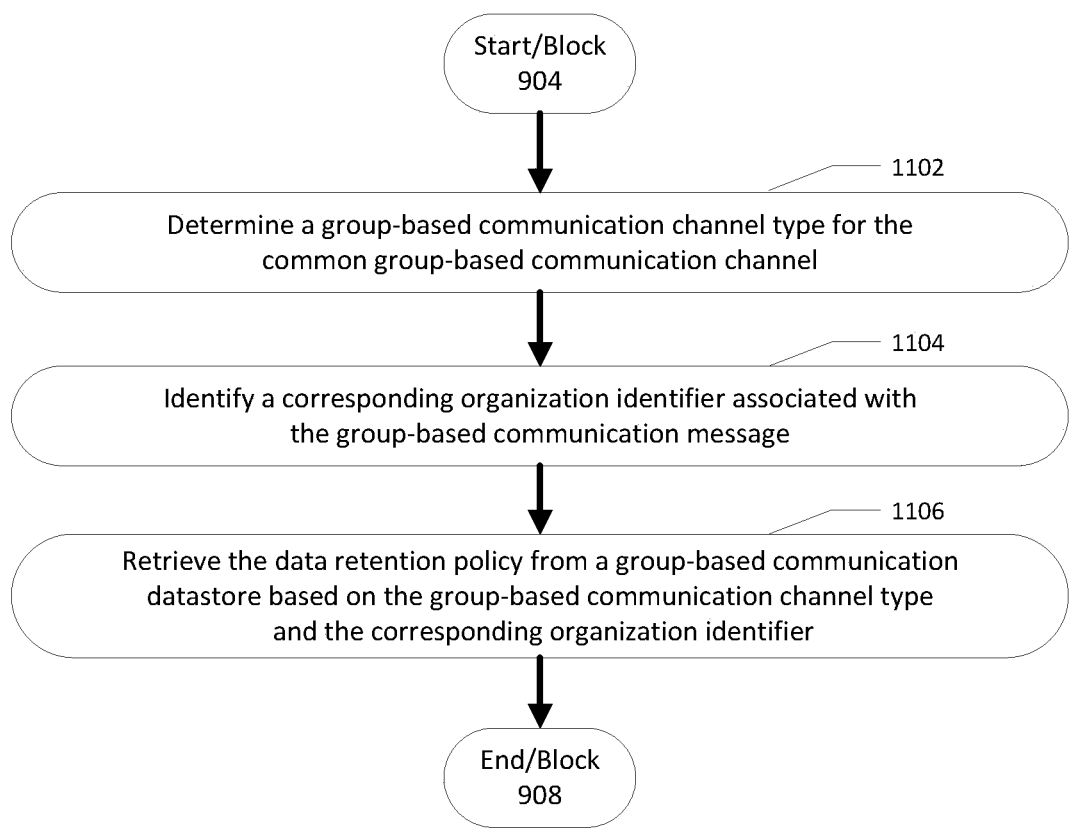

FIG. 11A illustrates yet another process for group-based communication channel data management, specifically to identify a data retention policy for a group-based communication message, in accordance with at least some example embodiments of the present disclosure. In this regard, the example process may embody another author-based policy identification process. The example illustrated process may be performed by a specially configured group-based communication system, for example embodied as the specially configured apparatus 200. In this regard, in some such embodiments, the apparatus 200 is specially configured by computer program instructions stored therein, for example in the memory 204 and/or another depicted component, and/or otherwise accessible to the apparatus 200. In some embodiments, the specially configured apparatus 200 includes or otherwise is in communication with one or more other apparatuses, systems, devices, and/or the like, for example one or more client device(s) and/or external resources, to facilitate one or more of the operations described with respect to the illustrated process.

The illustrated process begins at block 1102. In some embodiments, the process begins after one or more of the blocks depicted and/or described with respect to one of the other processes described herein. For example, in some embodiments as described, the process begins after execution of block 904. In this regard, the process depicted with respect to FIG. 11 may replace or supplement one or more blocks depicted and/or described with respect to one of the other processes described herein. For example, in some embodiments as described, the process depicted with respect to FIG. 11 supplants the operation depicted and described with respect to block 906.

At block 1102, the apparatus 200 includes means, such as the group-based communication module 210, data management module 212, processor 202, and/or the like, or a combination thereof, configured to determine a group-based communication channel type for the common group-based communication channel. In some embodiments, the apparatus 200 is configured to parse the group-based communication channel type from the common group-based communication channel. In other embodiments, the apparatus 200 is configured to query a group-based communication datastore for the group-based communication channel type, for example based on a group-based communication channel identifier for the common group-based communication channel. In some embodiments, the group-based communication channel type represents one of a public group-based communication channel, private group-based communication channel, and/or the like.

At block 1104, the apparatus 200 includes means, such as the group-based communication module 210, data management module 212, processor 202, and/or the like, or a combination thereof, configured to identify a corresponding organization identifier associated with the group-based communication message. In some embodiments, the apparatus 200 is configured to query a group-based communication datastore based on the authenticated user account identifier to retrieve a data record corresponding to the authenticated user account identifier. In some such embodiments, the apparatus 200 is configured to parse the organization identifier from the retrieved data record. Alternatively or additionally, in some embodiments, the organization identifier is identified from the group-based communication message.

At block 1106, the apparatus 200 includes means, such as the group-based communication module 210, data management module 212, processor 202, and/or the like, or a combination thereof, configured to retrieve the data retention policy from a group-based communication datastore based on the group-based communication channel type and the corresponding organization identifier. For example, in this regard, the apparatus 200 may identify a data retention policy assigned, for the corresponding organization identifier, as a default data retention policy for the group-based communication channel type. In some such embodiments, the organization may be associated with a default data retention policy assigned for one or more specific group-based communication channel types, such that group-based communication channels of each group-based communication channel type is managed based on the corresponding assigned data retention policy.

In some embodiments, upon completion of block 1106, the process ends. In other embodiments, the flow returns to one or more other operations depicted with respect to one of the other processes depicted and/or described herein. For example, in some embodiments, flow returns to block 908 as depicted with respect to FIG. 9A upon completion of block 1106.

Figure 11B:
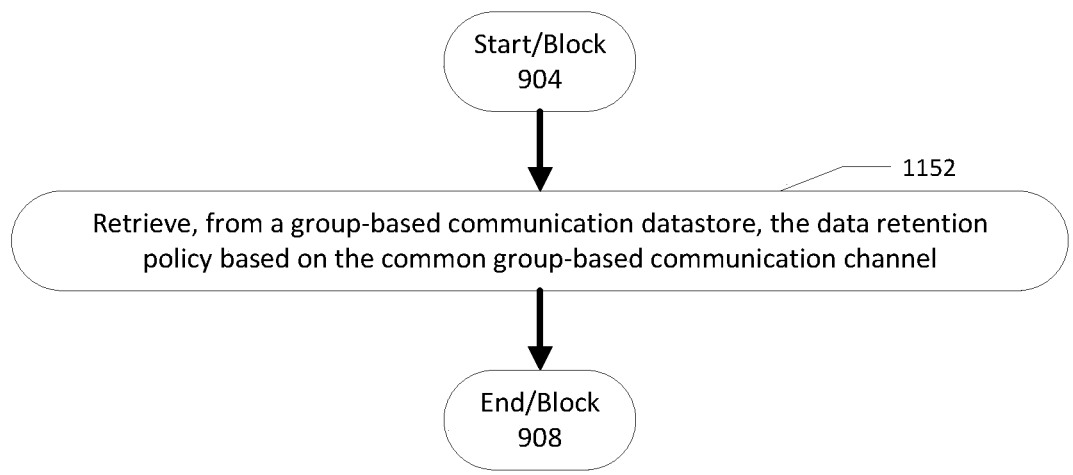

FIG. 11B illustrates yet another process for group-based communication channel data management, specifically to identify a data retention policy for a group-based communication message, in accordance with at least some example embodiments of the present disclosure. In this regard, the example process may embody another author-based policy identification process. The example illustrated process may be performed by a specially configured group-based communication system, for example embodied as the specially configured apparatus 200. In this regard, in some such embodiments, the apparatus 200 is specially configured by computer program instructions stored therein, for example in the memory 204 and/or another depicted component, and/or otherwise accessible to the apparatus 200. In some embodiments, the specially configured apparatus 200 includes or otherwise is in communication with one or more other apparatuses, systems, devices, and/or the like, for example one or more client device(s) and/or external resources, to facilitate one or more of the operations described with respect to the illustrated process.

The illustrated process begins at block 1152. In some embodiments, the process begins after one or more of the blocks depicted and/or described with respect to one of the other processes described herein. For example, in some embodiments as described, the process begins after execution of block 904. In this regard, the process depicted with respect to FIG. 11 may replace or supplement one or more blocks depicted and/or described with respect to one of the other processes described herein. For example, in some embodiments as described, the process depicted with respect to FIG. 11 supplants the operation depicted and described with respect to block 906.

At block 1152, the apparatus 200 includes means, such as the group-based communication module 210, data management module 212, processor 202, and/or the like, or a combination thereof, configured to retrieve, from a group-based communication datastore, the data retention policy based on the common group-based communication channel. For example, in some embodiments, the group-based communication datastore is queried based on the group-based communication channel identifier for the common group-based communication channel. For example, in some embodiments, the apparatus 200 is configured to create and store, in one or more group-based communication datastore(s), at least one data record representing an assignment of a data retention policy to corresponding group-based communication channels. In this regard, in some such embodiments at block 1152, the apparatus 200 is configured to retrieve such data record(s) by querying the group-based communication datastore(s). In some embodiments, the data retention policy embodies an agreed data retention policy for the common group-based communication channel. In some embodiments, the apparatus 200 is similarly configured to retrieve and/or perform one or more checks for corresponding data indicating a storage policy approved by at least one of plurality of organizations having access to the common group-based communication channel.

In some embodiments, upon completion of block 1152, the process ends. In other embodiments, the flow returns to one or more other operations depicted with respect to one of the other processes depicted and/or described herein. For example, in some embodiments, flow returns to block 908 as depicted with respect to FIG. 9A upon completion of block 1152.

Figure 12:
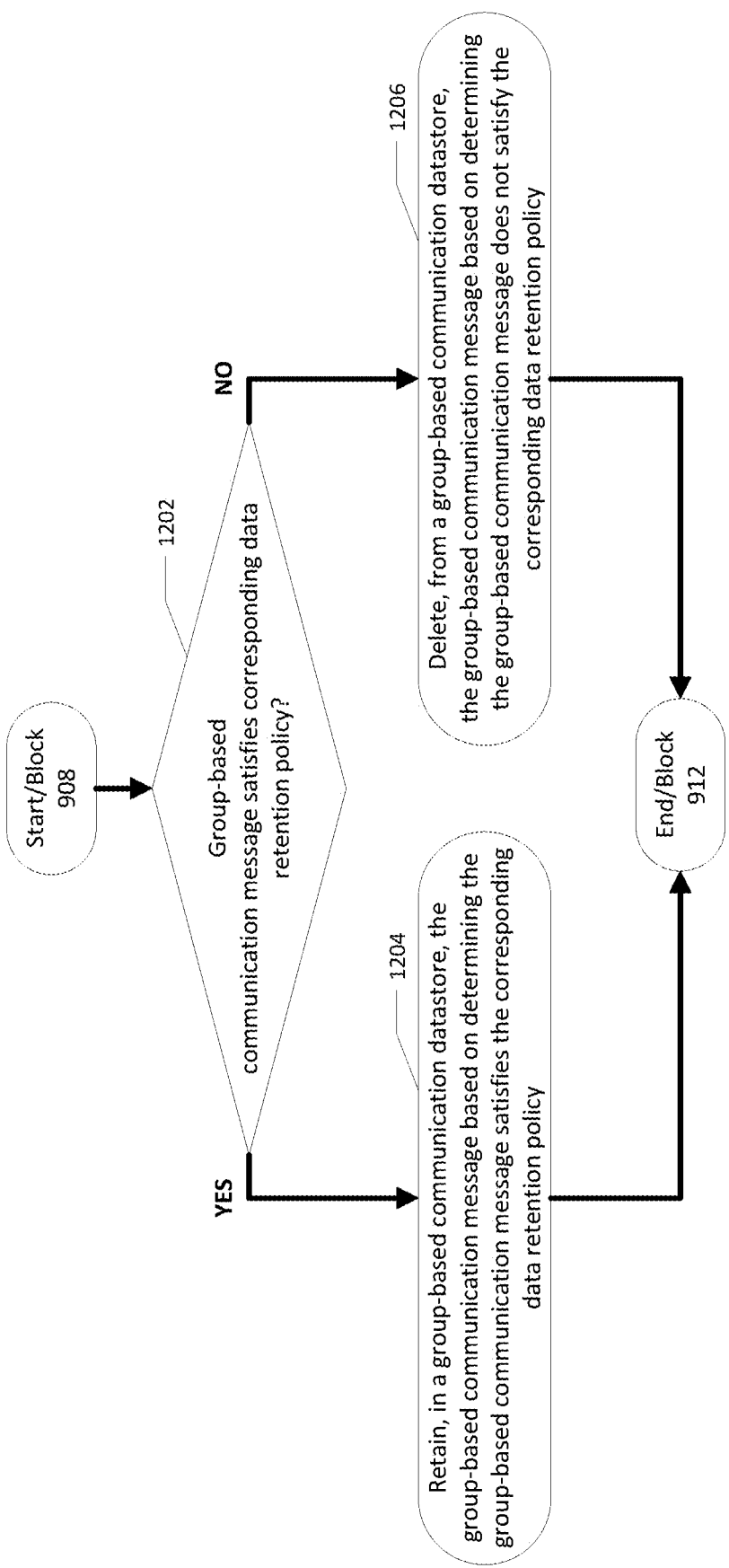

FIG. 12 illustrates a process for group-based communication channel data management, specifically perform a message management action for the group-based communication message based on the determination of whether the group-based communication message satisfies the data retention policy, in accordance with at least some example embodiments of the present disclosure. The example illustrated process may be performed by a specially configured group-based communication system, for example embodied as the specially configured apparatus 200. In this regard, in some such embodiments, the apparatus 200 is specially configured by computer program instructions stored therein, for example in the memory 204 and/or another depicted component, and/or otherwise accessible to the apparatus 200. In some embodiments, the specially configured apparatus 200 includes or otherwise is in communication with one or more other apparatuses, systems, devices, and/or the like, for example one or more client device(s) and/or external resources, to facilitate one or more of the operations described with respect to the illustrated process.

The illustrated process begins at decision block 1202. In some embodiments, the process begins after one or more of the blocks depicted and/or described with respect to one of the other processes described herein. For example, in some embodiments as described, the process begins after execution of block 908. In this regard, the process depicted with respect to FIG. 12 may replace or supplement one or more blocks depicted and/or described with respect to one of the other processes described herein. For example, in some embodiments as described, the process depicted with respect to FIG. 12 supplants the operation depicted and described with respect to block 910.

At decision block 1202, the apparatus 200 includes means, such as the group-based communication module 210, data management module 212, processor 202, and/or the like, or a combination thereof, configured to identify whether the group-based communication message satisfies the corresponding data retention policy. In this regard, the apparatus 200 identifies whether the group-based communication message satisfies the corresponding data retention policy based on a previous determination, for example at block 908. In some embodiments, the determination represents the comparison between the group-based communication message and data retention policy.

In a circumstance where the group-based communication message satisfies the data retention policy, flow continues to block 1204. At block 1204, the apparatus 200 includes means, such as the group-based communication module 210, data management module 212, processor 202, and/or the like, or a combination thereof, configured to retain the group-based communication message based on determining the group-based communication message satisfies the corresponding data retention policy. In this regard, in some embodiments, the apparatus 200 continues storing the group-based communication message without deleting the group-based communication message or any portion thereof. As such, the apparatus 200 may continue to store the group-based communication message in an unaltered state, and perform no further action with respect to managing storage of the group-based communication message.

Returning to decision block 1202, in a circumstance where the group-based communication message does not satisfy the data retention policy, flow continues to block 1206. At block 1206, the apparatus 200 includes means, such as the group-based communication module 210, data management module 212, processor 202, and/or the like, or a combination thereof, configured to delete the group-based communication message based on determining the group-based communication message does not satisfy the corresponding data retention policy. The apparatus 200 may delete the group-based communication message from one or more group-based communication datastore(s). In some embodiments, to delete the group-based communication message, the apparatus 200 is configured to delete all data embodying the group-based communication message. In other embodiments, the apparatus 200 is configured to delete at least a portion of the data embodying the group-based communication message. For example, in some embodiments, the apparatus 200 is configured to delete one or more predetermined property values from the group-based communication message, for example at least a message content data of the group-based communication message. Additionally or alternatively, in some embodiments, the apparatus 200 is configured to delete one or more user identification data portions, such as an author identifier and/or the like. In yet other embodiments, to delete the group-based communication message, the apparatus 200 is configured to make inaccessible some or all of the data embodying the group-based communication message. In this regard, in some such embodiments, the apparatus 200 may delete the group-based communication message may without physical deletion and/or removal of the data from one or more group-based communication datastore(s).

In some embodiments, upon completion of block 1204 or 1206, the process ends. In other embodiments, the flow returns to one or more other operations depicted with respect to one of the other processes depicted and/or described herein. For example, in some embodiments, flow returns to block 912 as depicted with respect to FIG. 9A upon completion of block 1204 or 1206.

Figure 13:
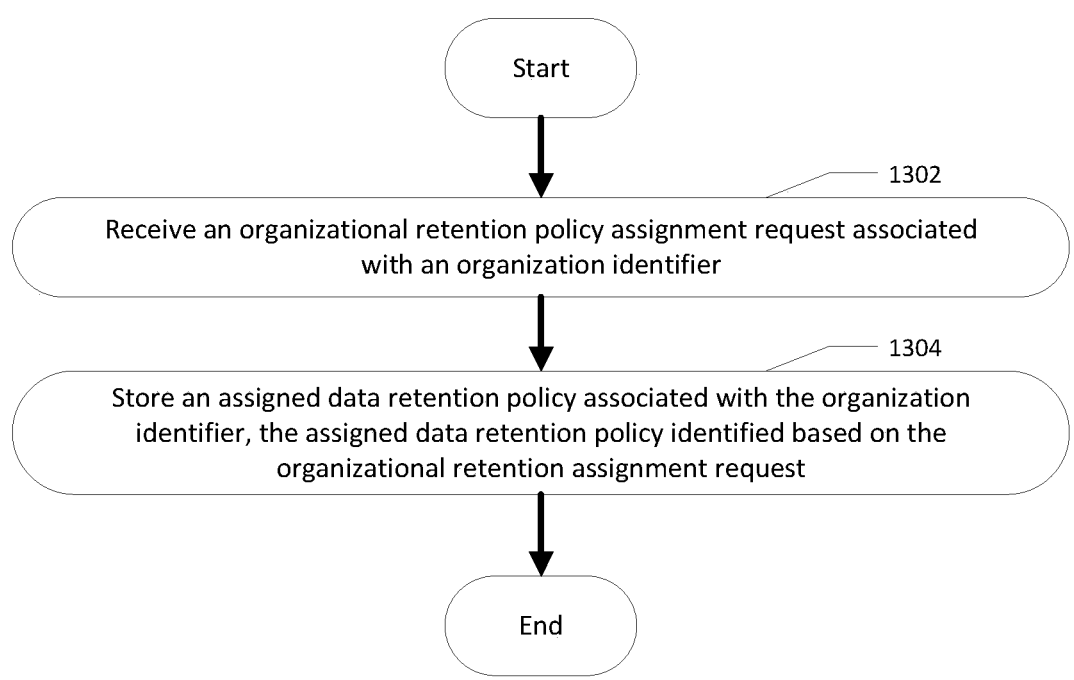

FIG. 13 illustrates another example process for group-based communication channel data management, specifically for assigning a data retention policy to an organization within a group-based communication system, in accordance with at least some example embodiments of the present disclosure. The example illustrated process may be performed by a specially configured group-based communication system, for example embodied as the specially configured apparatus 200. In this regard, in some such embodiments, the apparatus 200 is specially configured by computer program instructions stored therein, for example in the memory 204 and/or another depicted component, and/or otherwise accessible to the apparatus 200. In some embodiments, the specially configured apparatus 200 includes or otherwise is in communication with one or more other apparatuses, systems, devices, and/or the like, for example one or more client device(s) and/or external resources, to facilitate one or more of the operations described with respect to the illustrated process.

The illustrated process begins at block 1302. At block 1302, the apparatus 200 includes means, such as the group-based communication module 210, data management module 212, processor 202, and/or the like, or a combination thereof, configured to receive an organizational retention policy assignment request associated with an organization identifier. In this regard, the organizational retention policy assignment request may represent a user request to assign a particular data retention policy as identified in the request (e.g., the "assigned data retention policy") to an organization, for example for which they are permissioned as an administrator. The assigned data retention policy may function as a default data retention policy for stored data associated with the organization and/or sub-entities thereof, for example group-based workspaces and/or group-based communication channels associated therewith. In some embodiments, the organizational retention policy assignment request additionally includes at least a policy identifier for the assigned data retention policy to be assigned to the organization identifier. In some embodiments, the organization retention policy assignment request does not include the organization identifier, but is associated with an authenticated user account identifier for the authenticated user account that initiated the organizational retention policy assignment request. In some such embodiments, the apparatus 200 is configured to identify the organization identifier based on the authenticated user account identifier associated with the organizational retention policy assignment request.

In some embodiments, the organizational retention policy assignment request is received from a client device associated with a particular authenticated user account, for example during an authenticated session. In some embodiments, the apparatus 200 is configured to receive the organizational retention policy assignment request in response to user interaction with at least one interface rendered via the client device. In this regard, the apparatus 200 may configured and/or otherwise cause rendering of one or more interfaces to enable an authenticated user account to initiate assignment of a newly created data retention policy and/or existing data retention policy to one or more entities, such as one or more organization(s) associated with the authenticated user account. In some embodiments, the apparatus 200 configures such interfaces to only enable assignment to entities for which the authenticated user account is permissioned as an administrator user account.

At block 1304, the apparatus 200 includes means, such as the group-based communication module 210, data management module 212, processor 202, and/or the like, or a combination thereof, configured to store an assigned data retention policy associated with the organization identifier.

In this regard, the assigned data retention policy is identified based at least on the organizational retention policy assignment request. For example, in some embodiments, the apparatus 200 is configured to parse a policy identifier from the organizational retention policy assignment request to identify the data retention policy to be assigned, and parse the organization identifier from the organizational retention policy assignment request to identify the organization to which the data retention policy is to be assigned.

In some embodiments, the apparatus 200 is configured to manage one or more data records representing the assignment of the assigned data retention policy to the organization, for example by associating the organization identifier and the policy identifier. The apparatus 200 may manage the one or more data records by storing such data records within one or more group-based communication datastore(s) managed by the apparatus 200. In some embodiments, the apparatus 200 is configured to create a new data record associating the organization identifier and the assigned data retention policy. Alternatively or additionally, in some embodiments, the apparatus 200 is configured to update an existing data record to associate the organization identifier and assigned the data retention policy. For example, in at least some embodiments, the apparatus 200 is configured to update one or more properties of a data record representing the organization to have such properties reflect values indicating the data retention policy identified by the assigned data retention policy identifier is assigned to the organization identified by the organization identifier.

In some embodiments, upon completion of block 1304, the process ends. In other embodiments, the flow returns or continues to one or more other operations depicted with respect to one of the other processes depicted and/or described herein. For example, in some embodiments, flow returns to begin the process as depicted with respect to FIG. 9A upon completion of block 1304.

Figure 14:
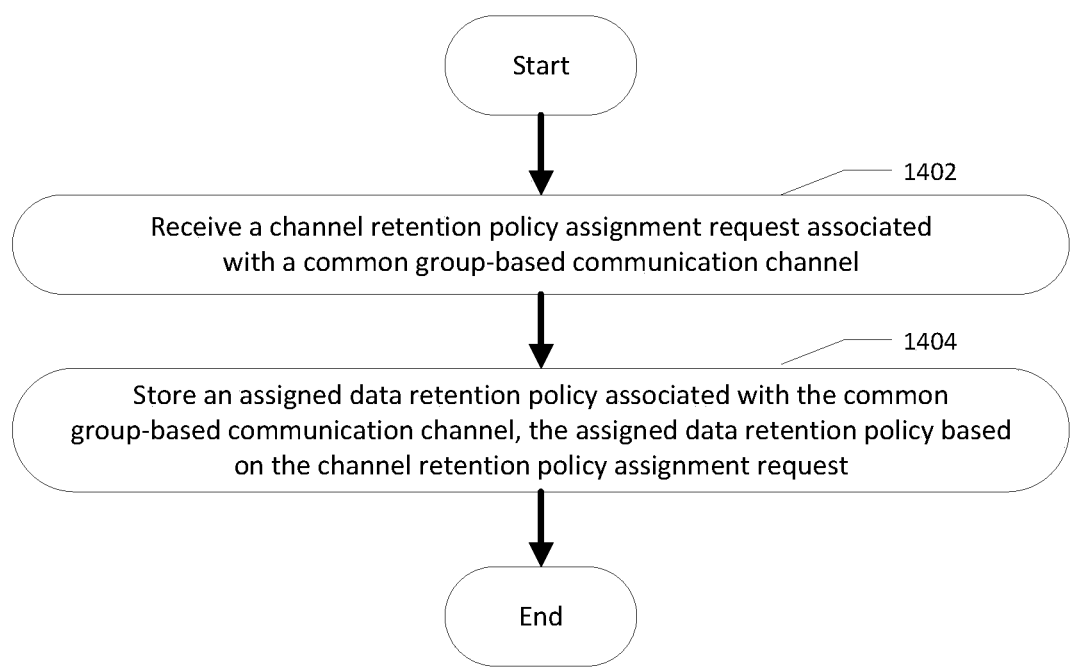

FIG. 14 illustrates another example process for group-based communication channel data management, specifically for assigning a data retention policy to a group-based communication channel within a group-based communication system, in accordance with at least some example embodiments of the present disclosure. The example illustrated process may be performed by a specially configured group-based communication system, for example embodied as the specially configured apparatus 200. In this regard, in some such embodiments, the apparatus 200 is specially configured by computer program instructions stored therein, for example in the memory 204 and/or another depicted component, and/or otherwise accessible to the apparatus 200. In some embodiments, the specially configured apparatus 200 includes or otherwise is in communication with one or more other apparatuses, systems, devices, and/or the like, for example one or more client device(s) and/or external resources, to facilitate one or more of the operations described with respect to the illustrated process.

The illustrated process begins at block 1402. At block 1402, the apparatus 200 includes means, such as the group-based communication module 210, data management module 212, processor 202, and/or the like, or a combination thereof, configured to receive a channel data retention policy assignment request associated with a common group-based communication channel. In this regard, the channel data retention policy assignment request may represent a user request to assign a particular data retention policy as identified in the request (e.g., the "assigned data retention policy") to a common group-based communication channel, for example a common group-based communication channel for which they are permissioned as an administrator. The assigned data retention policy may function as a default data retention policy for stored data associated with the common group-based communication channel, for example group-based communication messages transmitted therein. In some embodiments, the channel data retention policy assignment request additionally includes at least a policy identifier for the assigned data retention policy that is to be assigned to the common group-based communication channel.

In some embodiments, the channel data retention policy assignment request is received from a client device associated with a particular authenticated user account, for example during an authenticated session. In some embodiments, the apparatus 200 is configured to receive the channel data retention policy assignment request in response to user interaction with at least one interface rendered via the client device. In this regard, the apparatus 200 may configure and/or otherwise cause rendering of one or more interfaces to enable an authenticated user account to initiate assignment of a newly created data retention policy and/or existing data retention policy to one or more entities, such as common group-based communication channel(s) for which the authenticated user account is permissioned as an administrator. In some embodiments, one or more interfaces rendered to the client device enables assignment of such data retention policies to organizations, workspaces, and/or group-based communication channels, such as the common group-based communication channel, from within the same interface(s). For example, such interface(s) may function as a dashboard for the authenticated user account to manage assignment of data retention policies to the various entities for which the authenticated user account is permissioned as administrator, and/or to create one or more new data retention policies and/or delete one or more existing data retention policies.

At block 1404, the apparatus 200 includes means, such as the group-based communication module 210, data management module 212, processor 202, and/or the like, or a combination thereof, configured to store an assigned data retention policy associated with the common group-based communication channel. In this regard, the assigned data retention policy is identified based at least on the channel data retention policy assignment request. For example, in some embodiments, the apparatus 200 is configured to parse a policy identifier from the channel data retention policy assignment request to identify the data retention policy to be assigned, and parse the channel identifier for the common group-based communication channel from the channel data retention policy assignment request to identify the common group-based communication channel to which the data retention policy is to be assigned.

In some embodiments, the apparatus 200 is configured to manage one or more data records representing the assignment of the assigned data retention policy to the common group-based communication channel, for example by associating the channel identifier for the common group-based communication channel identifier and the policy identifier. The apparatus 200 may manage one or more data records by storing such data records within one or more group-based communication datastore(s) managed by the apparatus 200. In some embodiments, the apparatus 200 is configured to create a new data record associating the channel identifier for the common group-based communication channel and the policy identifier for the assigned data retention policy. For example, in at least some embodiments, the apparatus 200 is configured to update one or more properties of a data record representing the common group-based communication channel to have such properties reflect values indicating the assigned data retention policy identified by the policy identifier is assigned to the common group-based communication channel.

In some embodiments, upon completion of block 1404, the process ends. In other embodiments, the flow returns or continues to one or more other operations depicted with respect to one of the other processes depicted and/or described herein. For example, in some embodiments, flow returns to begin the process as depicted with respect to FIG. 9A upon completion of block 1404.

Figure 15:
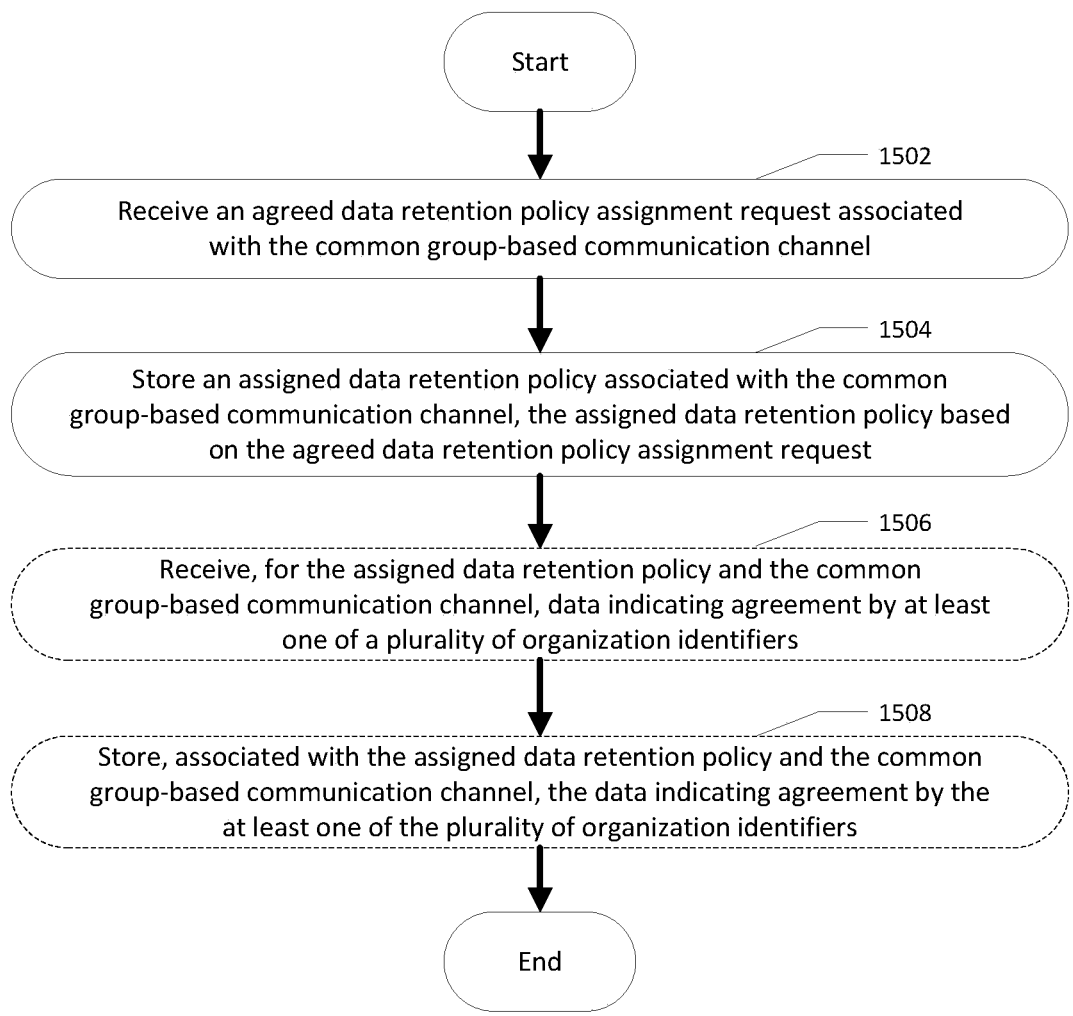

FIG. 15 illustrates another example process for group-based communication channel data management, specifically for assigning an agreed data retention policy to a group-based communication channel within a group-based communication system, in accordance with at least some example embodiments of the present disclosure. The example illustrated process may be performed by a specially configured group-based communication system, for example embodied as the specially configured apparatus 200. In this regard, in some such embodiments, the apparatus 200 is specially configured by computer program instructions stored therein, for example in the memory 204 and/or another depicted component, and/or otherwise accessible to the apparatus 200. In some embodiments, the specially configured apparatus 200 includes or otherwise is in communication with one or more other apparatuses, systems, devices, and/or the like, for example one or more client device(s) and/or external resources, to facilitate one or more of the operations described with respect to the illustrated process.

The illustrated process begins at block 1502. At block 1502, the apparatus 200 includes means, such as the group-based communication module 210, data management module 212, processor 202, and/or the like, or a combination thereof, configured to receive an agreed data retention policy assignment request associated with a common group-based communication channel. In this regard, the agreed data retention policy assignment request may represent a user request to assign a particular data retention policy as identified in the request (e.g., the "assigned data retention policy") to a common group-based communication channel, for example a common group-based communication channel for which they are permissioned as an administrator. The agreed data retention policy assignment request further may include data specially requesting the assigned retention policy be managed as an agreed data retention policy for the common group-based communication channel. In this regard, the assigned data retention policy may function as a data retention policy that governs for all stored data associated with the common group-based communication channel by all organizations and/or other entities having access to the common group-based communication channel, for example group-based communication messages transmitted therein. In some embodiments, the agreed data retention policy assignment request additionally includes at least a policy identifier for the assigned data retention policy that is to be assigned as an agreed data retention policy to the common group-based communication channel.

In some embodiments, the agreed data retention policy assignment request is received from a client device associated with a particular authenticated user account, for example during an authenticated session. In some embodiments, the apparatus 200 is configured to receive the agreed data retention policy assignment request in response to user interaction with at least one interface rendered via the client device. In this regard, the apparatus 200 may configure and/or otherwise cause rendering of one or more interfaces to enable an authenticated user account to initiate assignment of a newly created data retention policy and/or existing data retention policy to one or more entities, such as common group-based communication channel(s) for which the authenticated user account is permissioned as an administrator. In some embodiments, one or more interfaces rendered to the client device enables assignment of such data retention policies to organizations, workspaces, and/or group-based communication channels, such as the common group-based communication channel, from within the same interface(s). Such one or more interface(s) may include sub-interface elements therein that enable the user to indicate a request for the data retention policy to be managed as an agreed data retention policy.

At block 1504, the apparatus 200 includes means, such as the group-based communication module 210, data management module 212, processor 202, and/or the like, or a combination thereof, configured to store an assigned data retention policy associated with the common group-based communication channel. In this regard, the assigned data retention policy is identified based at least on the agreed data retention policy assignment request. For example, in some embodiments, the apparatus 200 is configured to parse a policy identifier from the channel data retention policy assignment request to identify the data retention policy to be assigned, and parse the channel identifier for the common group-based communication channel from the channel data retention policy assignment request to identify the common group-based communication channel to which the data retention policy is to be assigned.

In some embodiments, the apparatus 200 is configured to manage one or more data records representing the assignment of the assigned data retention policy to the common group-based communication channel, for example by associating the channel identifier for the common group-based communication channel identifier and the policy identifier. The apparatus 200 may manage one or more data records by storing such data records within one or more group-based communication datastore(s) maintained by the apparatus 200. In some embodiments, the apparatus 200 is configured to create a new data record associating the channel identifier for the common group-based communication channel and the policy identifier for the assigned data retention policy. For example, in at least some embodiments, the apparatus 200 is configured to update one or more properties of a data record representing the common group-based communication channel to have such properties reflect values indicating the assigned data retention policy identified by the policy identifier is assigned to the common group-based communication channel. In some embodiments, the apparatus 200 is configured to store one or more data value(s) in the data record(s) that indicate the data retention policy is assigned as an agreed data retention policy for the common group-based communication channel, for example a data flag associated with the assigned data retention policy and channel identifier for the common group-based communication channel.

At optional block 1506, the apparatus 200 includes means, such as the group-based communication module 210, data management module 212, processor 202, and/or the like, or a combination thereof, configured to receive, for the assigned data retention policy and the common group-based communication channel, data indicating a storage policy approved by at least one of a plurality of organization identifiers. In some embodiments, the plurality of organization identifiers includes one or more additional organization identifiers having access to the common group-based communication channel. In this regard, in some embodiments the apparatus 200 is configured to transmit and/or otherwise cause rendering, to one or more client device(s), of notification information indicating that all data within the common group-based communication channel will be managed based on the agreed data retention policy. The notification information may be transmitted and/or rendered to a client device for an authenticated user account associated with an organization identifier that has not previously received and/or approved the notification information, and/or a client device for an authenticated user account that has not previously received and/or approved the notification information. In some embodiments, notification information is rendered together with one or more interface elements for approving management of all data within the common group-based communication channel based on the approved data retention policy. In some such embodiments, the apparatus 200 may receive an approval response in response to user interaction with the one or more interface elements, the approval response indicating approval by the organization and/or authenticated user account to have data posted to the common group-based communication channel managed based on the agreed data retention policy. Alternatively or additionally, in some embodiments, the apparatus 200 receives the data indicating approval automatically in response to successfully transmitted and/or causing rendering of the notification information to the client device. It should be appreciated that, in some embodiments, the notification information is only transmitted and/or rendered to the client device once for approval. For example, the apparatus 200 may determine if such data has already been received for a particular authenticated user account and/or associated organization before transmitting the notification information to a corresponding client device.

At optional block 1508, the apparatus 200 includes means, such as the group-based communication module 210, data management module 212, processor 202, and/or the like, or a combination thereof, configured to store, associated with the assigned data retention policy and the common group-based communication channel, the data indicating a storage policy approved by the at least one of the plurality of organization identifiers. In this regard, the apparatus 200 may be configured to store one or more data records to one or more group-based communication datastore(s). The data record(s) may include the data indicating a storage policy approved by the at least one of the plurality of organization identifiers. The apparatus 200 may utilize this stored data for any of a number of decision-making and access granting purposes. For example, in some embodiments, the apparatus 200 is configured to continue to transmit notification information to one or more client device(s) associated with an authenticated user account and/or corresponding organization identifier for which such data indicating approval of the storage policy has not yet been received. Additionally or alternatively, in some embodiments, the apparatus 200 is configured to restrict access of authenticated user accounts for which data indicating approval of the storage policy has not yet been stored, and/or authenticated user accounts associated with organization identifiers for which data indicating approval of the storage policy has not yet been stored. In this regard, in some such embodiments, before proceeding to interact within the common group-based communication channel a user, or associated administrator on their behalf, must acknowledge that a third-party data retention policy governs management of data associated with the user posted to and/or otherwise associated with the common group-based communication channel.

In some embodiments, upon completion of block 1508, the process ends. In other embodiments, the flow returns or continues to one or more other operations depicted with respect to one of the other processes depicted and/or described herein. For example, in some embodiments, flow returns to begin the process as depicted with respect to FIG. 9A upon completion of block 1508.

Figure 16:
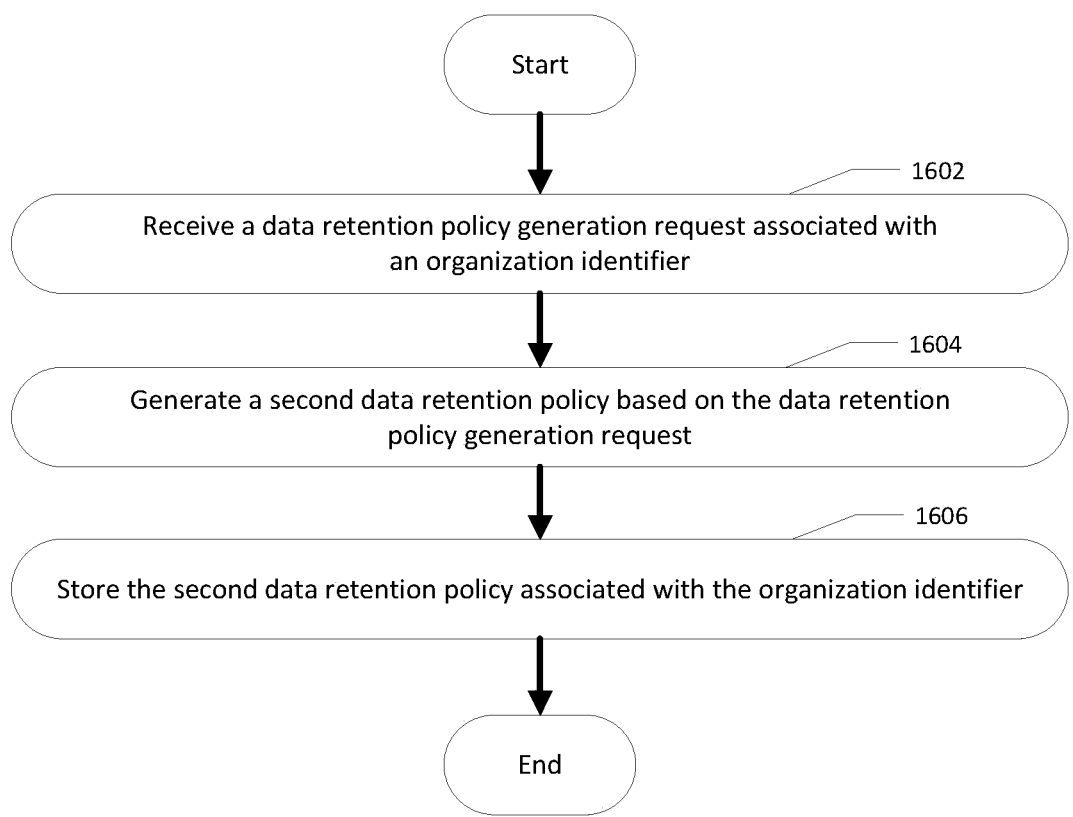

FIG. 16 illustrates another example process for group-based communication channel data management, specifically for generating a new data retention policy within a group-based communication system, in accordance with at least some example embodiments of the present disclosure. The example illustrated process may be performed by a specially configured group-based communication system, for example embodied as the specially configured apparatus 200. In this regard, in some such embodiments, the apparatus 200 is specially configured by computer program instructions stored therein, for example in the memory 204 and/or another depicted component, and/or otherwise accessible to the apparatus 200. In some embodiments, the specially configured apparatus 200 includes or otherwise is in communication with one or more other apparatuses, systems, devices, and/or the like, for example one or more client device(s) and/or external resources, to facilitate one or more of the operations described with respect to the illustrated process.

The illustrated process begins at block 1602. At block 1602, the apparatus 200 includes means, such as the group-based communication module 210, data management module 212, processor 202, and/or the like, or a combination thereof, configured to receive a data retention policy generation request associated with an organization identifier. In this regard, the data retention policy generation request represents a user request to generate a second data retention policy to be stored associated with the organization identifier. In some embodiments, the apparatus 200 is configured to enable transmission of such requests only by administrator user account(s) for a particular entity, for example for a particular organization or sub-entity thereof. The data retention policy generation request may include one or more data value(s) for assigning to properties of the newly created data retention policy. In some embodiments, the data retention policy generation request is received from a client device associated with a particular authenticated user account, for example during an authenticated session. In some such embodiments, the apparatus 200 is configured to transmit and/or cause rendering of an interface for inputting such data values and/or transmitting, to the apparatus 200, the data retention policy generation request including the input data values.

In some embodiments, the data retention policy generation request includes the organization identifier. In other embodiments, the data retention policy generation request includes or is otherwise associated with an authenticated user account identifier. In some such embodiments, the apparatus 200 is configured to identify the organization identifier based on the authenticated user account identifier. For example, the apparatus 200 may be configured to query one or more group-based communication datastore(s) based on the authenticated user account to retrieve a corresponding data record, and parse the data record to identify the organization identifier associated with the authenticated user account identifier. In some embodiments, the organization identifier is a first organization identifier of a plurality of organization identifiers configured for accessing a common group-based communication channel. Additionally or alternatively still, in some embodiments the data retention policy generation request includes data representing an assignment to one or more entities upon creation.

At block 1604, the apparatus 200 includes means, such as the group-based communication module 210, data management module 212, processor 202, and/or the like, or a combination thereof, configured to generate a second, new data retention policy based on the data retention policy generation request. In some embodiments, the second data retention policy is generated including data values parsed and/or otherwise identified from the data retention policy generation request. In one such example context, the data retention policy generation request includes at least a retention interval to be represented by the second data retention policy. The apparatus 200 may generate a new policy identifier associated with the second data retention policy, such that the second data retention policy may be uniquely identified from the existing data retention policies. In some such embodiments, the apparatus 200 is configured to generate a random and/or other unique new data policy identifier. In other embodiments, the apparatus is configured to generate the new policy identifier based on one or more data value(s) included in the data retention policy generation request, for example data indicating whether the second data retention policy is to be assigned as an agreed data retention policy, whether the second data retention policy is to be assigned as a default data retention policy for a particular group-based communication channel type, and/or the like. In some embodiments, when generating the second data retention policy, the apparatus 200 is configured to store a new data record embodying the second data retention policy to one or more group-based communication datastore(s).

At block 1606, the apparatus 200 includes means, such as the group-based communication module 210, data management module 212, processor 202, and/or the like, or a combination thereof, configured to store the second data retention policy associated with the organization identifier. For example, in some embodiments, the apparatus 200 is configured to store, and/or update, at least one data record including data associating the new policy identifier for the second data retention policy to the organization identifier in one or more group-based communication datastore(s). For example, the data record(s) may embody the second data retention policy stored to a policy table managed by the apparatus 200 in one or more group-based communication datastore(s). By storing the second data retention policy associated with the organization identifier, the apparatus 200 may later utilize the organization identifier to identify the second data retention policy for editing, and/or assigning to the organization and/or one or more entities associated with the organization.

In some embodiments, upon completion of block 1606, the process ends. In other embodiments, the flow returns or continues to one or more other operations depicted with respect to one of the other processes depicted and/or described herein. For example, in some embodiments, flow returns to begin the process as depicted with respect to FIG. 9A upon completion of block 1606. Alternatively, in some embodiments, flow returns to begin the process as depicted and described above with respect to one of FIGS. 13-15 for assigning the second data retention policy.

Figure 17:
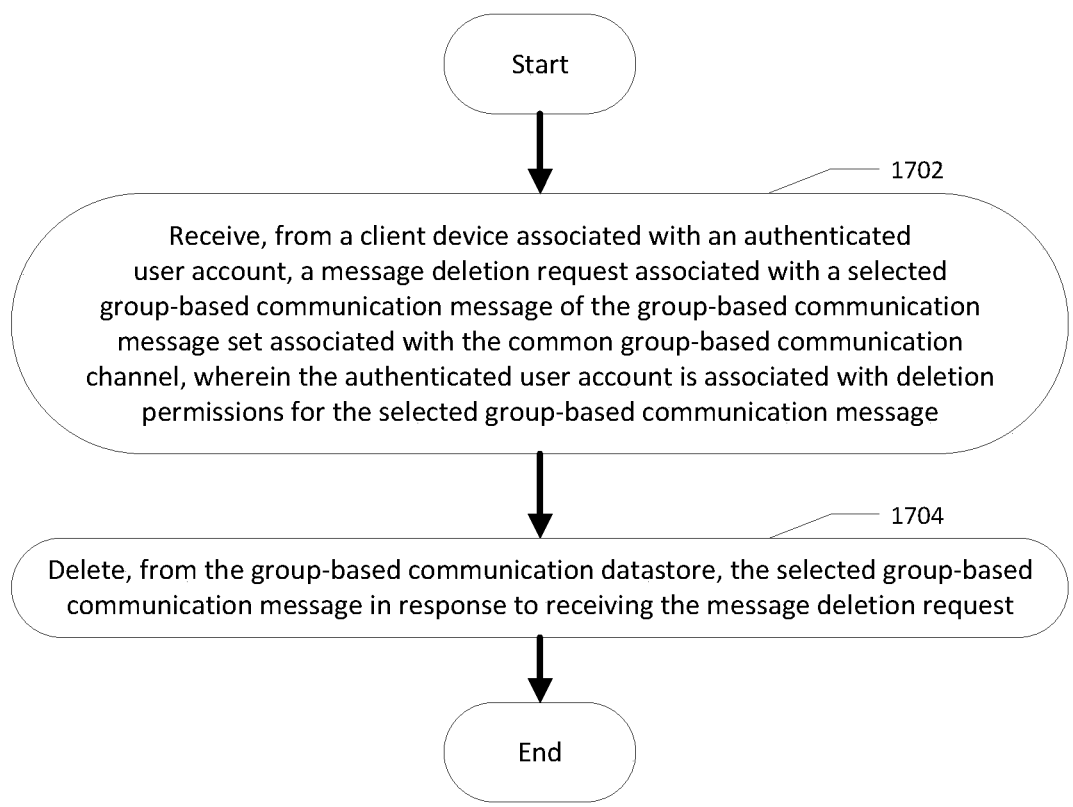

FIG. 17 illustrates another example process for group-based communication channel data management, specifically for manually managing group-based communication messages governed by a data retention policy, in accordance with at least some example embodiments of the present disclosure. The example illustrated process may be performed by a specially configured group-based communication system, for example embodied as the specially configured apparatus 200. In this regard, in some such embodiments, the apparatus 200 is specially configured by computer program instructions stored therein, for example in the memory 204 and/or another depicted component, and/or otherwise accessible to the apparatus 200. In some embodiments, the specially configured apparatus 200 includes or otherwise is in communication with one or more other apparatuses, systems, devices, and/or the like, for example one or more client device(s) and/or external resources, to facilitate one or more of the operations described with respect to the illustrated process.

The illustrated process begins at block 1702. At block 1702, the apparatus 200 includes means, such as the group-based communication module 210, data management module 212, processor 202, and/or the like, or a combination thereof, configured to receive a message deletion request associated with a selected group-based communication message. In this regard, the selected group-based communication message may be one of a set of group-based communication messages associated with a particular common group-based communication channel and governed by a particular data retention policy. In some such embodiments, the message deletion request is received from a client device associated with an authenticated user account, for example during an authenticated session. The authenticated user account is associated with deletion permissions for the selected group-based communication message. For example, in some embodiments the authenticated user account is permissioned as an administrator user account for the common group-based communication channel and/or a higher-level entity, such as an associated workspace and/or organization. Additionally or alternatively, in some embodiments, the authenticated user account is identified as the author of the group-based communication message, and thus granted deletion permissions for the selected group-based communication message.

In some embodiments, the apparatus 200 is configured to transmit and/or otherwise cause rendering to the client device of one or more interfaces enabling transmission of the message deletion request. For example, in some embodiments the apparatus 200 is configured to cause rendering of a group-based communication interface including the selected group-based communication message and/or other group-based communication messages of the group-based communication message set for a selected common group-based communication channel. The group-based communication interface may include one or more sub-interface elements therein for purposes of transmitting the message deletion request associated with the selected group-based communication message. In this regard, the group-based communication interface may include such sub-interface elements for each group-based communication message for which the authenticated user account is associated with deletion permissions. In some such embodiments, the client device generates and/or transmits the message deletion request to the apparatus 200 in response to user engagement with the one or more sub-interface elements for deleting the selected group-based communication message.

At block 1704, the apparatus 200 includes means, such as the group-based communication module 210, data management module 212, processor 202, and/or the like, or a combination thereof, configured to delete the selected group-based communication message in response to receiving the message deletion request. In this regard, the apparatus 200 may uniquely identify the selected group-based communication message for deletion based on the message identifier included in the message deletion request. In some embodiments, the apparatus 200 is configured to identify one or more data records stored to one or more group-based communication datastore(s) based on the selected group-based communication message identifier, and cause deletion of the one or more data records to delete the selected group-based communication message. In this regard, the apparatus 200 may be configured to enable manual management of stored group-based communication messages in addition to and/or regardless of assigned data retention policies governing storage of such data.

In some embodiments, upon completion of block 1704, the process ends. In other embodiments, the flow returns or continues to one or more other operations depicted with respect to one of the other processes depicted and/or described herein. For example, in some embodiments, flow returns to begin the process as depicted with respect to FIG. 9A upon completion of block 1704.

Figure 18:
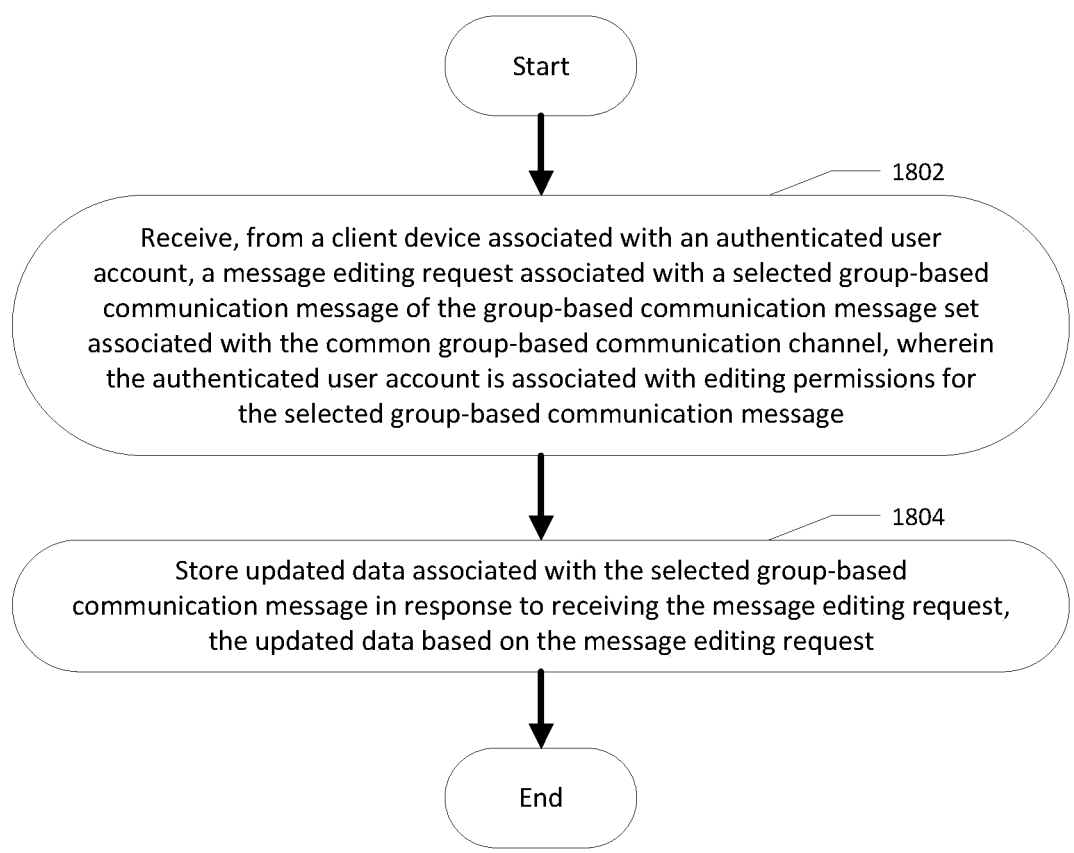

FIG. 18 illustrates another example process for group-based communication channel data management, specifically for manually managing group-based communication messages governed by a data retention policy, in accordance with at least some example embodiments of the present disclosure. The example illustrated process may be performed by a specially configured group-based communication system, for example embodied as the specially configured apparatus 200. In this regard, in some such embodiments, the apparatus 200 is specially configured by computer program instructions stored therein, for example in the memory 204 and/or another depicted component, and/or otherwise accessible to the apparatus 200. In some embodiments, the specially configured apparatus 200 includes or otherwise is in communication with one or more other apparatuses, systems, devices, and/or the like, for example one or more client device(s) and/or external resources, to facilitate one or more of the operations described with respect to the illustrated process.

The illustrated process begins at block 1802. At block 1802, the apparatus 200 includes means, such as the group-based communication module 210, data management module 212, processor 202, and/or the like, or a combination thereof, configured to receive a message editing request associated with a selected group-based communication message. In this regard, the selected group-based communication message may be one of a set of group-based communication messages associated with a particular common group-based communication channel and governed by a particular data retention policy. In some such embodiments, the message editing request is received from a client device associated with an authenticated user account, for example during an authenticated session. The authenticated user account is associated with editing permissions for the selected group-based communication message. For example, in some embodiments the authenticated user account is permissioned as an administrator user account for the common group-based communication channel and/or a higher-level entity, such as an associated workspace and/or organization. Additionally or alternatively, in some embodiments, the authenticated user account is identified as the author of the group-based communication message, and thus granted editing permissions for the selected group-based communication message.

In some embodiments, the apparatus 200 is configured to transmit and/or otherwise cause rendering to the client device of one or more interfaces enabling transmission of the message editing request. For example, in some embodiments the apparatus 200 is configured to cause rendering of a group-based communication interface including the selected group-based communication message and/or other group-based communication messages of the group-based communication message set for a selected common group-based communication channel. The group-based communication interface may include one or more sub-interface elements therein for purposes of transmitting the message deletion request associated with the selected group-based communication message. In this regard, the group-based communication interface may include such sub-interface elements for each group-based communication message for which the authenticated user account is associated with editing permissions. In some such embodiments, the client device generates and/or transmits the message editing request to the apparatus 200 in response to user engagement with the one or more sub-interface elements for editing the selected group-based communication message. The sub-interfaces for editing the selected group-based communication message may be distinct from the sub-interfaces for deleting the selected group-based communication message as described above, and/or may be associated within a shared sub-interface (e.g., a menu with multiple selectable options).

At block 1804, the apparatus 200 includes means, such as the group-based communication module 210, data management module 212, processor 202, and/or the like, or a combination thereof, configured to store the selected group-based communication message in response to receiving the message deletion request. In this regard, the apparatus 200 may uniquely identify the selected group-based communication message for editing based on the message identifier included in the message deletion request. In some embodiments, the apparatus 200 is configured to identify one or more data records stored to one or more group-based communication datastore(s) based on the selected group-based communication message identifier. Further, in some embodiments, the apparatus 200 is configured to store the updated data as one or more values for at least one property of the one or more identified data records embodying selected the group-based communication message. For example, in some embodiments, the updated data includes updated message content to store in place of existing message content data for the selected group-based communication message.

In some embodiments, the updated data includes one or more updated values used in the data retention process performed by the apparatus 200. For example, in some embodiments, upon storing updated message content data, the apparatus 200 is configured to store an updated received timestamp for the selected group-based communication message. In this regard, the length of time for which the selected group-based communication message is stored may be reset, as reflected in the updated received timestamp. In yet other embodiments, the apparatus 200 does not update the received timestamp for editing actions, and editing the selected group-based communication message has no effect on management based on the governing data retention policy.

In some embodiments, upon completion of block 1804, the process ends. In other embodiments, the flow returns or continues to one or more other operations depicted with respect to one of the other processes depicted and/or described herein. For example, in some embodiments, flow returns to begin the process as depicted with respect to FIG. 9A upon completion of block 1804.

FIG. 19 illustrates one example process for group-based communication channel data management, specifically for data management based on one or more data retention policies, in accordance with at least some example embodiments of the present disclosure. In this regard, the example process depicts some or all operations of another example data retention process, specifically utilizing an author-based policy identification process. The example illustrated process may be performed by a specially configured group-based communication system, for example embodied as the specially configured apparatus 200. In this regard, in some such embodiments, the apparatus 200 is specially configured by computer program instructions stored therein, for example in the memory 204 and/or another depicted component, and/or otherwise accessible to the apparatus 200. In some embodiments, the specially configured apparatus 200 includes or otherwise is in communication with one or more other apparatuses, systems, devices, and/or the like, for example one or more client device(s) and/or external resources, to facilitate one or more of the operations described with respect to the illustrated process.

In at least one example embodiment, one or more of the operations of FIG. 19 begins after one or more of the blocks depicted and/or described with respect to one or more of the other processes herein. Alternative or additionally, in some embodiments, one or more of the operations of FIG. 19 replaces one or more of the blocks depicted and/or described with respect to one or more of the other processes herein. For example, in at least one embodiment, one or more of the operations depicted with respect to FIG. 19 replaces at least one block of the process depicted and described with respect to FIG. 9A. In this regard, in at least one example embodiment, the process described with respect to FIG. 19 provides a flow depicting a specific, detailed instance of the process depicted and described with respect to FIG. 9A. It should be appreciated that one or more of the blocks of FIG. 9A, and/or the other figures described herein in combination with FIG. 9A, may similarly be combined with the blocks depicted with respect to FIG. 19.

The illustrated process begins at block 1902. At block 1902, the apparatus 200 includes means, such as the group-based communication module 210, data management module 212, processor 202, and/or the like, or a combination thereof, configured to identify a first group-based communication message associated with a common group-based communication channel. In some embodiments, the first group-based communication message is included in a group-based communication message set associated with the common group-based communication channel. In some such embodiments, the apparatus 200 is configured to identify the group-based communication message set and/or first group-based communication message by querying one or more group-based communication datastore(s) for group-based communication messages associated with the channel identifier and/or workspace identifier associated with the common group-based communication channel. For example, the apparatus 200 may identify a common group-based communication channel identifier for management during a data retention process, and retrieve at least the first group-based communication message associated with the common group-based communication channel identifier in response to the query. In some embodiments, the common group-based communication channel is accessible to a plurality of organization identifiers, and the first group-based communication message is associated with a first organization identifier of the plurality of organization identifiers. For example, the first organization identifier may be identified based on the author identifier for the first group-based communication message, as described herein.

At block 1904, the apparatus 200 includes means, such as the group-based communication module 210, data management module 212, processor 202, and/or the like, or a combination thereof, configured to identify a first data retention policy associated with the first group-based communication message. In some embodiments, the first data retention policy is identified based on the first organization identifier. For example, as described herein, the group-based communication system may be configured to identify a data retention policy assigned, for the organization, to the organization identified by the first organization identifier and/or a sub-entity thereof, for example a group-based workspace and/or the common group-based communication channel. In some embodiments, as described herein, the common group-based communication channel is not directly assigned a data retention policy, and the apparatus 200 identifies the first data retention policy assigned to a higher-level entity, such as the workspace or the organization, associated with the common group-based communication channel. In some such embodiments, the first data retention policy is a default data retention policy governing management of the data within the common group-based communication channel for the first organization identified by the first organization identifier. It should be appreciated that, in some embodiments, the first data retention policy is any data retention policy identified via an author-based policy identification process as described herein, such that the first data retention policy governs group-based communication messages transmitted by authenticated user accounts associated with the first organization identifier within the common group-based communication channel.

At optional block 1906, the apparatus 200 includes means, such as the group-based communication module 210, data management module 212, processor 202, and/or the like, or a combination thereof, configured to determine whether the first group-based communication message satisfies the first data retention policy. As described herein, the apparatus 200 may be configured to determine whether the first group-based communication message satisfies the first data retention policy based on a retention interval included in and/or represented by the first data retention policy. In some embodiments, the apparatus 200 is configured to calculate a timestamp difference based on one or more properties of the first group-based communication message, for example a received timestamp, and compare the timestamp difference to the retention interval included in and/or represented by the first data retention policy. In other embodiments, the apparatus determines whether the first communication message satisfies the first data retention policy based on one or more other determinations, for example whether one or more events defined in the first data retention policy has occurred or otherwise been triggered.

At block 1908, the apparatus 200 includes means, such as the group-based communication module 210, data management module 212, processor 202, and/or the like, or a combination thereof, configured to perform a first message management action for the first group-based communication message. In some embodiments, the first message management action is performed in response to a determination that the first group-based communication message satisfies the first data retention policy. For example, as described herein, in some embodiments the apparatus 200 performs a deletion action to delete, and/or otherwise make inaccessible, all or a portion of the first group-based communication message in a circumstance where the first group-based communication message is determined to not to satisfy the first data retention policy. Alternatively or additionally, in some embodiments the apparatus 200 performs a management action to continue storage of the first group-based communication message and all data therein without alteration in a circumstance where the first group-based communication message is determined to satisfy the first data retention policy. In other embodiments, the apparatus 200 is configured to perform a deletion action in a circumstance where the group-based communication message is determined to satisfy the governing data retention policy, and perform a management action for the group-based communication message otherwise (e.g., in embodiments where satisfying the policy indicates the group-based communication message should be deleted).

At block 1910, the apparatus 200 includes means, such as the group-based communication module 210, data management module 212, processor 202, and/or the like, or a combination thereof, configured to identify a second group-based communication message associated with the common group-based communication channel. In some embodiments, the second group-based communication message is included in the group-based communication message set associated with the common group-based communication channel. In some such embodiments, the apparatus 200 is configured to identify the group-based communication message set and/or second group-based communication message by querying one or more group-based communication datastore(s). In some embodiments, the second group-based communication message is associated with a second organization identifier of the plurality of organization identifiers. For example, the second organization identifier may be identified based on the author identifier for the second group-based communication message, as described herein. The second group-based communication message may be authored by a second authenticated user account associated with the second organization identifier.

At block 1912, the apparatus 200 includes means, such as the group-based communication module 210, data management module 212, processor 202, and/or the like, or a combination thereof, configured to identify a second data retention policy associated with the second group-based communication message. In some embodiments, the second data retention policy is identified based on the second organization identifier. For example, as described herein, the group-based communication system may be configured to identify a data retention policy assigned, for the second organization, to the second organization identified by the second organization identifier and/or a sub-entity thereof, for example a group-based workspace and/or the common group-based communication channel. In some embodiments, as described herein, the common group-based communication channel is not directly assigned a data retention policy, and the apparatus 200 identifies the second data retention policy for the second organization assigned to a higher-level entity, such as the workspace or the second organization, associated with the common group-based communication channel. In some such embodiments, the second data retention policy is a default data retention policy governing management of the data within the common group-based communication channel for the second organization identified by the second organization identifier. It should be appreciated that, in some embodiments, the second data retention policy is any data retention policy identified via an author-based policy identification process as described herein, such that the second data retention policy governs group-based communication messages transmitted by authenticated user accounts associated with the second organization identifier within the common group-based communication channel.

At optional block 1914, the apparatus 200 includes means, such as the group-based communication module 210, data management module 212, processor 202, and/or the like, or a combination thereof, configured to determine whether the second group-based communication message satisfies the second data retention policy. As described herein, the apparatus 200 may be configured to determine whether the second group-based communication message satisfies the second data retention policy based on a second retention interval included in and/or represented by the second data retention policy. In some embodiments, the apparatus 200 is configured to calculate a second timestamp difference for the second group-based communication message based on one or more properties of the second group-based communication message, for example a received timestamp, and compare the second timestamp difference to the second retention interval included in and/or represented by the second data retention policy. In other embodiments, the apparatus 200 determines whether the second communication message satisfies the second data retention policy based on one or more other determinations, for example whether one or more events defined in the second data retention policy has occurred or otherwise been triggered.

At block 1916, the apparatus 200 includes means, such as the group-based communication module 210, data management module 212, processor 202, and/or the like, or a combination thereof, configured to perform a second message management action for the second group-based communication message. In some embodiments, the second message management action is performed in response to a determination that the second group-based communication message satisfies the second data retention policy. For example, as described herein, in some embodiments the apparatus 200 performs a deletion action to delete, and/or otherwise make inaccessible, all or a portion of the second group-based communication message in a circumstance where the second group-based communication message is determined to satisfy the second data retention policy. Alternatively or additionally, in some embodiments the apparatus 200 performs a management action to continue storage of the second group-based communication message and all data therein without alteration in a circumstance where the second group-based communication message is determined to satisfy the second data retention policy.

As described, the group-based communication messages associated with each organization identifier may be managed differently by the apparatus 200. For example, in an example context where the retention interval for the first data retention policy and the retention interval for the second data retention policy do not match, the group-based communication messages associated with each organization may each be stored for different lengths of time within the same common group-based communication channel. In this regard, the process as described enables various organizations to ensure data is managed by the apparatus 200 in accordance with their desired data security and/or data privacy goals without affecting data management of data associated with the other organizations having access to the common group-based communication channel.

In some embodiments, one or more of the depicted operations are performed for a second group-based communication message in an identified group-based communication message set. For example in some embodiments, the operations 1910-1916 are performed upon completion of block 910 as illustrated in FIG. 9A. In some such embodiments, the operations supplant block 912 as illustrated and described with respect to FIG. 9A.

FIG. 20 illustrates one example process for group-based communication channel data management, specifically for data management based on one or more data retention policies, in accordance with at least some example embodiments of the present disclosure. In this regard, the example process depicts some or all operations of another example data retention process, specifically utilizing an agreed policy-based policy identification process. The example illustrated process may be performed by a specially configured group-based communication system, for example embodied as the specially configured apparatus 200. In this regard, in some such embodiments, the apparatus 200 is specially configured by computer program instructions stored therein, for example in the memory 204 and/or another depicted component, and/or otherwise accessible to the apparatus 200. In some embodiments, the specially configured apparatus 200 includes or otherwise is in communication with one or more other apparatuses, systems, devices, and/or the like, for example one or more client device(s) and/or external resources, to facilitate one or more of the operations described with respect to the illustrated process.

In at least one example embodiment, one or more of the operations of FIG. 20 begins after one or more of the blocks depicted and/or described with respect to one or more of the other processes herein. Alternative or additionally, in some embodiments, one or more of the operations of FIG. 20 replaces one or more of the blocks depicted and/or described with respect to one or more of the other processes herein. For example, in at least one embodiment, one or more of the operations depicted with respect to FIG. 20 replaces at least one block of the process depicted and described with respect to FIG. 9A. In this regard, in at least one example embodiment, the process described with respect to FIG. 20 provides a flow depicting a specific, detailed instance of the process depicted and described with respect to FIG. 9A. It should be appreciated that one or more of the blocks of FIG. 9A, and/or the other figures described herein in combination with FIG. 9A, may similarly be combined with the blocks depicted with respect to FIG. 20.

The illustrated process begins at block 2002. At block 1902, the apparatus 200 includes means, such as the group-based communication module 210, data management module 212, processor 202, and/or the like, or a combination thereof, configured to identify a first group-based communication message associated with a common group-based communication channel. In some embodiments, the first group-based communication message is included in a group-based communication message set associated with the common group-based communication channel. In some such embodiments, the apparatus 200 is configured to identify the group-based communication message set and/or first group-based communication message by querying one or more group-based communication datastore(s) for group-based communication messages associated with the channel identifier and/or workspace identifier associated with the common group-based communication channel. For example, the apparatus 200 may identify a common group-based communication channel identifier for management during a data retention process, and retrieve at least the first group-based communication message associated with the common group-based communication channel identifier in response to the query. In some embodiments, the common group-based communication channel is accessible to a plurality of organization identifiers, and the first group-based communication message is associated with a first organization identifier of the plurality of organization identifiers. For example, the first organization identifier may be identified based on the author identifier for the first group-based communication message, as described herein.

At block 2004, the apparatus 200 includes means, such as the group-based communication module 210, data management module 212, processor 202, and/or the like, or a combination thereof, configured to identify a data retention policy associated with the first group-based communication message. In some embodiments, the data retention policy is identified based on the common group-based communication channel. For example, in some such embodiments, the data retention policy embodies an agreed data retention policy assigned to the common group-based communication channel, for example by the owner organization associated with the common group-based communication channel and/or an additional organization associated with one of the plurality of organization identifiers associated with the common group-based communication channel. In at least some example contexts, as described, the data retention policy is assigned as governing all data for each of the plurality of organization identifiers posted to and/or otherwise associated with common group-based communication channel.

At optional block 2006, the apparatus 200 includes means, such as the group-based communication module 210, data management module 212, processor 202, and/or the like, or a combination thereof, configured to determine whether the first group-based communication message satisfies the data retention policy. As described herein, the apparatus 200 may be configured to determine whether the first group-based communication message satisfies the data retention policy based on a retention interval included in and/or represented by the data retention policy. In some embodiments, the apparatus 200 is configured to calculate a timestamp difference based on one or more properties of the first group-based communication message, for example a received timestamp, and compare the timestamp difference to the retention interval included in and/or represented by the data retention policy. In other embodiments, the apparatus 200 determines whether the first communication message satisfies the data retention policy based on one or more other determinations, for example whether one or more events defined in the data retention policy has occurred or otherwise been triggered. In some embodiments, the determination is performed by another device, system, apparatus, and/or the like associated with the apparatus 200.

At block 2008, the apparatus 200 includes means, such as the group-based communication module 210, data management module 212, processor 202, and/or the like, or a combination thereof, configured to perform a first message management action for the first group-based communication message based on the determination of whether the first group-based communication message satisfies the data retention policy. In some such embodiments, the apparatus 200 is configured to perform the first message management action in response to a determination of whether the first group-based communication message satisfies the data retention policy. For example, as described herein, in some embodiments the apparatus 200 performs a deletion action to delete, and/or otherwise make inaccessible, all or a portion of the first group-based communication message in a circumstance where the first group-based communication message is determined not to satisfy the data retention policy. Alternatively or additionally, in some embodiments the apparatus 200 performs a management action to continue storage of the first group-based communication message and all data therein without alteration in a circumstance where the first group-based communication message is determined to satisfy the data retention policy. Additionally or alternatively still, in some embodiments, the data retention policy defines an appropriate message management action, for example based on a user-configured value for one or more settings embodied in the data retention policy.

At block 2010, the apparatus 200 includes means, such as the group-based communication module 210, data management module 212, processor 202, and/or the like, or a combination thereof, configured to identify a second group-based communication message associated with the common group-based communication channel. In some embodiments, the second group-based communication message is included in the group-based communication message set associated with the common group-based communication channel. In some such embodiments, the apparatus 200 is configured to identify the group-based communication message set and/or second group-based communication message by querying one or more group-based communication datastore(s). In some embodiments, the second group-based communication message is associated with a second organization identifier of the plurality of organization identifiers. For example, the second organization identifier may be identified based on the author identifier for the second group-based communication message, as described herein. The second group-based communication message may be authored by a second authenticated user account associated with the second organization identifier.

At optional block 2012, the apparatus 200 includes means, such as the group-based communication module 210, data management module 212, processor 202, and/or the like, or a combination thereof, configured to determine whether the second group-based communication message satisfies the data retention policy. In this regard, continuing the example context where the data retention policy embodies an agreed data retention policy, the apparatus 200 does not need to determine a second data retention policy associated with the second organization identifier, as the agreed data retention policy governs all data for all organizations having access to the common group-based communication channel. As described herein, the apparatus 200 may be configured to determine whether the second group-based communication message satisfies the data retention policy based on the retention interval included in and/or represented by the data retention policy. In some embodiments, the apparatus 200 is configured to calculate a second timestamp difference for the second group-based communication message based on one or more properties of the second group-based communication message, for example a received timestamp, and compare the second timestamp difference to the retention interval included in and/or represented by the data retention policy. In other embodiments, the apparatus 200 determines whether the second communication message satisfies the data retention policy based on one or more other determinations, for example whether one or more events defined in the data retention policy has occurred or otherwise been triggered. In some embodiments, the determination is performed by another device, system, apparatus, and/or the like associated with the apparatus 200.

At block 2014, the apparatus 200 includes means, such as the group-based communication module 210, data management module 212, processor 202, and/or the like, or a combination thereof, configured to perform a second message management action for the second group-based communication message. In some embodiments, the apparatus 200 is configured to perform the second message management action in response to a determination of whether the second group-based communication message satisfies the data retention policy. For example, as described herein, in some embodiments the apparatus 200 performs a deletion action to delete, and/or otherwise make inaccessible, all or a portion of the second group-based communication message in a circumstance where the second group-based communication message is determined to not satisfy the data retention policy. Alternatively or additionally, in some embodiments the apparatus 200 performs a management action to continue storage of the second group-based communication message and all data therein without alteration in a circumstance where the second group-based communication message is determined to satisfy the data retention policy. Additionally or alternatively still, in some embodiments, the data retention policy defines an appropriate message management action, for example based on a user-configured value for one or more settings embodied in the data retention policy.

As described, the group-based communication messages associated with each organization identifier may be managed by the apparatus 200 in accordance with the data retention policy, such as an agreed data retention policy. In this regard, the process as described enables an organization, such as an owner organization, associated with a common group-based communication channel to ensure data associated with the common group-based communication channel is managed by the apparatus 200 in accordance with the desired data security and/or data privacy goals of the organization assigning the agreed data retention policy. Such configurations may be utilized in conjunction with the author-based identification processes described herein to enable some entities, such as common group-based communication channels, to be managed specifically to meet increased and/or lowered data storage.

In some embodiments, one or more of the depicted operations are performed for a second group-based communication message in an identified group-based communication message set. For example in some embodiments, the blocks 2010-2014 are performed upon completion of block 910 as illustrated in FIG. 9A. In some such embodiments, the operations supplant block 912 as illustrated and described with respect to FIG. 9A.

FIG. 21 illustrates one example process for group-based communication channel data management, specifically for causing rendering of a group-based communication interface, in accordance with at least some example embodiments of the present disclosure. In this regard, the example process depicts some or all operations of another example data retention process. The example illustrated process may be performed by a specially configured group-based communication system, for example embodied as the specially configured apparatus 200. In this regard, in some such embodiments, the apparatus 200 is specially configured by computer program instructions stored therein, for example in the memory 204 and/or another depicted component, and/or otherwise accessible to the apparatus 200. In some embodiments, the specially configured apparatus 200 includes or otherwise is in communication with one or more other apparatuses, systems, devices, and/or the like, for example one or more client device(s) and/or external resources, to facilitate one or more of the operations described with respect to the illustrated process.

The illustrated process begins at block 2102. At block 2102, the apparatus 200 includes means, such as the group-based communication module 210, data management module 212, processor 202, and/or the like, or a combination thereof, configured to receive, from a client device associated with an authenticated user account associated with a first organization identifier, a policy information request associated with a common group-based communication channel accessible to client devices associated with a plurality of unique organization identifiers, wherein the plurality of unique organization identifiers comprises the first organization identifier and a third-party organization identifier set. The third-party organization identifier set represents at least one organization identifier other than the first organization identifier. The policy information request may be received in response to user interaction with the client device of the plurality of client devices. For example, the user may interact with the client device to indicate a desire to obtain information associated with the governing data retention policy for the common group-based communication channel, organization, and/or the like.

At block 2104, the apparatus 200 includes means, such as the group-based communication module 210, data management module 212, processor 202, and/or the like, or a combination thereof, configured to identify at least one third-party data retention policy for the common group-based communication channel, wherein the at least one third-party data retention policy is associated with the third-party organization identifier set. In this regard, the third-party data retention policy may be an agreed data retention policy assigned by an authenticated user account associated with a third-party organization identifier represented within the third-party organization identifier set. In this regard, in some such embodiments, the data retention policy governing data associated with the authenticated user account was not generated by an authenticated user account associated with the first organization identifier associated with the authenticated user account, but rather by another authenticated user account associated with the third-party organization identifier. The policy information request may represent a desire, by the user associated with the authenticated user account, to receive information regarding the governing data retention policy.

At block 2106, the apparatus 200 includes means, such as the group-based communication module 210, data management module 212, processor 202, and/or the like, or a combination thereof, configured to cause rendering, via the client device, of a group-based communication interface comprising a data retention notification information interface based at least on the at least one third-party retention policy. In some embodiments, the apparatus 200 is configured to transmit the at least one data retention policy identified for the common group-based communication channel to the client device to cause rendering of the data retention notification information interface. In other embodiments, the apparatus 200 is configured to transmit only a portion of the at least one data retention policy identified for the common group-based communication channel to the client device. For example, in some embodiments, the apparatus 200 is configured to transmit at least a retention interval included in and/or represented by the at least one data retention policy. Additionally or alternatively, in some embodiments, the apparatus 200 is configured to transmit one or more of the policy name, policy identifier, owner organization for each data retention policy, and/or the like. In some embodiments, the transmission to the client device causes the client device to render some or all of the transmitted information to the data retention notification information interface. In this regard, the user associated with the client device may view the rendered information, and/or analyze such information for one or more decision-making purposes.

Example Processes for Common Group-Based Communication Channel Data Management by a Specially Configured Client Device Having described example flowcharts performed by a group-based communication system, for example embodied by apparatus 200, flowcharts are depicted and described including various operations performed by client devices described above. It should be appreciated that each of the flowcharts depicts an example computer-implemented process that may be performed by one or more of the above described apparatuses, systems, and/or devices, for example using one or more of the components described herein. The blocks of each process may be arranged in any of a number of ways, as depicted and described herein. In some such embodiments, one or more blocks of a first process may occur in-between one or more blocks, or otherwise operate as a sub-process, of a second process. Additionally or alternatively, the process may include some or all of the steps described and/or depicted, including one or more optional blocks in some embodiments. In regards to the below described flowcharts, one or more of the depicted blocks may be optional in some, or all, embodiments of the present disclosure. Optional blocks are depicted with broken (or "dashed") lines. FIG. 22 illustrates a flowchart depicting example operations for group-based communication channel data management in accordance with at least one example embodiment of the present disclosure.

FIG. 22 illustrates one example process for group-based communication channel data management, performed by a client device, in accordance with at least some example embodiments of the present disclosure. The example illustrated process may be performed by a specially configured client device, for example embodied as the specially configured apparatus 250. In this regard, in some such embodiments, the apparatus 250 is specially configured by computer program instructions stored therein, for example in the memory 254 and/or another depicted component, and/or otherwise accessible to the apparatus 250. In some embodiments, the specially configured apparatus 250 includes or otherwise is in communication with one or more other apparatuses, systems, devices, and/or the like, for example one or more client device(s) and/or external resources, to facilitate one or more of the operations described with respect to the illustrated process.

The illustrated process begins at optional block 2202. At optional block 2202, the apparatus 250 includes means, such as the group-based client module 260, input/output module 256, communications module 258, processor 252, and/or the like, or a combination thereof, configured to transmit a data retention policy assignment request associated with a policy identifier and an entity identifier. In some embodiments, the apparatus 250 is associated with a particular authenticated user account, for example where the user has initiated an authenticated session via the apparatus 250. In some embodiments, the apparatus 250 is configured to generate and transmit the data retention policy assignment request in response to user interaction. For example, the apparatus 250 may be configured to render an interface for assigning a data retention policy to a selected entity, and/or to an entity associated with the authenticated user account, such as assigning a default data retention policy for the organization associated with the authenticated user account and/or a default data retention policy for a particular entity type. In some such embodiments, the apparatus 250 may render an interface including all data retention policies assignable by the authenticated user account associated with the apparatus 250, and generate and/or transmit the data retention policy assignment request based on user interaction with an interface element rendered therein. In this regard, the apparatus 250 may identify the entity identifier based on data representing a first user interaction by the user, and identify the policy identifier based on data representing a second user interaction by the user of the apparatus 250.

At block 2204, the apparatus 250 includes means, such as the group-based client module 260, input/output module 256, communications module 258, processor 252, and/or the like, or a combination thereof, configured to render a first group-based communication interface associated with a selected group-based communication channel. The selected group-based communication channel comprises a common group-based communication channel accessible to client devices associated with a plurality of unique organization identifiers. Further, the first group-based communication interface comprises a source group-based communication message set associated with a data retention policy set. In this regard, the source group-based communication message set includes any number of group-based communication messages posted to and/or otherwise associated with the channel group-based communication channel by any number of authenticated user accounts. The group-based communication messages may be governed by any number of data retention policies as described above. The first group-based communication interface may be rendered at a first timestamp, during which the group-based communication message set includes some or all of the group-based communication messages associated with the common group-based communication channel and retained by the group-based communication system. up unto the first timestamp. In some embodiments, a group-based communication system, for example embodied by the apparatus 200, includes means to cause rendering the first group-based communication interface comprising the source group-based communication message set, for example via the client device embodied by the apparatus 250, as described herein.

In some embodiments, some time passes between block 2204 and block 2206. In some embodiments, it should be appreciated that the user may cease utilizing the apparatus 250 after block 2204, and return to the apparatus 250 at a later time thus initiating block 2206. Further, it should be appreciated that in some embodiments a user may continue to utilize the apparatus 250 for any number of actions during such time. For example, the user may continue to utilize the apparatus 250 to communicate within the common group-based communication channel and/or other group-based communication channels and/or workspaces.

At block 2206, the apparatus 250 includes means, such as the group-based client module 260, input/output module 256, communications module 258, processor 252, and/or the like, or a combination thereof, configured to render a second group-based communication interface associated with the selected group-based communication channel. The updated group-based communication interface includes an updated group-based communication message set, where the updated group-based communication set comprises the source group-based communication set updated based on the data retention policy set. In this regard, the updated group-based communication message set may reflect one or more removals of group-based communication messages from the source group-based communication message set. For example, in a circumstance where one or more group-based communication messages from the source group-based communication set satisfies its governing data retention policy, an associated group-based communication system may determine such a circumstance and remove the group-based communication message from storage. Accordingly, the updated group-based communication message set may be received from the group-based communication system at a at a second timestamp, and not include the removed group-based communication message. It should be appreciated that in the interim between the first timestamp and second timestamp, any number of group-based communication messages may be removed. As such, the updated group-based communication message set may include less group-based communication messages than the source group-based communication message set, such as only a subset of the source group-based communication message set that was retained by the group-based communication system. In some embodiments, a group-based communication system, for example embodied by the apparatus 200, includes means to cause rendering the second group-based communication interface comprising the updated group-based communication message set, for example via the client device embodied by the apparatus 250, as described herein.

In some embodiments, the updated group-based communication message set includes data indicating group-based communication messages from the source group-based communication set that were removed. In this regard, the apparatus 250 may be configured to render the second group-based communication interface including a first subset of group-based communication messages retained by the group-based communication system, and a second subset of group-based communication messages removed by the group-based communication system. In some such embodiments, the apparatus 250 is configured to render the second group-based communication interface where the removed group-based communication messages are rendered as visually distinct from the retained group-based communication messages. In some embodiments, for example, the message content data for the removed group-based communication message is replaced with default content data, for example indicating to the user that the group-based communication message has been removed. Additionally or alternatively, in some embodiments, the removed group-based communication message is rendered with a predetermined image that indicates the group-based communication message has been removed. Retained group-based communication messages in the updated group-based communication message set may be rendered including the message content data for viewing by an associated user.

At optional block 2208, the apparatus 250 includes means, such as the group-based client module 260, input/output module 256, communications module 258, processor 252, and/or the like, or a combination thereof, configured to transmit a policy information request to a group-based communication system. In some embodiments, the policy information request comprises at least a group-based communication channel identifier for the common group-based communication channel, an authenticated user account identifier, an organization identifier, and/or a combination thereof. In some such embodiments, the policy information request indicates a user desire for information regarding the data retention policy that will govern data posted and/or otherwise generated by the user's authenticated user account, or an authenticated user account associated with another organization, for a particular group-based communication channel. For example, in the context of a common group-based communication channel, the policy information request may represent a user desire to receive information regarding the data retention policy that governs their data posted to the common group-based communication channel. Alternatively or additionally, in some embodiments, the policy information request may represent a user desire to receive information regarding the data retention policy that governs data for authenticated user accounts associated with each other organization permissioned to access the common group-based communication channel. In some embodiments, the apparatus 250 generates and/or transmit the policy information request in response to user interaction with the group-based communication interface and/or an updated group-based communication interface. In some embodiments, a group-based communication system, for example embodied by the apparatus 200, includes means receive, from the client device for example embodied by the apparatus 250, the transmitted policy information request as described herein, and/or process the policy information request as described herein.

In some embodiments, the policy information request is configured to cause the group-based communication system to identify the data retention policy that governs data associated with the client device within the common group-based communication channel. In at least one example embodiment, for example, the policy information request includes an authenticated user account identifier associated with the client device, and/or an organization identifier associated with the authenticated user account associated with the client device. Additionally or alternatively, in some embodiments, the policy information request includes a channel identifier for the common group-based communication channel. In this regard, the group-based communication system may utilize such information and/or a combination thereof to identify the governing data retention policy, as described herein.

At optional block 2210, the apparatus 250 includes means, such as the group-based client module 260, input/output module 256, communications module 258, processor 252, and/or the like, or a combination thereof, configured to render a data retention notification information interface based on a governing data retention policy of the data retention policy set for the common group-based communication channel. The governing data retention policy is based on at least the policy information request. For example, as described herein, the group-based communication system may parse one or more identifiers from the policy information request, and utilize such information to identify the governing data retention policy. The group-based communication system may subsequently transmit some or all of the governing data retention policy, and/or associated information, in response to the request for rendering to the data retention notification information interface. In this regard, the data retention notification information interface includes a set of interface elements including such information. For example, the data retention notification information interface includes the policy name, retention interval, owner organization, and/or the like for the governing data retention policy. In some embodiments, a group-based communication system, for example embodied by the apparatus 200, includes means to cause rendering of the data retention notification interface, for example via the client device embodied by the apparatus 250, as described above.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., a FPGA or an ASIC. The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus comprising at least one processor and at least one non-transitory memory including computer program code, the at least one non-transitory memory and the computer program code, with the at least one processor, configure the apparatus to:

identify a group-based communication channel, of a group-based communication platform, that is accessible to a plurality of client devices;

identify a first data retention policy that includes one or more first parameters and that is associated with a group-based communication message posted within the group-based communication channel;

identify a second data retention policy that includes one or more second parameters, different than the one or more first parameters, and that is also associated with the group-based communication message;

determine, based at least in part on the one or more first parameters and the one or more second parameters, that the first data retention policy is different than the second data retention policy with respect to an extent to which the group-based communication message is to be maintained by the group-based communication platform;

perform, based at least in part on determining that the first data retention policy is different than the second data retention policy, a message management action for the group-based communication message based at least in part on a determination of whether the group-based communication message satisfies the first data retention policy; and cause rendering, via a client device of the plurality of client devices, of a group-based communication interface associated with the group-based communication channel.

2. The apparatus as recited in claim 1, wherein the first data retention policy is associated with a first organization identifier associated with a first organization and the second data retention policy is associated with a second organization identifier associated with a second organization that is different than the first organization.

3. The apparatus as recited in claim 1, wherein determining that the first data retention policy is different than the second data retention policy comprises determining that the first data retention policy is more restrictive than the second data retention policy based at least in part on at least one of a storage or a transmission of group-based communication messages governed by at least one of the first data retention policy or the second data retention policy.

4. The apparatus as recited in claim 1, wherein one of the first data retention policy or the second data retention policy is associated with the group-based communication channel or a first organization that hosts the group-based communication platform and an other of the first data retention policy or the second data retention policy is associated with a second organization that is different than the first organization.

5. The apparatus as recited in claim 1, wherein one of the first data retention policy or the second data retention policy is associated with the group-based communication channel or a first organization that hosts the group-based communication platform and an other of the first data retention policy or the second data retention policy is previously agreed upon by a second organization and a third organization that are each different than the first organization.

6. The apparatus as recited in claim 1, wherein performing the message management action comprises retaining, in a group-based communication datastore hosted by the group-based communication platform, the group-based communication message based at least in part on determining that the group-based communication message satisfies the first data retention policy.

7. The apparatus as recited in claim 1, wherein performing the message management action comprises removing, from a group-based communication datastore hosted by the group-based communication platform, the group-based communication message based at least in part on determining that the group-based communication message fails to satisfy the first data retention policy.

8. The apparatus as recited in claim 7, wherein removing the group-based communication message comprises:

determining an archive interval threshold associated with the first data retention policy; and determining, based at least in part on the archive interval threshold, that the group-based communication message is to be stored in the group-based communication datastore as an archived group-based communication message for a predetermined amount of time prior to the group-based communication message being permanently deleted or made inaccessible via the group-based communication platform.

9. The apparatus as recited in claim 1, wherein one of the first data retention policy or the second data retention policy is associated with public group-based communication channels of the group-based communication platform and an other of the first data retention policy or the second data retention policy is associated with private group-based communication channels of the group-based communication platform.

10. A computer-implemented method comprising:

identifying a group-based communication channel, of a group-based communication platform, that is accessible to a plurality of client devices;

identifying a first data retention policy that includes one or more first parameters and that is associated with a group-based communication message posted within the group-based communication channel;

identifying a second data retention policy that includes one or more second parameters, different than the one or more first parameters, and that is also associated with the group-based communication message;

determining, based at least in part on the one or more first parameters and the one or more second parameters, that the first data retention policy is different than the second data retention policy with respect to an extent to which the group-based communication message is to be maintained by the group-based communication platform;

performing, based at least in part on determining that the first data retention policy is different than the second data retention policy, a message management action for the group-based communication message based at least in part on a determination of whether the group-based communication message satisfies the first data retention policy; and causing rendering, via a client device of the plurality of client devices, of a group-based communication interface associated with the group-based communication channel.

11. The computer-implemented method as recited in claim 10, wherein the first data retention policy is associated with a first organization identifier associated with a first organization and the second data retention policy is associated with a second organization identifier associated with a second organization that is different than the first organization.

12. The computer-implemented method as recited in claim 10, wherein determining that the first data retention policy is different than the second data retention policy comprises determining that the first data retention policy is more restrictive than the second data retention policy based at least in part on at least one of a storage or a transmission of group-based communication messages governed by at least one of the first data retention policy or the second data retention policy.

13. The computer-implemented method as recited in claim 10, wherein one of the first data retention policy or the second data retention policy is associated with the group-based communication channel or a first organization that hosts the group-based communication platform and an other of the first data retention policy or the second data retention policy is associated with a second organization that is different than the first organization.

14. The computer-implemented method as recited in claim 10, wherein performing the message management action comprises retaining, in a group-based communication datastore hosted by the group-based communication platform, the group-based communication message based at least in part on determining that the group-based communication message satisfies the first data retention policy.

15. The computer-implemented method as recited in claim 10, wherein performing the message management action comprises removing, from a group-based communication datastore hosted by the group-based communication platform, the group-based communication message based at least in part on determining that the group-based communication message fails to satisfy the first data retention policy.

16. The computer-implemented method as recited in claim 15, wherein removing the group-based communication message comprises:
   determining an archive interval threshold associated with the first data retention policy; and
   determining, based at least in part on the archive interval threshold, that the group-based communication message is to be stored in the group-based communication datastore as an archived group-based communication message for a predetermined amount of time prior to the group-based communication message being permanently deleted or made inaccessible via the group-based communication platform.

17. A system comprising:
   memory;
   one or more processors; and
   one or more computer-executable stored in the memory and executable by the one or more processors to:
      identify a group-based communication channel, of a group-based communication platform, that is accessible to a plurality of client devices;
      identify a first data retention policy that includes one or more first parameters and that is associated with a group-based communication message posted within the group-based communication channel;
      identify a second data retention policy that includes one or more second parameters, different than the one or more first parameters, and that is also associated with the group-based communication message;
      determine, based at least in part on the one or more first parameters and the one or more second parameters, that the first data retention policy is different than the second data retention policy with respect to an extent to which the group-based communication message is to be maintained by the group-based communication platform;
      perform, based at least in part on determining that the first data retention policy is different than the second data retention policy, a message management action for the group-based communication message based at least in part on a determination of whether the group-based communication message satisfies the first data retention policy; and
      cause rendering, via a client device of the plurality of client devices, of a group-based communication interface associated with the group-based communication channel.

18. The system as recited in claim 17, wherein one of the first data retention policy or the second data retention policy is associated with the group-based communication channel or a first organization that hosts the group-based communication platform and an other of the first data retention policy or the second data retention policy is previously agreed upon by a second organization and a third organization that are each different than the first organization.

19. The system as recited in claim 17, wherein performing the message management action comprises retaining, in a group-based communication datastore hosted by the group-based communication platform, the group-based communication message based at least in part on determining that the group-based communication message satisfies the first data retention policy.

20. The system as recited in claim 17, wherein performing the message management action comprises removing, from a group-based communication datastore hosted by the group-based communication platform, the group-based communication message based at least in part on determining that the group-based communication message fails to satisfy the first data retention policy.

* * * * *